United States Patent [19]

Murakami et al.

[11] Patent Number: 5,222,241
[45] Date of Patent: Jun. 22, 1993

[54] DIGITAL SIGNAL PROCESSOR HAVING DUPLEX WORKING REGISTERS FOR SWITCHING TO STANDBY STATE DURING INTERRUPT PROCESSING

[75] Inventors: Tokumichi Murakami; Koh Kamizawa; Yoshiaki Katoh; Hideo Ohira; Masatoshi Kameyama; Naoto Kinjo, all of Kanagawa, Japan

[73] Assignee: Mitsubishi Denki Kabushiki Kaisha, Tokyo, Japan

[21] Appl. No.: 750,408

[22] Filed: Aug. 27, 1991

Related U.S. Application Data

[62] Division of Ser. No. 201,208, Jun. 3, 1988, Pat. No. 5,045,993.

[30] Foreign Application Priority Data

| | | | |
|---|---|---|---|
| Jun. 5, 1987 | [JP] | Japan | 62-140872 |
| Jul. 27, 1987 | [JP] | Japan | 62-186858 |
| Aug. 6, 1987 | [JP] | Japan | 62-197009 |
| Oct. 29, 1987 | [JP] | Japan | 62-273763 |
| Oct. 30, 1987 | [JP] | Japan | 62-274810 |
| Nov. 25, 1987 | [JP] | Japan | 62-296611 |
| Nov. 30, 1987 | [JP] | Japan | 62-296612 |
| Dec. 15, 1987 | [JP] | Japan | 62-316553 |

[51] Int. Cl.⁵ .............. G06F 9/00; G06F 11/16
[52] U.S. Cl. .............. 395/775; 364/DIG. 1; 364/263.2; 364/268; 364/268.3; 364/268.5; 364/244.3; 364/244; 364/262.4; 364/262.8; 364/247

[58] Field of Search ............... 395/775, 375

[56] References Cited

U.S. PATENT DOCUMENTS

| | | | |
|---|---|---|---|
| 3,905,025 | 9/1975 | Davis et al. | 364/200 |
| 4,338,662 | 7/1982 | Yokoyama | 364/200 |
| 4,438,492 | 3/1984 | Harmon, Jr. et al. | 364/200 |
| 5,021,993 | 6/1991 | Matoba et al. | 395/775 |
| 5,050,076 | 9/1991 | Misaka | 395/375 |

*Primary Examiner*—Kevin A. Kriess
*Attorney, Agent, or Firm*—Rothwell, Figg, Ernst & Kurz

[57] ABSTRACT

A digital signal processor of a simple circuit configuration capable of implementing arithmetic processes and interruption processes efficiently in a reduced number of steps at a high processing speed. The digital signal processor comprises instruction execution pipeline stages including a stage in which data is read from a data memory and the data is applied to an arithmetic unit; an arithmetic unit for the execution stage, including a barrel shifter, a multiplier and an arithmetic and logic unit, a normalizing barrel shifter, a round-off/accumulation adder, internal data memories and a DMA transfer bus for a write/accumulation stage, an address generating unit capable of parallel and two-dimensional generation of two inputs one output data memory addresses and a DMA control unit for controlling the two-dimensional data transfer through a DMA bus between the internal data memories and an external data memory for an instruction execution stage.

3 Claims, 48 Drawing Sheets

FIG. 10 (PRIOR ART)

(a) BRANCH CONDITION A MET

| TIME (MACHINE CYCLE) | T | T+1 | T+2 | T+3 | T+4 | T+5 |
|---|---|---|---|---|---|---|
| PC | N | N+1 | Ma | Ma+1 | | |
| DECODER | | CONDITIONAL BRANCH INSTRUCTION A | NOP INSTRUCTION | ADDRESS Ma INSTRUCTION | | |

Ma: BRANCHED ADDRESS A

(b) BRANCH CONDITION A NOT MET, BRANCH CONDITION B MET

| PC | N | N+1 | N+2 | Mb | Mb+1 | |
|---|---|---|---|---|---|---|
| DECODER | | CONDITIONAL BRANCH INSTRUCTION A | CONDITIONAL BRANCH INSTRUCTION B | NOP INSTRUCTION | ADDRESS Mb INSTRUCTION | |

Mb: BRANCHED ADDRESS B

(c) BRANCH CONDITIONS A AND B NOT MET

| PC | N | N+1 | N+2 | N+3 | Mc | Mc+1 |
|---|---|---|---|---|---|---|
| DECODER | | CONDITIONAL BRANCH INSTRUCTION A | CONDITIONAL BRANCH INSTRUCTION B | CONDITIONAL BRANCH INSTRUCTION C | NOP INSTRUCTION | ADDRESS Mc INSTRUCTION |

Mc: BRANCHED ADDRESS C

FIG. 17 (PRIOR ART)

| No. | CONTROL CODE 7 6 5 4 3 2 1 0 | OPERATIONS |
|---|---|---|
| 1 | 1 0 0 0 0 d d d | AR0 — AR4, ARP INVARIABLE |
| 2 | 1 0 0 0 1 y y y | yyy → ARP (6) |
| 3 | 1 0 0 1 0 d d d | AR(ARP) − 1 → AR(ARP) |
| 4 | 1 0 0 1 1 y y y | AR(ARP) − 1 → AR(ARP)<br>yyy → ARP |
| 5 | 1 0 1 0 0 d d d | AR(ARP) + 1 → AR(ARP) |
| 6 | 1 0 1 0 1 y y y | AR(ARP) + 1 → AR(ARP)<br>yyy → ARP |
| 7 | 1 1 0 1 0 d d d | AR(ARP) − AR0 → AR(ARP) |
| 8 | 1 1 0 1 1 y y y | AR(ARP) − AR0 → AR(ARP)<br>yyy → ARP |
| 9 | 1 1 1 0 0 d d d | AR(ARP) + AR0 → AR(ARP) |
| 10 | 1 1 1 0 1 y y y | AR(ARP) + AR0 → AR(ARP)<br>yyy → ARP |
| 11 | 0 ←——— dma ———→ | DIRECT ADDRESSING (INVARIABLE) | yyy : CONTENT OF THE NEXT ARP(6) REPRESENTED BY AN IMMEDIATE VALUE ddd : DUMMY (ARBITRARY CONTENT) NOT USED

AR(ARP): ONE OF AR0 TO AR4 (8) INDICATED BY ARP(6)

FIG. 21 (PRIOR ART)

| ADDRESS CONTROL MODE No. | ADDRESS CONTROL CODE | OPERATIONS |
|---|---|---|
| 1 | 1 0 0 0 0 d d d | AR0-AR4, ARP INVARIABLE |
| 2 | 1 0 0 0 1 y y y | yyy → ARP |
| 3 | 1 0 0 1 0 d d d | AR(ARP) - 1 → AR(ARP) |
| 4 | 1 0 0 1 1 y y y | AR(ARP) - 1 → AR(ARP)<br>yyy → ARP |
| 5 | 1 0 1 0 0 d d d | AR(ARP) + 1 → AR(ARP) |
| 6 | 1 0 1 0 1 y y y | AR(ARP) + 1 → AR(ARP)<br>yyy → ARP |
| 7 | 1 1 0 1 0 d d d | AR(ARP) - AR0 → AR(ARP) |
| 8 | 1 1 0 1 1 y y y | AR(ARP) - AR0 → AR(ARP)<br>yyy → ARP |
| 9 | 1 1 1 0 0 d d d | AR(ARP) + AR0 → AR(ARP) |
| 10 | 1 1 1 0 1 y y y | AR(ARP) + AR0 → AR(ARP)<br>yyy → ARP |
| 11 | 0 ← dma (IMMEDIATE VALUE) | DIRECT ADDRESSING (WITHOUT CHANGE IN AR) | yyy : CONTENT OF THE NEXT ARP INDICATED BY IMMEDIATE VALUE ddd : DUMMY DATA (NOT USED)

AR(ARP): ONE CONTENT AMONG AR0 - AR4 USED IN ARP

T0: RESULT OF DECISION ON A0 - B0 = 0?
"1": YES  "0" NO
T1: RESULT OF DECISION ON A1 - B1 = 0?
T2: RESULT OF DECISION ON A2 - B2 = 0?
Zn TO Z0: PREVIOUSLY SET CONTENTS OF TEST REGISTERS

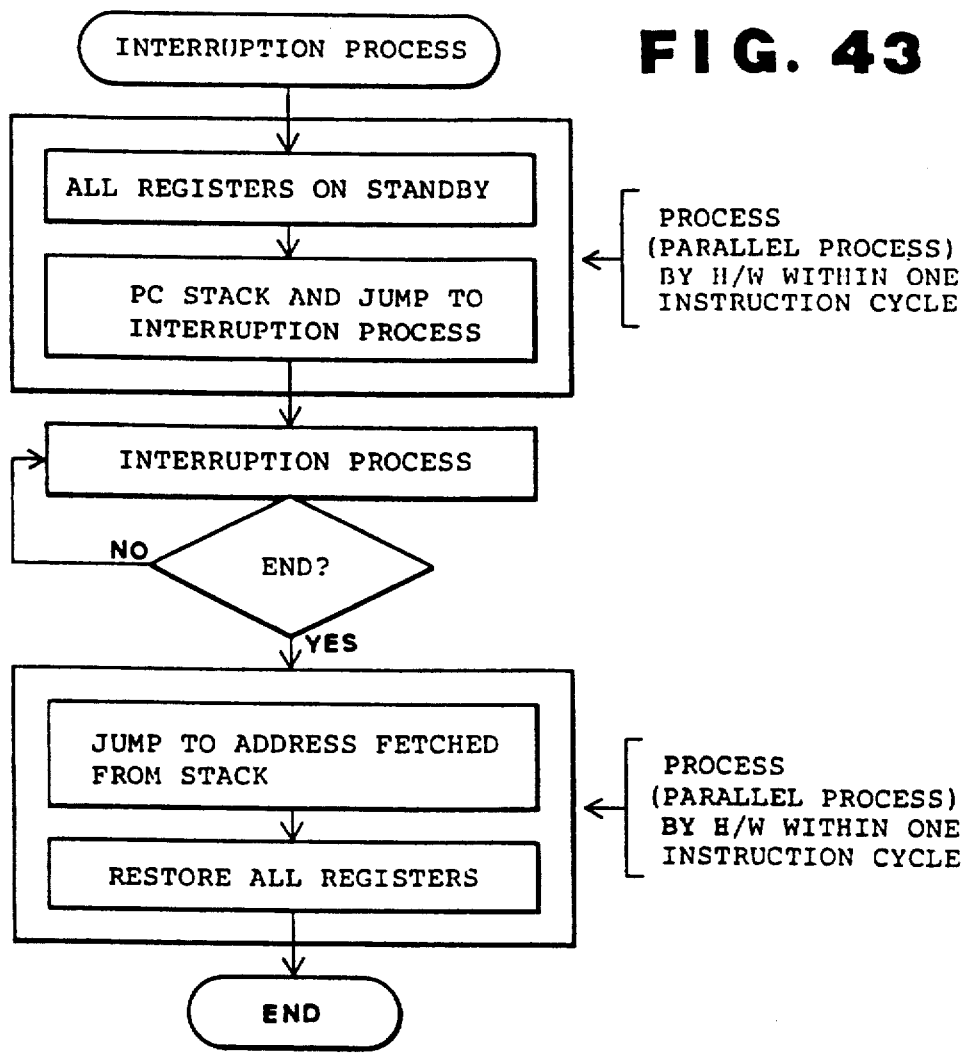
FIG. 43
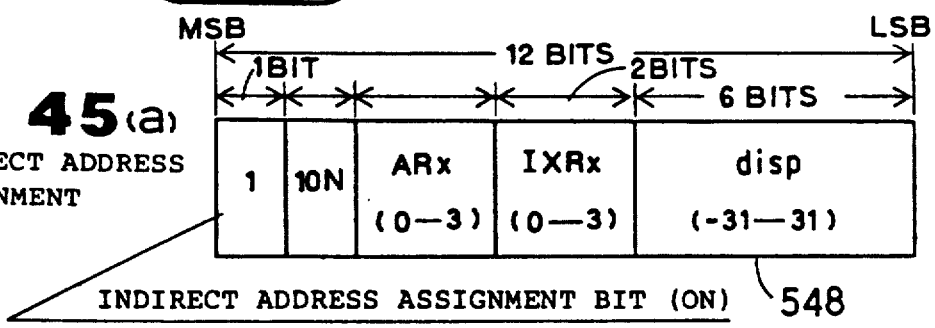
FIG. 45(a) INDIRECT ADDRESS ASSIGNMENT
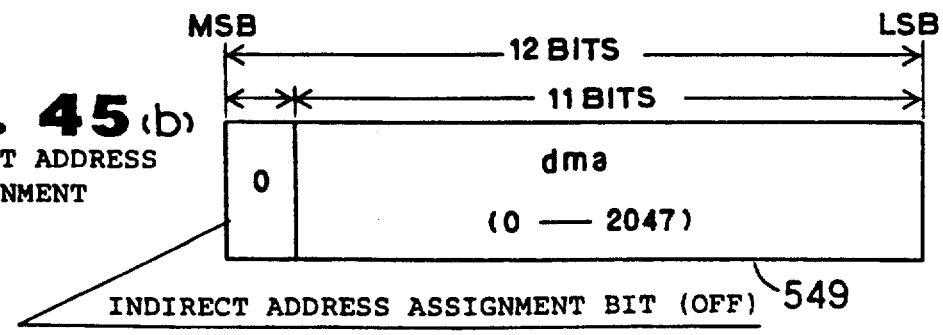
FIG. 45(b) DIRECT ADDRESS ASSIGNMENT

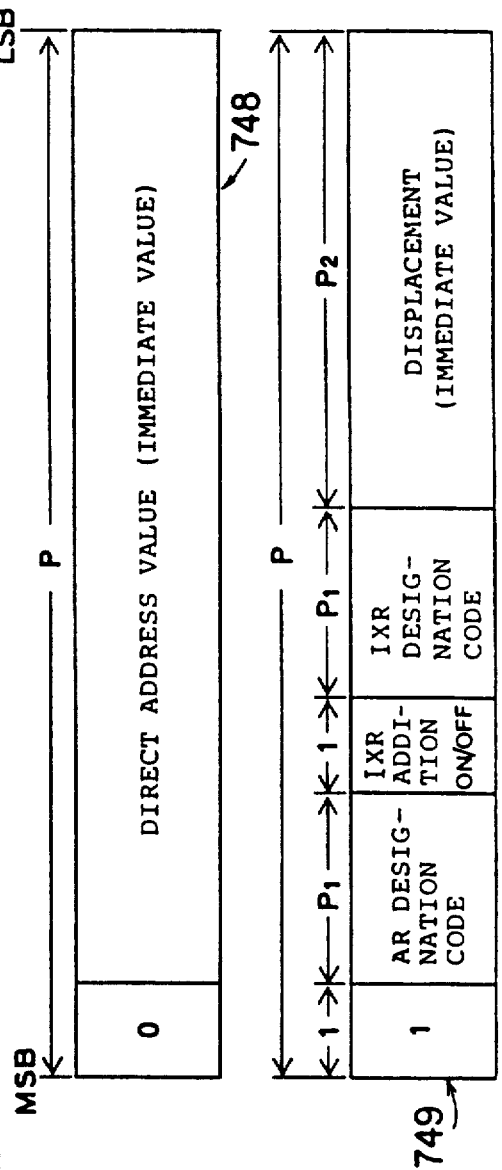

| ADDRESS CONTROL MODE NO. | ADDRESS CONTROL CODE | OPERATIONS |
|---|---|---|
| 1 | 0 a a 0 d d — 0 ⟶ | A R(a a) ⟶ A R(a a) |
| 2 | 0 a a 0 d d — disp (≠ 0) ⟶ | A R(a a) + disp ⟶ A R(a a) |
| 3 | 0 a a 1 i i — 0 ⟶ | A R(a a) + IXR(i i) ⟶ A R(a a) |
| 4 | 0 a a 1 i i — disp (≠ 0) ⟶ | A R(a a) + IXR(i i) + disp ⟶ A R(a a) |
| 5 | 1 ⟵ IMMEDIATE VALUE ⟶ | DIRECT ADDRESSING (WITHOUT CHANGE IN AR) | aa: CODE DESIGNATING THE ONE OF ARx (x : 1~n)
ii: CODE DESIGNATING THE ONE OF IXRx (x : 1~n)
disp: DISPLACEMENT (IMMEDIATE VALUE)
dd: DUMMY DATA

DIGITAL SIGNAL PROCESSOR HAVING DUPLEX WORKING REGISTERS FOR SWITCHING TO STANDBY STATE DURING INTERRUPT PROCESSING

This is a division of application Ser. No. 07/201,208, filed Jun. 3, 1988, now U.S. Pat. No. 5,045,933.

BACKGROUND OF THE INVENTION

1. Field of the Invention

The present invention relates to a digital signal processor capable of efficiently carrying out the arithmetic or interruption processing mainly of successive signals at a high speed through a small number of steps.

2. Description of the Prior Art

FIG. 1 is a block diagram showing the constitution of DSSP1 (Digital Speech Signal Processor 1), namely, an exemplary conventional digital signal processor, "A High-speed VLSI Signal Processor with Normalizing Floating-point Systems", the proceedings of the annual communication Symposium of the Institute of Electronics and Communication Engineers of Japan (IECEJ), 1986, Japan. This exemplary conventional digital signal processor corresponds to a first embodiment of the present invention.

Shown in FIG. 1 are program counter (PC) 1 internally provided with a stack for instruction address control, an instruction mask ROM 2 storing microinstructions, an instruction register (IR0) 3 for receiving one microinstruction provided by the instruction mask ROM 2 or one external microinstruction every machine cycle, an instruction register (IR1) 4 for receiving only the bit field requiring decoding included in a microinstruction given to the instruction register (IR0) 3, an instruction decoder 5 for decoding the microinstruction given to the instruction register (IR1) 4, a program bus (P-Bus) 6 for distributing microinstructions to the functional units, a register (BI) 7 which receives immediate data (18-bit width) included in a microinstruction provided on the program bus (P-Bus) 6 and applies the same to a data bus (D-Bus) 8 (18-bit width) for internally transferring data obtained by operation, a register (AM) 9 which receives an address mode instruction of data memory through the program bus (P-Bus) 6, a register (AD) 10 (4w × 16-bit width) for holding address pointer information for generating an indirect address, a page register (PR) 11 (3-bit width) which specifies the page in an external data memory, an address computation unit (AAU) 12 (9-bit width) capable of simultaneously generating three addresses at the maximum, an address register (AR0) 13, an address register (AR1) 14, an address register (AR2) 15, an address selector (RAS) 16, a loop counter (LC) 17, a status register (SR) 18 for indicating the operating mode and status of the processor, a DMA control unit 19 for controlling the direct data transfer between serial I/O ports (SI0/1, SO0/1) 32 and an external data memory, an address register (AR) 20 for holding addresses of 12-bit width to be given to an external data memory, a dual port internal data memory (2O-RAM) 21 of 512w × 18 bits capacity capable of simultaneous read and write of two data, a register (DP0) 22 for holding input data of operand, a register (DP1) 23 for holding input data of operator, a multiplier (FMPL) 24 for multiplying the floating point of 12E6 bit format, a register (P) 25 for holding the results of operation of the multiplier (FMPL) 24, a selector 26, a selector 27, a floating-point arithmetic logical operation unit 28 mainly for carrying out the floating-point operation of 12E6 bit format, accumulators (ACC0 to ACC 3) 29 of 4w × 18 bits for holding and accumulating the outputs of the floating-point arithmetic logical operation unit (FALU) 28, a data register (DR) 30 connected to the data bus (D-Bus) 8 to temporarily hold data to be read from and to be written in an external data memory, a read/write control circuit (R/W Cont) 31 for reading data from and writing data in an external data memory, serial I/O ports (SI0/1, SO0/1) 32 for full-duplex two-channel data transfer with external devices, an interrupt control circuit (Int Cont) 33, an external data memory bus control circuit (Bus Cont) 34, a clock control circuit (CLK Cont) 35 for controlling internal timing, and a selector 36.

FIG. 2 is a time chart of assistance in explaining the microinstruction execution sequence of the digital signal processor DSSP1 shown in FIG. 1. Shown in FIG. 2 are cycle timing 40 consisting of four phases of clocks, fetch stage timing 41 showing stages of the address output of the program counter (PC) 1 and the microinstruction input of the instruction register (IR0) 3, decode stage timing 42 of decoding the input microinstruction of the instruction register (IR1) 4 by the instruction decoder 5, timing 43 of updating the address computation unit 12 in the decode stage, timing 44 of operation of the floating-point multiplier (FMPL) 24, timing 45 of operation of the floating-point arithmetic logical operation unit (FALU) 28, timing 46 of transferring data through the data bus (D-Bus) 8 between the registers, and timing 47 of reading data from and writing data in the external data memory through the data register (DR) 30.

Referring to FIG. 3 showing the respective constructions of microinstructions of 32-bit width per word representing four groups of microinstructions of the digital signal processor DSSP1 of FIG. 1, indicated at 50 is a sequence instruction for controlling instruction processing steps, at 51 is a mode instruction for initializing and setting modes of the status register (SR) 18, the address computation unit (AAU) 12 and the DMA control unit 19, at 52 is an operation instruction mainly for controlling the operation of the floating-point arithmetic logical operation unit (FALU) 28 and parallel data transfer accompanying the operation of the floating-point arithmetic logical operation unit (FALU) 28, and at 53 is a load instruction for loading immediate data on an optional register or a data memory.

The operation of the digital data processor (DSSP1) will be described hereinafter, in which the components will be denoted by the abbreviated designation shown in the foregoing description.

First the general mode of operation will be described with reference to FIG. 1. In this digital signal processor DSSP1, the P-Bus 6 and the D-Bus 8 are provided individually. The application of the microinstruction to the IR0 3, the transfer of the microinstruction through the P-Bus 6, the decoding of the microinstruction by the instruction decoder 5, and execution of the instruction by the D-Bus 8, the FMPL 24 and the FALU 28 are carried out in parallel through a pipeline process. The D-Bus 8 and all the execution units including the 2P-RAM 21 are of register-base, namely, all the inputs and outputs are connected to the registers. In the timing of access to the registers, outputs are provided at the leading edge of the machine cycle and the outputs are set in the registers at the trailing edge of the machine cycle. The contents of data actually processed is not the contents of data set in the register by the same microinstruction, but the contents of data set in the register by the preceding microinstruction. Such a mode of operation is called as delayed operation. The interior of the arithmetic unit is partitioned into sections by the registers to enable the parallel operation of the sections. For example, the FMPL 24 continually executes the floating-point multiplication once every machine cycle. In applying data to the FMPL 20, the data is set in the DP0 22 and DP1 23 by the preceding microinstruction, and the contents of the P 25 is fetched by the succeeding or later microinstruction to obtain the results of multiplication. While the contents of the P 25 is being fetched, the data is held by the DP0 22, DP1 23 and the P 25. Accordingly, one multiplication operation formerly requiring three microinstructions for data input, multiplication and data output can be carried out by one microinstruction when the process is executed continuously.

In this DSSP1, the FMPL 24 and the FALU 28 are connected by the P 25. The FALU is able to accumulate the contents of the P25 in the ACC0 29 to the ACC3 29 to execute one term of product-sum operation which is often used in filtering and the barafly operation of fast Fourier transform (FFT) in one machine cycle similarly to one pair of a multiplier and accumulator shown in "Packing a signal processor onto a single digital board", Louis Schirm, Electronics, Dec. 20, 1979. For example, the product-sum is calculated by using an expression:

$$\sum_{i=1}^{N} = (a_i \times b_i)$$

where N is an integer not less than 1 (one), and $a_i$ and $b_i$ are input data. In this processor, three microinstructions for applying data to the DP0 22 and DP1 23, for executing multiplication by the FMPL 24 and for accumulating the results of multiplication set in the P 25 by the FALU 28 in the ACC0 to ACC3 to obtain one term of the product-sum. Naturally, when the operation is carried out continuously, one term of the product-sum can be obtained for one microinstruction. Thus, to obtain one term of the product-sum for one microinstruction, two input data corresponding to the input data $a_i$ and $b_i$ must be given respectively to the DP0 22 and the DP1 23 every one microinstruction. Accordingly, the 2P-RAM 21 is enabled to supply the two input data, and a bus is provided to transfer the data read from the 2P-RAM 21 directly to the DP0 22 and DP1 23 without using the D-Bus 8 to avoid bus contention in the D-Bus 8. The AAU 12 has output means for selectively providing two address data among address data of 9-bit width provided through the AR0 13, AR1 14 and AR2 15 mainly to address the input data of the 2P-RAM 21. The AAU 12 is able to specify three addresses simultaneously at the maximum only in generating addresses for the two input data given thereto from the 2P-RAM 21, and an address for one output data given through the DR 30 and the AR 20 to the external data memory. Each addressing is a so-called indirect addressing system using an address pointer internally set in the AAU 12. The AR0 13 is susceptible to increment, modulo, bit reverse, repeat; increment base address and updating of increment, while the AR1 14 and the AR2 15 are susceptible only to simple increment. The AAU 12 is able to perform address operation only in a 9-bit natural binary system. In specifying a 12-bit address in the external data memory, three bits for specifying a memory page are added to the nine bits to specify twelve bits.

On the other hand, since the FMPL 24 and the FALU 28 execute operation in a normalized floating-point system of 12E6, all the data for the 2P-RAM 21, the DP0 22, the DP1 23, the ACC0 29 through ACC3 29, the DR 30, the D-Bus 8 and BI 7 are of 18-bit width, and hence the FALU 28 needs a special operation mode for calculating a special address initial value. Accordingly, the data representing the result of operation stored in the AR0 13, the AR1 14, the AR2 15, the AR 20 and the ACC0 29 through the ACC3 29 are not compatible with those data.

The DMA control unit 19 controls, independently of the microinstruction, full-duplex 2-channel data transfer between the serial I/O ports SI0/1 32 and SO0/1 32, and the external data memories through the D-Bus 8 and the AR 20 and DR 30. Therefore it is possible that the microinstruction operation controlled by the instruction decoder 5 and the internal resource contend with each other.

To avoid the contention, the instruction decoder 5 is held inoperative for six machine cycles for every word to interrupt operation according to the microinstruction in transferring data by the DMA control unit 19.

The DSSP1 is capable of performing the following operations in parallel within one microinstruction in executing microinstructions.

(1) The 9-bit address operation of three kinds at the maximum by the AAU 12.

(2) The floating-point multiplication of 12E6 by the FMPL24.

(3) The floating-point operation of 12E6 by the FALU 28.

(4) Data transfer through the D-Bus 8 and the DR 30 between the external memories.

(5) DMA data transfer through the full-duplex 2-channel serial I/O ports SI0/1 32 and SO0/1 32, D-Bus 8 and the DR 30 between the external memories.

The microinstruction execution timing of the DSSP1 will be described with reference to FIG. 2. The machine cycle 40 of the DSSP1 is divided into four phases of timing P0 through P3. The nominal machine cycle time is as high as 50 nsec. Accordingly, it is practically difficult to accomplish three operations, namely, reading a microinstruction from the instruction mask ROM 2, decoding the microinstruction by the instruction decoder 5 and execution of the instruction by the internal resources such as the FMPL 24 and the FALU 28, within one machine cycle. Accordingly, the three operations are divided into stages for each machine cycle to form a three-stage pipeline to enable high-speed operation. The following operations are performed in the stages of the three-stage pipeline.

(1) Fetch stage 41:

A microinstruction address is provided by the PC 1, a microinstruction is read from the instruction mask ROM 2 and the microinstruction is set in the IR0 3.

(2) Decode stage 42 and 43:

The microinstruction is transferred form the IR0 3 to the IR1 4, the microinstruction is decoded by the instruction decoder 5, the program control mode is set, the microinstruction is transferred from the IR0 3 to the P-Bus 6, and address operation of the AAU 12 through the AM 9 and the AD 10.

(3) Execution stage 44, 45, 46 and 47:

Operation of data by the FMPL 24 and FALU 28, data transfer through the D-Bus 8, and access to the external data memories through the AR 20 and the DR 30.

Thus, the DSSP1 needs three machine cycles to execute one microinstruction. This processor executes one microinstruction equivalently by the pipeline method. Accordingly, the actual execution of the microinstruction is delayed by two machine cycles from the read of the microinstruction from the instruction mask ROM 2. To avoid the timing contention between the internal resources, the internal buses are divided into the P-Bus 6 and the D-Bus 8, and the instruction mask ROM 2 and the 2P-RAM 21 are separated. However, since a branch instruction is executed actually in the decode stage the microinstruction being set in the IR0 3 is executed in the decode stage. That is, an instruction succeeding a branch instruction is executed unconditionally. To avoid such unconditional execution of instructions, the DSSP 1 changes the instruction succeeding the branch instruction automatically into a no-operation instruction (NOP) during the execution of the branch instruction. Such a function is aimed at simplifying microinstruction description; however, one machine cycle is wasted in the branching operation and two machine cycles are wasted in indirect branching operation using the D-Bus 8. Generally, no problem arises in about 80% of unconditional branching operations even if the succeeding instruction is executed when the sequence of instruction description is arranged properly and hence loss of machine cycles can be avoided. However, the DSSP1 is unable to avoid the loss of machine cycles.

The microinstruction set of the DSSP1 will be described hereinafter with reference to FIG. 3. A microinstruction set includes only four instructions, namely, a sequence instruction, a mode instruction, an operation instruction and a load instruction.

The sequence instruction controls the PC 1 for loop and subroutine call. The mode instruction initializes and sets the modes of the AAU 12, the selector 16, the LC 17, the SR 18 and the DMA control unit 19. The load instruction is used for loading immediate data of 18-bit width on the registers connected to the D-Bus 8 through the BI 7. The objective resources of the foregoing three microinstructions are fixed depending on instruction operation. On the other hand, as regards the operation instruction, all the internal resources capable of parallel operation must be specified directly. Accordingly, the bit length of the instructions is dependent on the bit length of the operation instruction. The DSSP1 uses horizontal microinstructions of 32-bit width. The FMPL 24 is free to run and no instruction is given thereto directly. The operation of the FALU 28 is specified directly by an instruction. For example, operations of the FALU 28 is controlled by the following instructions.

(1) Absolute value instruction: $|X|$
(2) Signum function instruction: Sign (Y)·X
(3) Addition instruction: $X+Y$
(4) Subtraction instruction: $X-Y$
(5) Maximum value instruction: MAX (X, Y)
(6) Minimum value instruction: MIN (X, Y)
(7) Fixed-to-floating translation instruction: FLT (X)
(8) Floating-to-fixed translation instruction: FIX (X)
(9) Shift instruction: R1, L1 to L8
(10) Logic instruction: AND, OR, EOR, NOT
(11) Mantissa addition instruction: $X_M+Y_M$
(12) Characteristic substraction instruction: $X_E-Y_E$ However, it is a problem in the DSSP1 that the operation of the DSSP1 is based on the floating-point operation, while the DSSP1 carries out logic and address operations on the basis of fixed-point operation. As mentioned above, the floating-point operation and the fixed-point operation are not compatible with each other. In addressing in the memory, for example, on the basis of the results of operation, the instruction (8) must be executed by the FALU 28. Furthermore, since floating-point data is not handled in general data input and output operation, the instruction (7) or the instruction (8) must be executed for every data input or output operation to translate the data.

Another problem in the DSSP1 in the DSSP1 is that bits are always truncated in normalizing floating-point data entailing errors in operation, because the accuracy of operation of the signal processor is limited. However, when floating-point data is normalized only by truncating bits, the absolute value of the results of operation is always smaller than the true value and hence the distribution of the errors is not random. The errors can be regarded as negligibly small by increasing the operation word length. However, since the ordinary signal processor is required to operate at a high speed, increase in the operation word length is limited.

Such a problem cannot be ignored particularly in image signal processing in which interframe processing is performed by an IIR digital filter (recursive digital filter), and the DSSP1 must round the results of operation by a logical operation instruction or the like. Furthermore, in a general signal processing algorithm, in most cases, the accuracy of operation is regulated specifically for every unit process, and hence the accuracy of operation does not necessarily coincide with the operation word length of the signal processor. In such a case, the format of the operation data is converted repeatedly by the FALU 28 for every unit process.

It is a further problem in the DSSP1 that operation capable of high-speed processing is limited only to product-sum operation. Such a limitation to the mode of operation is not a problem for FFT and FIR filters. However, the recent signal processing algorithm requires for operation to determine the degree of approximation of vectors $\vec{A}$ and $\vec{B}$, i.e., distance calculation, such as expressed by the following expressions to be carried out at a high processing speed.

$$\sum_{i=1}^{N} |a_i - b_i|$$

$$\sum_{i=1}^{N} (a_i - b_i)^2$$

where $a_i$ and $b_i$ are the elements of vectors and N is the number of vectors.

The DSSP1 is unable to support such an operation and hence such an operation must be decomposed into individual four arithmetic operations for processing. Therefore, three separate operations must be executed to calculate a single term. When each one term is calculated by using the foregoing expressions, nine instructions ($9=3\times3$) must be provided for one term due to delay, which deteriorates process multitude excessively. Naturally, the process multitude can be increased by sorting in differential+square accumulation by saving interim results by the 2P-RAM 21. However, it is difficult to use the limited space of the data memory effectively and hence it is impossible to process a large quantity of data.

Consider, for example, binary tree search as shown in FIG. 4. Suppose that an input vector $\vec{A}$ is set in the 2P-RAM 21, and a reference vector $\vec{B}$ of a tree construction is allocated to the nodes indicated by reference numerals in an external memory as shown in FIG. 5. An evaluation function expressing the degree of approximation between the input vector $\vec{A}$ and the reference vector $\vec{B}$ is absolute differential sum:

$$\sum_{i=1}^{N} |a_i - b_i| \ \{A = (a_1, a_2, \ldots, a_N), B = (b_1, b_2, \ldots, b_N)\}.$$

A reference vector which provides the least absolute differential sum is selected at each node of the binary tree and finally a reference vector which provides the highest degree of approximation is obtained. In this binary tree search, when the number of the present node is n, the degree of approximation between two reference vectors B at a node $2n+1$ and $2n+2$ is determined, and then the node number of a reference vector to be compared at the next stage is calculated on the basis of the degree of approximation. To carry out the foregoing binary tree search by the DSSP1, the following instruction steps are necessary.

Input data conversion: $N+2$ steps
Evaluation value calculation for one vector: $9N+2$ steps
Evaluation value rounding: About 3 steps
Evaluation value comparison: 4 steps
Calculation of reference vector address for the next node: About 9 steps
Total: $18N+14$ steps 1 stage $+N+2$ steps.

This total number of steps is approximately nine times the number of steps when the ideal number of steps necessary for evaluation value calculation is 2N and the conversion of address and input data is unnecessary. In such a process, since the same process is not performed successively, it is necessary to be always conscious of the context of instructions. Consequently, process efficiency is deteriorated significantly, a very complex program is necessary and, obviously, a problem arises in the quantity of work necessary for developing softwares.

The conventional digital signal processor thus constituted has the following problems.

It is necessary to be always conscious of the context of instructions in producing a program; and the same instructions must be executed successively otherwise the process efficiency cannot be improved.

Address and data format are not compatible with each other, and hence format needs to be converted for every data, for example, in table look-up.

Designed particularly for obtaining product-sum, the arithmetic unit is unable to operate at a high efficiency and a complex program is necessary in operation other than that for obtaining product-sum.

The control of the accuracy of data operation is difficult and automatic rounding is impossible.

Simultaneous Read/Write from and the data memory for 2-input 1-output operation is impossible, and the efficiency is deteriorated excessively, for example, in vector data processing.

Immediate specification of an indirect address mode in the instruction is impossible and hence the process needs to be interrupted for every address mode change.

A second exemplary conventional digital signal processor, which corresponds to a second embodiment of the present invention, will be described hereinafter.

FIG. 6 is a schematic block diagram showing the constitution of a digital signal processor (DSSP1) mainly for voice signal processing, published in the preprint No. S10-1 for the Denshi Tsushin Gakkai Tsushin Bumon Zenkoku Taikai Symposium, 1986.

Referring to FIG. 6, the DSSP1 comprises a program counter (PC) 61 for holding instruction execution addresses (hereinafter referred to as "instruction addresses"), an instruction memory 62 for storing instruction words, a decoder 63 for decoding instruction words, a program bus 64 for transferring decoded control data, a data memory 65 for storing data, a data bus 66 for transferring main data, a bus interface register (hereinafter abbreviated to "BIR") 67 for interconnecting the program bus 64 and the data bus 66, a processing circuit (hereinafter referred to as "EU") 68 which performs arithmetical operations, a register (flag register) 69 having a flip-flop for holding the status of the results of arithmetical operations, namely, a flag, an adder which adds 1 (one) to an input, a switching circuit 71, and a condition decision unit 72.

The operation of the processor will be described hereinafter with reference to FIG. 6. Generally, the signal processor has a pipeline construction to improve the processing speed. This exemplary digital signal processor has a three-stage pipeline construction.

An ordinary processor decodes and executes an instruction word, and then decodes and executes the next instruction word. A processor of a pipeline construction decodes the succeeding instruction word during the execution of the preceding instruction word. Accordingly, the processing speed of the processor of a pipeline system is higher than that of the ordinary processor. However, since advanced decoding is useless in executing instruction words including many jump instructions such as conditional branch instructions, the processing speed of the processor of a pipeline system is reduced in executing such instruction words.

A pipeline processing mode will be described hereinafter.

In the first stage of the pipeline, an instruction word 62A stored in the instruction memory 62 at an instruction address specified by an instruction address 70A provided by the PC 61 is read and is applied to the decoder 63.

In the second stage of the pipeline, a control signal produced by the decoder 63 by decoding the instruction word 62A is provided on the program bus 64 and a necessary control code is given to the BIR 67 via the program bus 64.

In the third stage of the pipeline, the control signal controls operations such as reading data 65A on the data bus 66 from the data memory 65, writing data provided on the data bus 66 in the data memory 65, and processing the data by the EU 68.

The EU 68 provides a flag 68B indicating the status of the result 68A of operation after processing the data. Generally, the flag 68B is a sign flag, a zero flag, an overflow flag or a carry flag.

The sign flag is a logical value "0" when the result 68A of operation is positive, and is a logical value "1" when the result 68A of operation is negative.

The zero flag is a logical value "0" when the result 68A of operation is zero, and is a logical value "1" when the result 68A of operation is not zero.

The overflow flag is a logical value "1" when overflow occurs in the result 68A of operation, and is a logical value "0" when overflow does not occur in the result 68A of operation.

The carry flag is a logical value "1" when carry or digit borrow occurs in the result 68A, and is a logical value "0" in cases other than carry and digit borrow.

The flag 68B is applied to and held by the flag register 69 until a new flag 68B is applied to the flag register 69 after the EU 68 has executed the next operation.

Ordinarily, an instruction word following an instruction word which has been executed is stored in an address greater by "1" than the instruction address 70A in which the executed instruction word was stored, when the executed instruction word does not specify a branch operation.

Accordingly, in the first stage of the pipeline, the instruction address 70A provided by the PC 61 is incremented by "1" by the adder 70 to make an address 71A greater than the instruction address 70A by "1". If the instruction decoded by the decoder 63 does not specify a branch operation, a control signal is applied to the switching circuit 71 to select the address 71A which is greater than the instruction address 70A by "1", and the logical value of a branch completion signal 72A becomes "0", and the address 71A obtained by adding "1" to the instruction address 70A is given to the PC 61.

The operation when the instruction word decoded in the second stage of the pipeline is a conditional branch instruction will be described hereinafter.

A conditional branch instruction is an instruction to specify executing an instruction word in a branched address specified by the instruction when the specified branch condition is met or to specify executing an instruction word in the next address.

When the conditional branch instruction is decoded, a flag 69A held by the flag register 69 is read and is applied to a condition decision unit 72. The condition decision unit 72 decides whether or not the branch condition 64A specified by the instruction is met. When the branch condition 64A is met, the logical value of a branch signal 72A becomes "1", the switching circuit 71 selects the branched address 64B specified by an instruction, and then the branched address 64B is given to the PC 61.

When the branch condition 64A is not met, the logical value of the branch signal 72A becomes "0", the switching circuit 71 selects the address 71A greater than the instruction address 70A by "1", and then the address 71A is given to the PC 61.

Operation of the processor in a case where only information indicating whether or not $A=B$ (A and B are input data) is met is required will be described by way of example with reference to FIG. 7.

In the conventional processor, such information can be stored only in the data memory, and hence the following operation is performed.

First data $A_0$ and $B_0$ are compared. When the data $A_0$ is equal to the data $B_0$, the value of a predetermined address TS(0) in the data memory is made "1". When the data $A_0$ is not equal to the data $B_0$, the value of the address TS(0) is made "0".

Then, data $A_1$ and $B_1$ are compared and the result of the comparison is written at an address TS(1). The result of comparison of data $A_2$ and $B_2$ is written at an address TS(2).

FIG. 8 shows the sequence of operations of the PC 61, the decoder 63 and the EU 68 for processes shown in FIG. 7.

As shown in FIG. 8, in a machine cycle (hereinafter abbreviated to "M.C.") T, the PC 61 provided an instruction address N, and an instruction specifying the comparison of the data $A_0$ and $B_0$ is read from the address N in M.C. T+1.

Then, the EU 68 calculates the difference between the data $A_0$ and $B_0$. A zero flag 802 is provided in a M.C. T+2, and the zero flag 802 is set at the start of a M.C. T+3.

That is, when a conditional branch instruction is given, the condition decision unit 12 tests the zero flag and decides a branched address in the M.C. T+3.

Accordingly, to forbid the advanced decoding operation of the decoder 63, a NOP (no-operation) instruction is stored at an address N+1. When the logical value of the zero flag is "1", a conditional branch instruction is stored at an address N+2.

That is, when $A_0=B_0$, a load instruction stored at an address N+3 (an instruction specifying storing the result of decision in the data memory 65) is executed in a M.C. T+5 as shown in (a) of FIG. 8, and then the address TS(0) is set for "1".

When $A_0 \neq B_0$, the load instruction at the address N+3 is replaced with a NOP instruction to branch the program to an address M as shown in (b) of FIG. 8, a load instruction at the address M is executed in a M.C. T+6 to made the value of the address TS(0) "0". After the completion of the operation following the decision $A_0 \neq B_0$, an unconditional branch instruction stored at an address M+1 is executed.

Accordingly, the PC 61 provides an instruction address N+4 in a M.C. T+7, which is delayed by three machine cycles from the machine cycle where the instruction address N+4 is provided when $A_0=B_0$.

Thus, to set the result of comparison of the data $A_0$ and $B_0$ in the address TS(0) seven instruction steps, and four or seven machine cycles are necessary.

Twenty-one ($21=7\times 3$) instruction steps and twelve machine cycles at the minimum and twenty-one machine cycles at the maximum are necessary to complete the process shown in FIG. 7.

Since the conventional signal processor of the foregoing signal processing system operates in the foregoing mode and the information can be stored only in the data memory, a comparison instruction or the like must be executed and instruction words for two kinds of processes must be produced according to the status of a flag by using a conditional branch instruction in executing the process as shown in FIG. 7, namely, a conditional instruction process for a conditional test instruction to obtain information only as to whether or not the result of operation meets a predetermined condition, and hence the number of instruction steps is increased, execution time varies greatly depending on the result of decision and the processing efficiency is deteriorated.

Another mode of operation of the conventional processor shown in FIG. 6 will be described hereinafter. This mode of operation corresponds to that of a third embodiment of the present invention. Generally, a signal processor has a pipeline construction to improve the processing speed. This processor has a three-stage pipeline construction.

An ordinary processor decodes and executes an instruction word, and then decodes and executes the next instruction word, while the processor of a pipeline system decodes a succeeding instruction word during the execution of the preceding instruction word.

Accordingly, the processing speed of the processor of a pipeline system is higher than that of the ordinary processor. However, since advanced decoding is useless in executing instruction words including many jump instructions such as conditional branch instructions, the processing speed is reduced.

The pipeline processing mode will be described hereinafter. In the first stage of the pipeline, an instruction word 62A stored at an address specified by an instruction address 70A provided by the PC 61 is read from the instruction memory 62 and then the instruction word 62A is given to the decoder 63.

In the second stage of the pipeline, a control signal produced by the decoder 63 by decoding the instruction word 62A is provided on the program bus 64 and a necessary control code is given to the BIR 67 via the program bus 64.

In the third stage of the pipeline, the control signal controls operations such as reading data 65A on the data bus 66 from the data memory 65, writing data provided on the data bus 66 in the data memory 65, and processing the data by the EU 68.

The EU 68 provides a flag 68B indicating the status of the result 68A of operation after processing the data. Generally, the flag 68B is a sign flag, a zero flag, an overflow flag or a carry flag.

The sign flag is a logical value "0" when the result 68A of operation is positive, and is a logical value "1" when the result 68A of operation is negative.

The zero flag is a logical value "0" when the result 68A of operation is zero, and is a logical value "1" when the result 68A of operation is not zero.

The overflow flag is a logical value "1" when overflow occurs in the result 68A of operation, and is a logical value "0" when overflow does not occur in the result 68A of operation.

The carry flag is a logical value "1" when carry or digit borrow occurs in the result 68A, and is a logical value "0" in cases other than carry and digit borrow.

The flag 68B is applied to and held by the flag register 69 until a new flag 68B is applied to the flag register 69 after the EU 68 has executed the next operation.

Ordinarily, an instruction word following an instruction word which has been executed is stored in an address greater by "1" than the instruction address 70A in which the executed instruction word was stored, when the executed instruction word does not specify a branch operation.

Accordingly, in the first stage of the pipeline, the instruction address 70A provided by the PC 61 is incremented by "1" by the adder 70 to make an address 71A greater than the instruction address 70A by "1". If the instruction decoded by the decoder 63 does not specify a branch operation, a control signal is applied to the switching circuit 71 to select the address 71A which is greater than the instruction address 70A by "1", and the logical value of a branch completion signal 72A becomes "0" and the address 71A obtained by adding "1" to the instruction address 70A is given to the PC 61.

The operation when the instruction word decoded in the second stage of the pipeline is a conditional branch instruction will be described hereinafter. A conditional branch instruction is an instruction to branch the program to a branched address specified by an instruction when a branch condition specified by an instruction is met and not to branch the program when the branch condition is not met.

First a flag 69A held in the flag register 69 is read and is given to the condition decision unit 72 when a conditional branch instruction is decoded.

Then, the condition decision unit 72 decides whether or not a branch condition 64A specified by an instruction is met. When the branch condition 64A is met, the logical value of a branch signal 72A becomes "1", the switching circuit 71 selects a branched address 64B specified by an instruction, and then the branched address 64B is given to the PC 61. On the other hand, when the branch condition 64A is not met, the logical value of the branch signal 72A becomes "0". Then, the switching circuit 71 selects an address 71A greater than the instruction address 70A by "1", and then the address 71A is given to the PC 61.

Generally, when a processor having a pipeline construction executes a branch operation the operation is delayed by the pipeline. For example, suppose that a conditional branch instruction stored in the instruction memory 62 at an address N in a M.C. T. Then, the PC 61 provides an instruction address N+1 to read an instruction stored at an address N+1 while a decision is being made in a M.C. T+1.

When the branch condition 64A is met, an instruction word stored at the address N+1 in the decoder is invalidated and is replaced with a NOP instruction.

When the branch condition 64A is not met, the instruction word stored at the address N+1 is decoded and executed.

Suppose that the processor executes conditional branch operations, for example, conditional branch operations according to a program having branch conditions A and B of different priority as shown in FIG. 9, in which a process X is executed when the branch condition A is met, a process Y is executed when the branch condition A is not met and the branch condition B is met, and a process Z is executed when both the branch conditions A and B are not met. FIG. 10 illustrates the timing of the conditional branch instructions executed by the processor according to FIG. 9.

A conditional branch instruction A specifying branching the program to an address A for the process X when the branch condition A is met is stored in the address N, a conditional branch instruction B specifying branching the program to an address B for the process Y when the branch condition B is met is stored in the address N+1, and an unconditional branch instruction C specifying branching the program to an address C for the process Z is stored in the address N+2. When the address N is provided by the PC 61 in a M.C. T, the conditional branch instruction A is decoded and executed in a M.C. T+1. When the branch condition A is met, the PC 61 provides the branched address A in a M.C. T+2, and the instruction at the address N+1 in the decoder is replaced with a NOP instruction. When the branch consition A is not met, the PC 61 provides the address N+2 and the conditional branch instruction B is decoded and executed. When the branch condition B is met, the PC 61 provides the branched address B in a M.C. T+3, and the instruction at the address N+2 of the decoder is replaced with a NOP instruction. When the branch condition B is not met, the PC 61 provides the address N+3 and the unconditional branch instruction C is decoded and executed. Such a conditional branch instruction is able to specify merely binary decisions. Therefore, multipoint branch operation requires many machine cycles.

According to the signal processing system of the conventional processor, many conditional branch instructions need to be executed to accomplish a multipoint conditional branch process. Thus, the conventional signal procesor of a signal processing system has problems that the number of instruction steps is increased the execution time is extended uselessly and the processing speed is reduced.

Furthermore, since those problems prevent the effective use of the instruction memory, reduction in the processing efficiency is remarkable particularly in the image signal processing field in which a large quantity of data need to be operated at a high speed and multipoint conditional branch processes need to be executed on the basis of the operation.

FIG. 11 is a schematic block diagram of a fourth exemplary conventional signal processor employing the digital signal processor (DSSP1) mainly for voice signal processing published in the preprint No. S10-1 for the Denshi Tsushin Gakkai Tsushin Bumon Zenkoku Taikai Symposium, 1985. In this example, the digital signal processor is controlled by a host processor. The fourth exemplary conventional signal processor corresponds to a fourth embodiment of the present invention.

Referring to FIG. 11, there are shown a signal processor 82 mainly for signal processing, a host processor 81 for controlling the signal processor 82, an instruction memory selection signal 83, a reset signal 84 for initializing the signal processor 82, a program counter (PC) 85, an instruction address 86, an internal instruction memory 87, such as a ROM, storing instruction words, an external instruction memory 88 storing instruction words, a switching circuit 89 for selecting one of two instruction words according to the instruction memory selection signal 83, an instruction register (IR) 90 for holding an instruction word, a decoder 91 for decoding instruction words, an arithmetic unit 92 which carries out arithmetical operatins, a control signal 93, a data memory 94 storing data to be subjected to signal processing operation, and data 95.

FIG. 12 is a flow chart of assistance in explaining the operation of the signal processor.

The operation of this signal processor will be described with reference to FIGS. 11 and 12. Upon the connection of the signal processor to a power supply, first the host processor starts operation and gives a selection signal 83 to the signal processor 82 to specify the internal instruction memory 87 or the external instruction memory 88. The internal instruction memory 87 is selected when the logical value of the selection signal 83 is "0", while the external instruction memory 88 is selected when the logical value of the selection signal 83 is "1". Then, the host processor 81 gives the reset signal 84 to the signal processor 82. Upon the reception of the reset signal 84, the devices including the internal instruction register are initialized and the PC 85 is cleared. Then, the PC 85 gives an instruction address 86 specifying an address 0 to the internal instruction memory 87 of the signal processor 82 and to the external instruction memory 88 to read instruction words stored at the specified address 0 and the instruction words are given to the switching circuit 89. The switching circuit 89 selects either the instruction word read from the internal instruction memory 87 or the instruction word read from the external instruction memory 88 according to the selection signal 83 given thereto from the host processor 81 and gives the selected instruction word to the IR 90. The instruction word held by the IR 90 is decoded by the decoder 91 to provide control signals to the devices. The internal arithmetic unit 92 of the signal processor 82 is controlled by the control signal 93 provided by the decoder 91 to process the data 95 stored in the data memory 94 through arithmetical operations.

The conventional signal processor needs a comparatively large-scale control program for complex signal processing and the capacity of the internal instruction memory 87 of the signal processor 82 is insufficient to store such a large-scale control program, and hence the external instruction memory 88 is necessary. When the external instruction memory 88 is employed, an input/output (I/O) device is necessary for transferring the internal signals of the signal processor 82 and the external signals through external terminals to provide the instruction address 86 and to receive instruction words. In such a case, a long time is necessary for reading instruction words from the internal instruction memory 87 because the instruction words are read through an additional device. Accordingly, a clock signal having a long period must be applied to the signal processor 82 when the external instruction memory 88 is employed, and the signal processor 82 must be initialized by the reset signal 84 after switching the instruction memories or the signal processor will malfunction.

The internal instruction memory 87 of the signal processor 82 is a so-called mask ROM in which a program is written beforehand in fabricating the signal processor 82, and a special program for special processes is stored in the internal instruction memory 87.

The conventional signal processor thus constituted needs to read instruction words from the external instruction memory in executing complex processes requiring additional time for reading instruction words from the external instruction memory to reduce the processing efficiency. Furthermore, since the internal instruction memory is a read-only memory, the change of the program after the completion of the signal processor is impossible and, when errors are found in the program or when the program needs correction, the signal processor needs to be changed for a new one, which deteriorates the efficiency of development and is uneconomical.

FIG. 13 is a schematic block diagram of assistance in explaining a typical interruption process, showing a fifth exemplary conventional signal processor published in "Television Gakkai-shi, DSP, Minor Special Issue" pp. 219-233, 1987/3. The constitution of the signal processor per se is not related directly with the interrupt process. This fifth exemplary conventional signal processor corresponds to a fifth embodiment of the present invention.

Referring to FIG. 13, there are shown an external interruption request signal (hereinafter abbreviated to "INTR") 101, an interrupt control circuit 102 which starts interruption process upon the reception of INTR 101, an interruption response signal (hereinafter abbreviated to "INTA") 103 given through the interrupt control circuit 102 to an external device, an interrupt mask register 104 which holds the status of interrupt able or interrupt disable, an interruption process start signal 105, an interrupt address register 106 which holds an interruption process start address, an interruption process start address 107, a multiplexer 108, a program counter (hereinafter abbreviated to "PC") 102 which holds instruction execution addresses, a stacker (hereinafter abbreviated to "STK") 110 of a last-in first-out system (LIFO system) which keeps the instruction address immediately before interruption process on standby, an instruction address 111 provided by the PC 109, an address register (AR) 126, a data address 112 provided by the AR 126, an instruction memory 114 storing execution control instructions, a main bus 115 for transferring main data, a data memory 119 storing data, data 116 written in or read from the data memory 119, an instruction 117 read from the instruction memory 114, an instruction register (IR) 120 for decoding the instruction 117, a sequence control circuit 121 for distributing predetermined control signals to the component devices according to instructions, a temporary register 122 (TR) which receives data through the main bus 115, an arithmetic circuit (EU) 123 for arithmetical operations, a pipeline register (PR) 124 for temporarily storing the output signals of the EU 123, a working register (WR) 125 for storing the results of operation of the EU 123, an address register (AR) 126 which provides a data address 112, and an address generating circuit (AGU) 127 which calculates the data address 112.

FIG. 14 is a flow chart showing the steps of an interruption process to be executed by the signal processor of FIG. 13.

The operation of this system will be described hereinafter with reference to FIG. 13. When there is not any interruption request, the PC 109 gives the instruction address 111 to the instruction memory 114, and the instruction 117 is given to the IR 120. Then, the sequence control circuit 121 distributes control signals according to the instruction given to the IR 120 to control the devices for executing predetermined processes. The AGU 127 and the arithmetic circuit 123 processes the data address 112 and the data 116 according to the control signals. The TR 122, the PR 124, the WR 125 and the AR 126 temporarily hold data necessary for the processes to carry out the processes efficiently.

When the interruption request signal INTR 101 is given to the interrupt control circuit 102, the PC 109 interrupts the operation temporarily, keeps the instruction address 111 presently being executed on standby in the stack 110, changes the instruction address 111 for the interruption address 106 to start the execution of the interruption process. Since the contents of the registers which are being used at the moment of interruption of the operation of the PC 109 among the registers to be used for interruption process, i.e., the TR 122, the PR 124, the WR 125 and the AR 126, need to be restored at the end of the interruption process, an instruction is provided to keep the contents of those registers on standby in the memory before starting the interruption process. An instruction is provided to return the contents kept on standby from the memory to the corresponding registers immediately before the end of the interruption process. Then, the instruction address kept on standby in the stack 110 at the start of the interruption process is fetched and is stored in the PC 109 to restart the process. The sequence of the interruption process is shown in FIG. 14. Operations to keep the contents of the registers on standby and to restore the standby contents to the corresponding registers for interruption process are carried out in response to instructions. Accordingly, when the arithmetic circuit 123 is, for example, of a pipeline construction, the pipeline register 124 and the like which cannot be kept on standby and restored by instructions cannot be kept on standby.

In such a case, since return from the interruption process is impossible when an instruction which uses the arithmetic circuit 123 is being executed in an ordinary process, mask data is written in the interrupt mask register 104 to forbid an interrupt input. While interruption is forbidden, the interrupt control circuit 102 does not provide the INTA 103 in response to the INTR 101; consequently, the external device which generated the interrupt request signal is kept on standby until the INTA 103 is provided.

Since the conventional interruption processing system carries out the interruption process in the foregoing manner, response to an interrupt request is delayed. Particularly, when the conventional interruption processing system is applied to a multiprocessor or a real-time signal processing system, the general processing efficiency of the system is reduced. Since the data is kept on standby by instructions, the interruption process requires an increased time and, when interruption requests are given frequently to the system, in particular, most steps of the process are used for keeping the data on standby and restoring the data, significantly reducing the efficiency of the interruption process.

FIG. 15 shows the constitution of an address generator of a conventional address control system as a sixth example of the prior art published in "TMS32020 User's Manual", issued by Texas Instruments. The sixth example corresponds to a sixth embodiment of the present invention.

Shown in FIG. 15 are a data bus 131 for data transfer, an auxiliary register pointer standby register (ARB) 133, a data path 132 connecting the ARB 133 to the data bus 131, an auxiliary register pointer (ARP) 136, a data standby path 134 extending from the ARP 136, a data path 135 connecting the ARP 136 to the data bus 131, auxiliary registers (AR0, AR1, AR2, AR3, AR4) 138 having five words, a selection signal 137 provided by the ARP 136 to select one of the ARs 138, an indirect address data 139 provided by the AR 138, an address data 140 provided by the AR 138, an arithmetic unit (ARAU) 142 for the auxiliary registers ARs 138, an updated address data 141 produced by updating the address data 140 by the ARAU 142, a data memory page pointer (DP) 143 for the direct address, a data memory page data 144 provided by the DP 143, a multiplexer 145 which multiplexes direct address data (dma) 146 indicated by an immediate value and the data memory page data 144 to generate a direct address, a direct address 147, a selector 148 which selects either the direct address 147 or the indirect address 139, an address output 149, an address control code 150, an auxiliary register pointer control signal 152, a decoder 153 for decoding an address control code and providing a control signal 151 to the ARB 133, a control signal 154 for controlling the ARAU 142, and a control signal 155 for selecting either the direct address 147 or the indirect address 139. FIG. 16 shows the contents of the address control code 150 applied to the address generator of FIG. 15. In FIG. 16, indicated at 157 is an indirect address specifying code and at 158 is a direct address specifying code.

FIG. 17 is a table showing address control codes 150 and the corresponding operations.

The operation of the address generator will be described with reference to FIG. 15, in which the devices will be denoted by abbreviations for simplicity. When an address control code 150 specifying a direct address is applied to the address generator, the decoder 153 provides direct address data 146 indicated by an immediate value of seven bits in the address control code 150. The multiplexer 145 multiplexes the direct address data 146 and data memory page data 144 of nine bits held in the DP 143 to generate a direct address 147. Finally, the selector 148 selects the direct address 147 according to a selection control signal 155 to provide an address 149.

When the address control code 150 applied to the address generator specifies an indirect address, the decoder 153 provides an ARP control signal 152 indicating one of the AR0 to AR4 as an indirect address 139. The selector 148 selects the indirect address 139 according to a selection control signal 155 to provide an address 149. Then, the ARAU 142 executes a predetermined updating process to update the selected AR 138 among the AR0 to AR4 in order to calculate an indirect address data to be used by the next instruction. There are five indirect modes as follows.

1. The AR 138 indicated by the ARP 136 is used as a data memory address.
2. The data memory is accessed for the contents of the AR 138 indicated by the ARP 136, and then the contents are decremented by one.
3. The data memory is accessed for the contents of the AR 138 indicated by the ARP 136, and then the contents are incremented by one.
4. The data memory is accessed for the contents of the AR 138 indicated by the ARP 136, and then the contents of the AR0 138 are subtracted from the contents of the AR 138 indicated by the ARP 136.
5. The data memory is accessed for the contents of the AR 138 indicated by the ARP 136, and then the contents of the AR0 138 are added to the contents of the AR 138 indicated by the ARP 136.

That is, in this example, the indirect addressing modes using the AR0 to AR4 are classified roughly into two operating modes in which the ARAU 142 operates. 1. Ordinary addressing by incrementing or decrementing the AR0 to AR4 by one.
2. Indirect addressing with index modification on the basis of the contents of the AR0.

These addressing modes are considered to be suitable mainly for simplified one-dimensional data addresses for aural signal processing. However, these addressing modes are unable to deal with complex one-dimensional data addresses such as a bit reverse address used for fast Fourier transformation (FFT) stated in C. S. Burrus, T. W. Parks, "DFT/FFT and Convolution Algorithms—Theory and Implementation", John Wily and Sons, 1985. To deal with such an addressing mode, the address must be converted into an address capable of dealing with such an addressing mode by using the ARAU 142 by calculating a desired address by a data operating unit. However, this procedure requires additional data processing time.

Similarly, these addressing modes are unable to deal with two-dimensional address for addressing data of a matrix of n-rows×m-columns. In this case, the data processing time is increased remarkably in many cases because the data operating unit is used for calculating every address. Furthermore, the control code description is complex and the production of a program employing complex control codes is difficult. These problems are disadvantages in application to the image signal processing field in which a large quantity of data needs to be processed at a high data processing speed.

The conventional address control system thus constituted needs to perform the data operating unit for address calculation in many cases when applied to a two-dimensional process such as image signal process and requires complex program softwares for a signal processing algorithm.

FIG. 18 is a block diagram showing the constitution of a multiport memory circuit for a digital signal processor, employing ordinary single-port memories, as a seventh example of the prior art. The seventh example corresponds to a seventh embodiment of the present invention.

Referring to FIG. 18, there are shown a random access memory (RAM) 171, a RAM access unit 190 including an address selector 177, a read/write (R/W) timing control circuit 178 and a bilateral data selector 179, an address signal (AD signal) 172 given from the address selector 177 to the RAM 171, a timing signal 173 for controlling the address selector 177, a timing signal 174 for controlling the data selector 179, a R/W control signal 175 applied to the RAM 171, a data signal (D signal) 176 provided by the RAM 171, an input/output (I/O) unit 189 including address registers (AR1 to AR3) 180 and data registers (DR1 to DR3) 181 respectively connected to ports, a data signal (DP1) 182 at the access port 1, a data signal (DP2) at the access port 2, a data signal (DP3) 184 at the access port 3, a clock signal (CLK) 185, an address signal (AP1) 186 at the access port 1, an address signal (AP2) 187 at the access port 2, and an address signal (AP3) 188 at the access port 3.

FIG. 19 is a time chart showing the timing of operation of the multiport memory circuit of FIG. 18.

The operation of the multiport memory circuit of FIG. 18 will be described hereinafter. This multiport memory circuit has three ports. The address signals AP1, AP2 and AP3 at the ports are applied respectively to the corresponding address registers AR1, AR2 and AR3 at a period one-third the period of the CLK 185. The address selector 177 selects the address registers AR1, AR2 and AR3 in a predetermined sequence in a time sharing mode according to the timing signal 173 from the R/W timing control circuit 178 to provide address signals ADs. The R/W control signal is provided according to a R/W identification signal superposed on the address signals AP1, AP2 and AP3 at the corresponding ports to control the RAM 171 for R/W operation.

Likewise, the data signals DP1, DP2 and DP3 at the corresponding ports are applied respectively to the corresponding data registers DR1, DR2 and DR3 at a period one-third the period of the CLK 185 in synchronism with the address signals AP1, AP2 and AP3. Then, the data selector 179 selects the data registers DR1, DR2 and DR3 in a predetermined sequence in a time sharing mode according to the timing signal 174 provided by the R/W timing control circuit 178 to provide a data signal D. In read operation, the direction of output of data is reversed while the rest of the operations are the same as those for write operation.

The RAM 171 reads the data signal D or writes the data signal D in an address specified by the address signal AD according to the R/W control signal R/W.

Thus, the conventional multiport memory circuit comprises the RAM 171, the RAM access unit 190 and the I/O unit 189 so that the respective ports of the ordinary single-port memories can be accessed in a time sharing mode. The cycle time $t_p$ of each port is given by $$T_p = n \times t_{cy} (\text{sec})$$

where $t_{cy}$ is the cycle time of the RAM 171, and n (an integer not less than one) is the number of access ports. That is, in view of the cycle time $t_p$ of each port, the RAM 171 functions as a multiport memory circuit capable of pseudosimultaneous R/W operation. When the same address is specified by the two different ports for read operation, no problem arises. However, when either port or both the ports are for write operation, in many cases, a known control method sets each port for priority and applies a BUSY signal to the port of lower priority to temporarily forbid access to the same port. FIG. 19 is a time chart of assistance in explaining such a cycle timing operation.

Since the conventional multiport memory circuit is constituted as stated above, the cycle time of each port increases in proportion to the number of access ports and thereby the operating speed of the multiport memory circuit is reduced. Furthermore, the circuit configuration of the conventional multiport memory circuit is complex and the scale of the circuit increases progressively with the increase in the number of access ports.

FIG. 20 shows an eighth prior art and is a block diagram indicating the structure of an address generator based on the address control system of the prior art disclosed, for example, in the "USER's MANUAL TMS32020" issued by Texas Instruments Inc. This exemplary conventional digital signal processor corresponds to an eighth embodiment of this invention.

In this figure, 701 is data bus for data transfer, 702, is data bus to an auxiliary register pointer save register (ARB) 191 from the data bus 701, 191 is auxiliary register pointer save register (ARB), 704 is data save bus extending from auxiliary register pointer (ARP) 192, 705 is data bus between auxiliary register pointer (ARP) 192 and data bus 701, 707 is selection signal to select auxiliary register (AR) 193 from the auxiliary register pointer (ARP) 192, 193 is auxiliary register (AR=AR0-−AR4) providing 5 words, 709 is relative (indirect) address output from auxiliary register (AR) 709, 710 is address data sent from the auxiliary register (AR) 193, 711 is new address data obtained by updating address data 710 in the operation unit only for auxiliary register (ARAU) 194, 195 is data memory page pointer for direct address (DP), 714 is data memory page data output from data memory pointer for direct address (DP) 195, 196 is multiplexer (MUX) which generated direct address 717 by multiplexing the direct address data indicated by immediate value and data memory page data 714, 717 is direct address, 197 is selector which selects direct address 717 and relative address 709, 719 is address output, 720 is address control code, 721 is auxiliary register pointer save register control signal, 722 is auxiliary register pointer control signal, 198 is decoder for decoding address control code 720, 724 is control signal which controls operation unit only for auxiliary register (ARAU) 194, 725 is selection control signal which selects direct address 717 and relative address 709, 726 is data input/output bus between auxiliary register (AR) 193 and data bus 701, 727 is data input/output bus between data memory page pointer for direct address (DP) 195 and data bus 701.

FIG. 21 is a table for explaining operation of address generator of FIG. 20 by the address control code.

Next, operations of address generator of the prior art are explained. In case, the input address control code 720 is designated by direct address, the decoder 198 outputs the direct address data 716 indicated by the immediate value of 7 bits in the instruction code. This direct address 716 and data memory page data 714 of 8 bits held by the data memory page pointer for direct address (DP) 195 are multiplexed by the multiplexer (MUX) 196 to generate the direct address 717. Finally, the selector 197 selects the direct address 717 from the selector 197 with the selection control signal 725 and outputs the address output 719.

Next, in case the input address control code 720 is designated by relative address, one of the auxiliary registers (AR) 193 indicated by the auxiliary register pointer control signal 722 output from the decoder 198 is output as the relative address 709. This is selected by the selector 197 with the selection control signal 725 to output the address output 719. Thereafter, the operation unit only for auxiliary register (ARAU) 194 executes the specified update processing for the one of the selected auxiliary registers (AR) 193 to calculate the relative address 709 to be used by the next instruction. The relative address 709 is used in the following five modes.

1. The auxiliary register (AR) 193 indicated by the auxiliary register pointer (ARP) 192 is used as the data memory address.

2. Access to data memory is made with content of auxiliary register (AR) 193 indicated by the auxiliary register pointer (ARP) 192 and thereafter "1" is subtracted from such content.

3. Access to the data memory is made with content of auxiliary register (AR) 193 indicated by the auxiliary register pointer (ARP) 192.

4. Access to data memory is made with content of auxiliary register (AR) 193 indicated by the auxiliary register pointer (ARP) 192 and thereafter content of auxiliary register (AR0) 193 is subtracted from such content.

5. Access to data memory is made with content of auxiliary register (AR) 193 indicated by the auxiliary register pointer (ARP) 192 and thereafter content of auxiliary register (AR0) 193 is added to such content.

Namely, the addressing using the auxiliary register (AR) 193 is roughly classified into following two kinds in the prior art and these are equivalent to the kinds of calculation of the operation unit only for auxiliary register (ARAU) 194.

A. Ordinary relative addressing by addition of "1"/subtraction of "1" for the auxiliary register (AR) 193

B. Relative addressing with index modification based on content of auxiliary register (AR0)

These address modes can be thought to be suited to the simplified data address among the unidimensional data addresses mainly for voice signal processing.

However, when addressing is carried out for the data on the bidimensional space, the address of leading reference point must be set to the address register and the pipeline of a series of calculations breaks, deteriorating the efficiency.

FIG. 22 shows data series on the bidimensional space and FIG. 23 is a flowchart of addressing operation for the data series of FIG. 22 by the address generator.

In the data series of FIG. 22, it is assumed that the bidimensional data of M data in the horizontal direction and L data in the vertical direction are stored in the data memory with the unidimensional address. It is also considered here that the reference points in the block in such bidimensional data (2m data in the horizontal direction, one—data in the vertical direction) are sampled in the direction of sequential horizontal scanning.

First, the address of the point $P_1$ is initially set to the one auxiliary register AR1 (ARP=1) of the auxiliary registers (AR) 8 as the address register and "2" is set to AR0. For the reference points on the same horizontal line, addressing is carried out depending on the address control mode No. 8 shown in FIG. 23, namely

AR1←AR1+AR0.

However, the address of the leading reference point $P_{m+1}$ of the next line cannot be generated by updating the value of AR1 and must be newly set. Accordingly, a step for calculating the leading address of line using the data calculator and setting it to AR1 is required. The subsequent processings are carried out in the same way as those for the first line. As can be seen in the above processing procedures, it is obvious that the intrinsical calculation processings are intermitted every time the line changes for the secondary data and thereby pipeline efficiency is lowered and processing period increases due to increase of a number of instruction steps.

Since the address control system of the prior art is constituted as explained above, in case it is used for bidimensional signal processing such as processing of video signals, it results in problems that address calculation must be often carried out in the data calculation section and program software of signal processing algorithm is complicated.

SUMMARY OF THE INVENTION

The present invention has been made to solve the problems in the conventional digital signal processor.

Accordingly, it is a first object of the present invention to provide a digital signal processor
having compatible addresses and data format and capable of performing processes having less repetition of the same operation without deteriorating the efficiency,
capable of performing high processes as well as process for product-sum at a high processing speed,
capable of efficiently controlling data operating accuracy by simple means,
capable of applying vector data to and providing vector data from an arithmetic unit at a high speed, and
capable of highly flexible addressing.

It is a second object of the present invention to provide a digital signal processor of a signal processing system capable of performing a conditional test instruction process or the like in a reduced number of steps and capable of performing a conditional test instruction process in a fixed execution time regardless of the result of the conditional test instruction process.

It is a third object of the present invention to provide a digital signal processor of a signal processing system capable of performing a multipoint process without entailing reduction in the processing speed and increase in instruction steps.

It is a fourth object of the present invention to provide a flexible digital signal processor capable of readily changing the program on instruction from a host processor and capable of performing complex processes and other temporary processes without requiring much additional hardware and without entailing the deterioration of the processing efficiency.

It is a fifth object of the present invention to provide a digital signal processor of an interrupt process system capable of performing interruption processes at a high efficiency by quickly responding to an interruption request and quickly keeping data on standby and quickly restoring data.

It is a sixth object of the present invention to provide a digital signal processor incorporating a highly functional address generating circuit having a comparatively short control code bit length and a simple circuit configuration and capable of dealing with two-dimensional signal processing such as image signal processing, and capable of efficiently executing a simple program software for two-dimensional signal processing requiring complex address calculation.

It is a seventh object of the present invention to provide a digital signal processor incorporating a multiport memory circuit of a comparatively simple and small-scale circuit configuration having a short cycle time for each port.

Finally, it is an eighth object of the present invention to provide a digital signal processor with an address generating system for signal processing comprising multifunction address generator intended for two-dimensional signal processing such as video signal processing by employing comparatively short control code bit length and simplified circuit structure.

To achieve the foregoing objects of the invention, the present invention has the following constitution, functions and features.

A digital signal processor according to the present invention has a five-stage constitution including, in addition to an instruction execution pipeline stage, a stage for reading data from a data memory and applying the data to an arithmetic unit and a stage for writing data provided by the arithmetic unit in the data memory, or accumulating or rounding the data by an accumulator included in the arithmetic unit, a barrel shifter, a multiplier and an arithmetic and logic unit respectively for the execution stage of the five stages are arranged on the same line in the arithmetic unit, a normalizing barrel shifter for write/accumulation state is connected to the barrel shifter, the multiplier and the arithmetic and logic unit to use the outputs of the normalizing barrel shifter as inputs of an adder for rounding or accumulation or as the outputs of the arithmetic unit, an internal memory comprises two 2-port memories, one of the ports, namely, the read port, of each 2-port memory is connected to the corresponding two input buses of the arithmetic unit and the other port, namely, the read/write port, of the same is connected to one of the output bus of the arithmetic unit or to a DMA transfer bus, an address generating unit which generates 2-input 1-output data memory addresses two-dimensionally and in parallel for the arithmetic unit and a DMA control unit for two-dimensionally transferring data between the internal data memory and an external data memory by using the DMA bus are provided for the instruction execution stage, and the respective data formats of the address generating unit, the DMA control unit and the arithmetic units are compatible with each other.

The digital signal processor according to the present invention specifies the operations of the arithmetic unit uniquely and operates on microinstruction codes constructed by combining function codes corresponding to the operations of the arithmetic unit and 2-source and 1-destination control codes corresponding to the normalizing barrel shifter, the two inputs and one output.

Thus, the instruction execution pipeline stage of the present invention eliminates most of a microinstruction description taking into consideration delayed operation and is able to operate efficiently even when the frequency of repetition of execution of the same instruction is not very large.

The arithmetic unit of the digital signal processor according to the present invention performs the calculation of one term of product-sum, absolute differential sum and differential square sum, and rounding and shift of data in a time equivalent to one machine cycle. The internal data memory and the bus construction enables execution of 2-input and 1-output data transfer to the arithmetic unit in parallel to arithmetic operation, and the combination of the internal data memory, the bus construction and the address generator for two-dimensional address generation enables efficient operation of vector data.

Since the data format of the address generator is compatible with that of the arithmetic unit, data conversion is unnecessary, for example, in table look-up and reference to a dictionary.

The DMA control unit performs two-dimensional data reception from the external data memory in parallel with the internal operation to curtail processing time for data input and output effectively.

The microinstruction set used by the present invention specifies the combination of the operations of internal H/W resources uniquely to simplify the program description, and specifies the number of digits of data and source destination address generating formula for each microinstruction to enable the direct control of the digit adjustment for complex data operation and the method of scanning the data memories. Accordingly, the necessity of considering the context of the instruction is limited to the least extent, the program description is simplified, and the program can easily be described in a high level language such as C language.

Furthermore, the digital signal processing method and digital signal processor according to the present invention is characterized in performing operation according to a decoded instruction in executing the instruction, subjecting the result of operation, on conditional test instruction, to a test to decide whether or not the result of operation meets a predetermined condition, and sequentially holding the results of tests in a register. Accordingly, the digital signal processing method and digital signal processor according to the present invention decides, on a conditional test instruction, whether or not a condition code meets a predetermined condition, and then stores only the result of decision in a special register.

The digital signal processor according to the present invention has a plurality of conditional decision units and branched addresses for conditions meeting branching conditions among the results of tests provided by the condition decision units selected in order of priority. Accordingly, a plurality of condition decision operations are performed simultaneously for different branching conditions by the plurality of condition decision units, and then branched addresses for the results of decision meeting the branching conditions are selected in order of priority for multipoint branching process.

Still further, the digital signal processor according to the present invention incorporates a writable instruction memory as an internal instruction memory, and is controlled by instructions provided by a host processor for temporary stop and restart of operation, and for writing in and reading from the writable instruction memory. Accordingly, the operation of the digital signal processor is stopped temporarily by the host processor, and the operation of the digital signal processor is restarted for other process after the internal instruction memory of the digital signal processor has been rewritten.

Moreover, an interruption processing system according to the present invention switches working registers at least of a dual construction of the digital signal processor for keeping data on standby and restoring the data required for an interruption process. Accordingly, all the working registers at least of a dual construction accomplish data standby and data restoration automatically and simultaneously by switching the registers. The interruption process can be performed at any time by forming the registers which cannot be operated directly by instructions, such as a pipeline register, in the same construction.

Furthermore, a signal process address control system according to the present invention performs relative and indirect addressing by using an address displacement indicated by an immediate value in a control code, in addition to index modify addressing by the combination of an address register and an index modify register, and enables immediate addressing for every instruction in the field of a horizontal microinstruction. Accordingly, relative and indirect addressing according to the present invention generates a two-dimensional address efficiently in an optional combination with an index modify addressing, and executes a complex two-dimensional signal processing algorithm efficiently through immediate addressing in each horizontal microinstruction.

The present invention constitutes a multiport memory circuit having more than three ports by employing a plurality of 2-port memory circuits, and the ports are selected by addressing. Accordingly, the output port of the 2-port memory circuit is selectively connected to an access port so that the memory circuit operates in a mode equivalent to that of operation of a multiport memory circuit.

The address generating system for signal processing of the present invention makes relative addressing depending on the address displacement indicated by an intermediate value in the control code in addition to the index modification address through combination of the address register and index modification register and also intermediately carries out address designation for every microinstruction in the relevant field among the horizontal microinstructions.

BRIEF DESCRIPTION OF THE DRAWINGS

FIG. 10 is a time chart of assistance in explaining the execution of a conditional branch instruction by the conventional digital signal processor of FIG. 9;

FIG. 17 is a table showing the control codes of FIG. 16 and the corresponding operations of the address generator of FIG. 15;

FIG. 21 is a table for explaining operations by address control code of address generator of FIG. 20;

FIG. 43 is a flow chart showing steps of operation of the interruption processing system of FIG. 38;

FIGS. 45(a) and 45(b) are diagrams showing an example of a control code for controlling the address generator of FIG. 44;

FIG. 46 is a table of assistance in explaining operation controlled by the control code of FIG. 45;

FIGS. 53(a) and 53(b) are examples of address control code in the address generator of FIG. 51;

DETAILED DESCRIPTION OF THE PREFERRED EMBODIMENTS

The preferred embodiments of the present invention will be described hereinafter with reference to the accompanying drawings.

Figure 24:
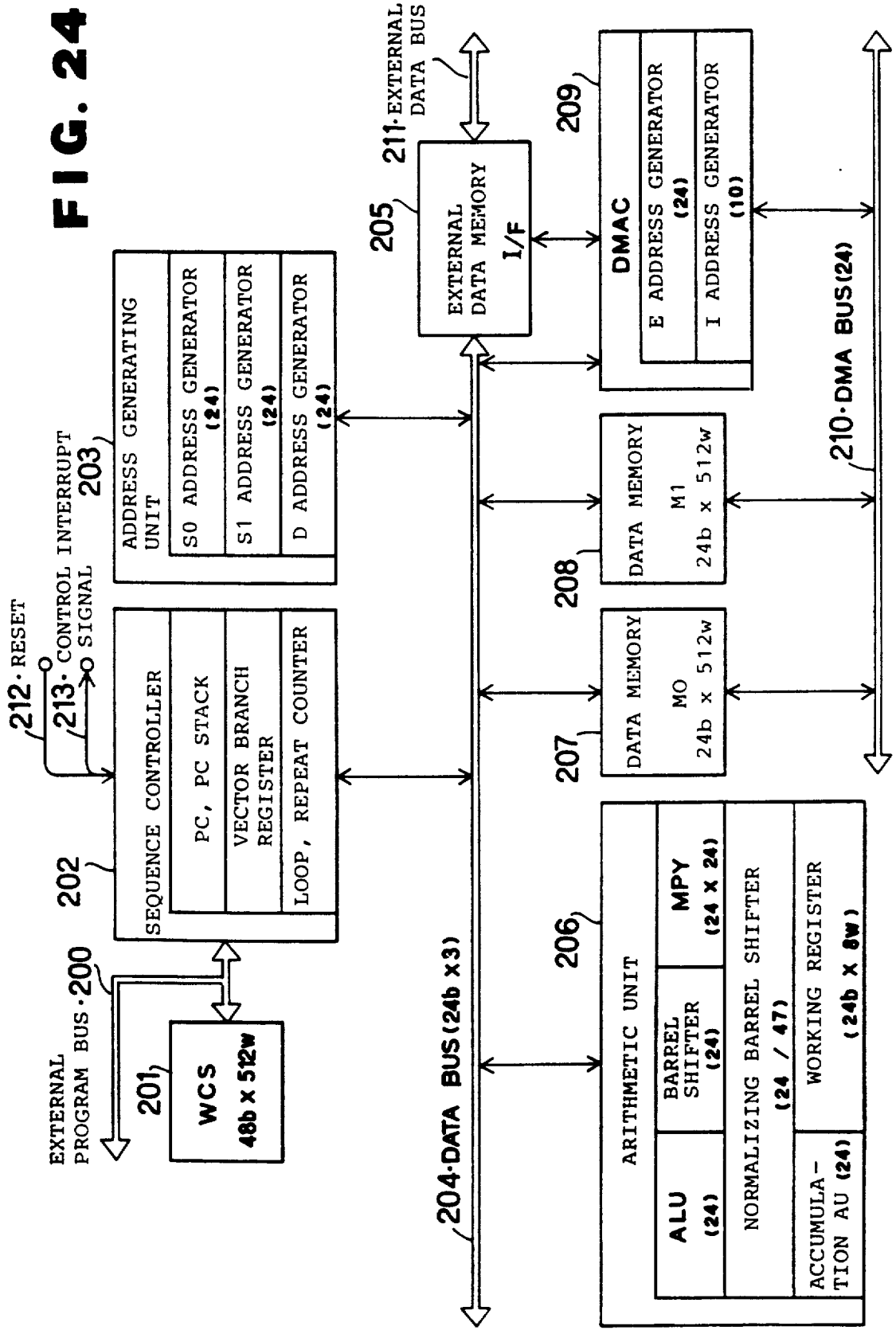
FIG. 24 is a block diagram of a digital signal processor, in a first embodiment, according to the present invention.

Referring to FIG. 24 showing a digital signal processor, in a first embodiment, according to the present invention, there are shown an external bus 200 connecting the digital signal processor to an external extension microinstruction memory, an internal writable instruction memory (WSC) 201, a sequence control unit 202 which receives a microinstruction read through the external program bus 200 or from the WCS 201 and performs predetermined control operation in an instruction execution pipeline, an address generating unit 203 which generates 2-input 1-output addresses in parallel for data memories, three internal data buses 204 each having a width of twenty-four bits, for the parallel transfer of the 2-input 1-output data, an external bus 211 connected to an external extension data memory, an external data memory (I/F) 205 for selectively connecting one of the three internal data buses 204 to the external data bus 211, an arithmetic unit 206 which performs predetermined operations, connected to the three internal data buses 204, an internal data memory (M0) 207 having one read port and one read/write port and connected to the internal data buses 204, an internal data memory (M1) 208 similar to the M0 207, connected to the internal data buses 204, a DMA control unit 209 individually provided with an external data memory address generator and an internal data memory address generator, a DMA bus 210 for DMA transfer between the external data bus 211 and M0 207 and M1 208, a reset terminal 212 through which an external reset signal is applied to the sequence control unit 202, and an interrupt terminal 213 to which an external interrupt control signal is applied.

Figure 20:
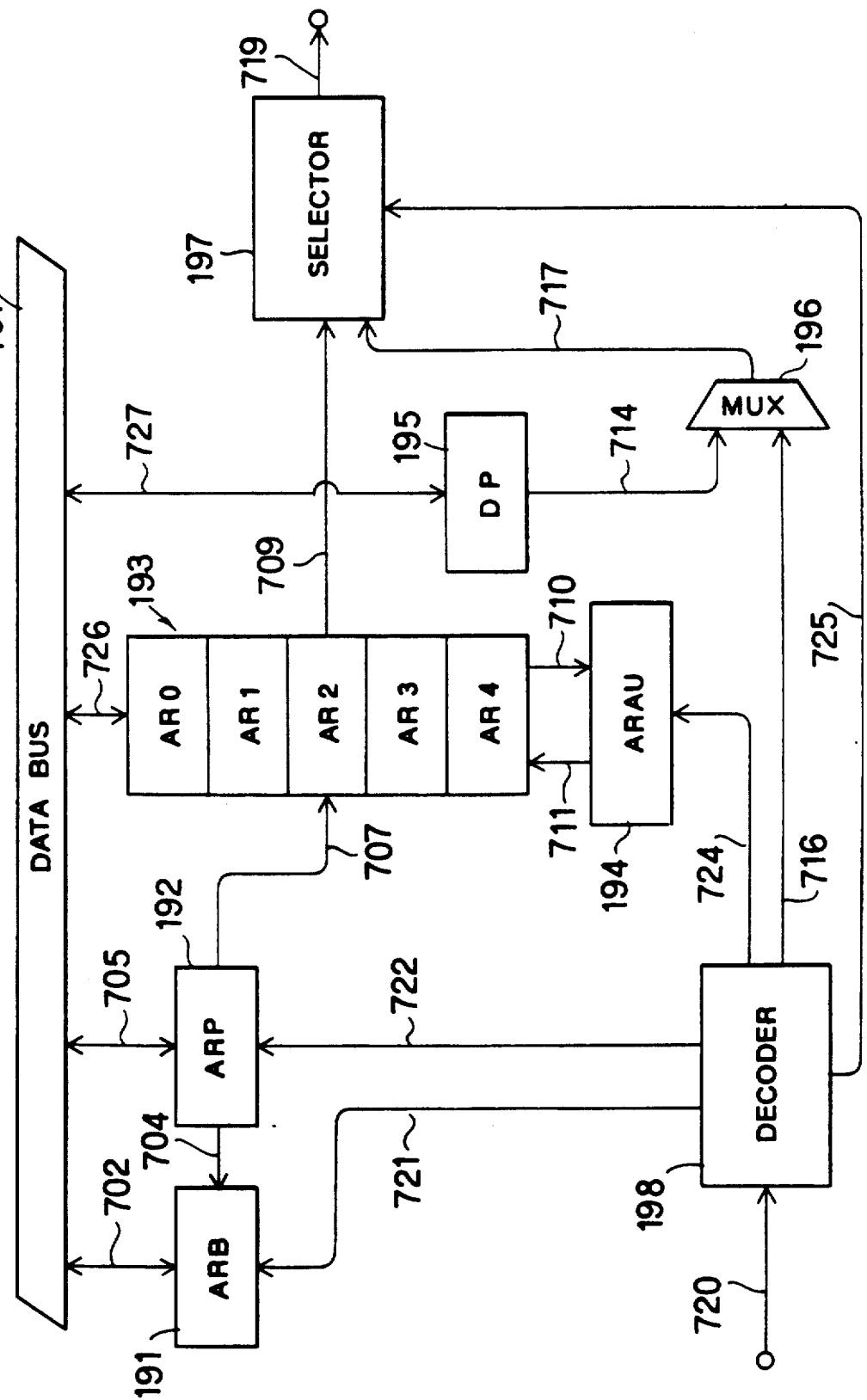
FIG. 20 is a block diagram indicating the structure of address generator based on the address control system of the prior art.
Figure 25:
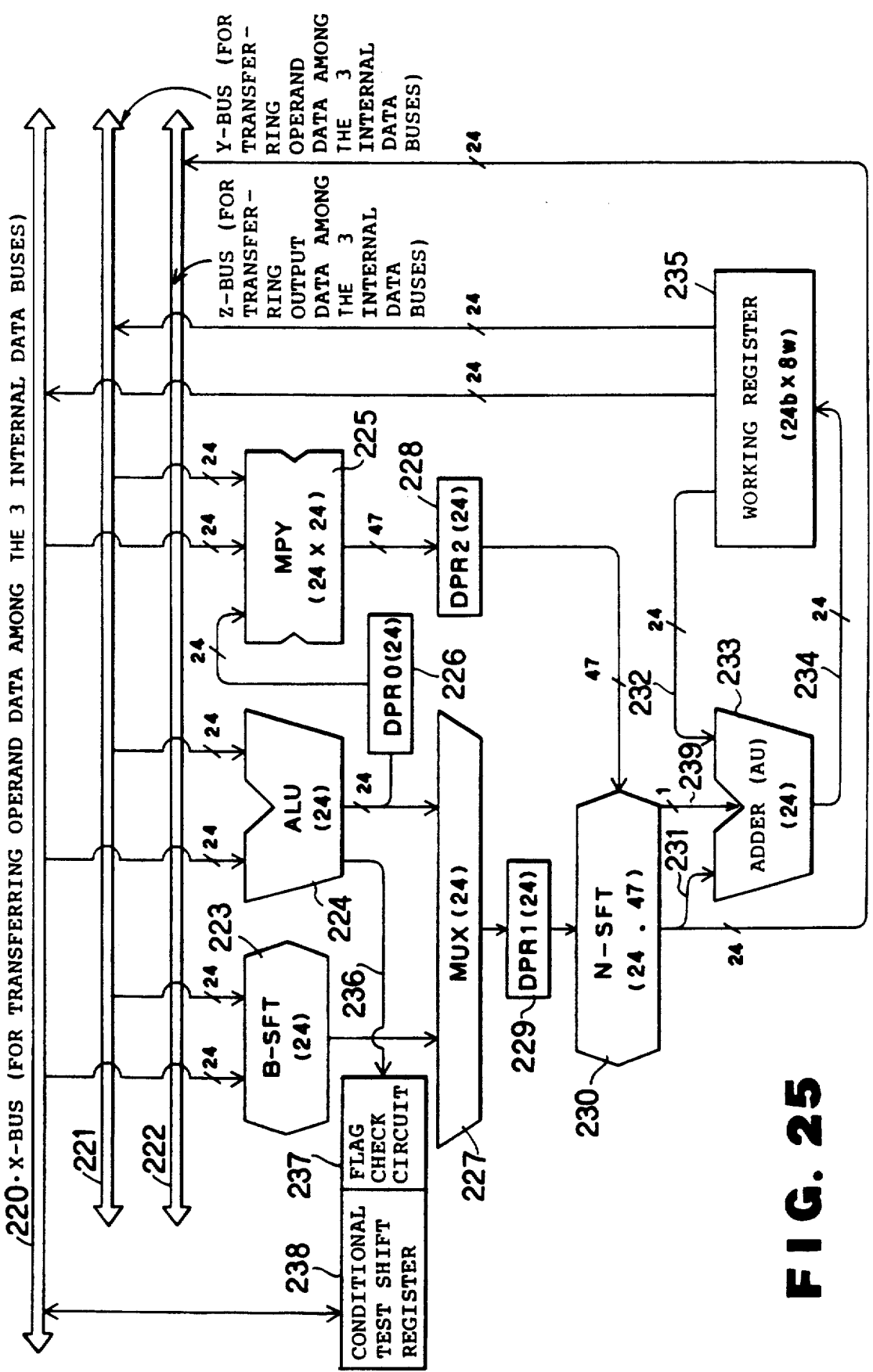
FIG. 25 is a block diagram of an arithmetic unit incorporated into the digital signal processor of FIG. 20.

Referring to FIG. 25 showing the constitution of the arithmetic unit 206 of FIG. 20, there are shown an X-bus 220 for transferring operand data among the three internal data buses 204, a Y-bus 221 for transferring operand data among the three internal data buses 204, a Z-bus 222 for transferring output data among the three internal data buses 204, a barrel shifter (B-SFT) 223 having a word length of twenty-four bits, for shifting or rotating input data by a predetermined number of bits in one machine cycle, an arithmetic and logic unit (ALU) 224 having a word length of twenty-four bits which performs a predetermined arithmetic and logical operation or absolute difference calculation in one machine cycle, a multiplier (MPY) 225 which performs multiplication of twenty-four bits and provides the result of forty-seven bits of multiplication in one machine cycle, a data pipeline register (DPR0) 226 which holds the output difference of the ALU 224 temporarily and applies the output difference to the square input port of the MPY 225 to calculate a square difference, a multiplexer 227 which selects either the 24-bit output of the B-SFT 223 or the 24-bit output of the ALU 224, and applies the selected output to a data pipeline register (DPR1) 229 for temporarily holding the output of the multiplexer 227, a data pipeline register (DPR2) 228 for temporarily holding the 47-bit output of the MPY 225, a normalizing barrel shifter (N-SFT) 230 which selectively receives either the 24-bit data provided by the DPR1 229 or the 47-bit data provided by the DPR2 228, operates the received data for predetermined digit adjustment in half the machine cycle to provide a 24-bit data, a 24-bit output 231 of the N-SFT 230, a working register (Wr) 235 of 24-bit×8-word constitution, a 24-bit accumulation output 232 of the Wr 235, an adder (AU) 233 for accumulation and round-off, a 24-bit output 234 of the AU 233, a flag output 236 of the ALU 224, a flag check circuit 237 for the conditional test of the flag output 236, a conditional test shift register (tcsr) 238 of 24×1 bits for sequentially storing the 1-bit outputs of the flag check circuit 237, namely, the results of decisions of the flag check circuit 237, and a 1-bit carrier 239 which provides the highest bit shifted out when the N-SFT 230 provides a shift instruction for shifting in the LSB direction, namely, right shift.

Figure 26:
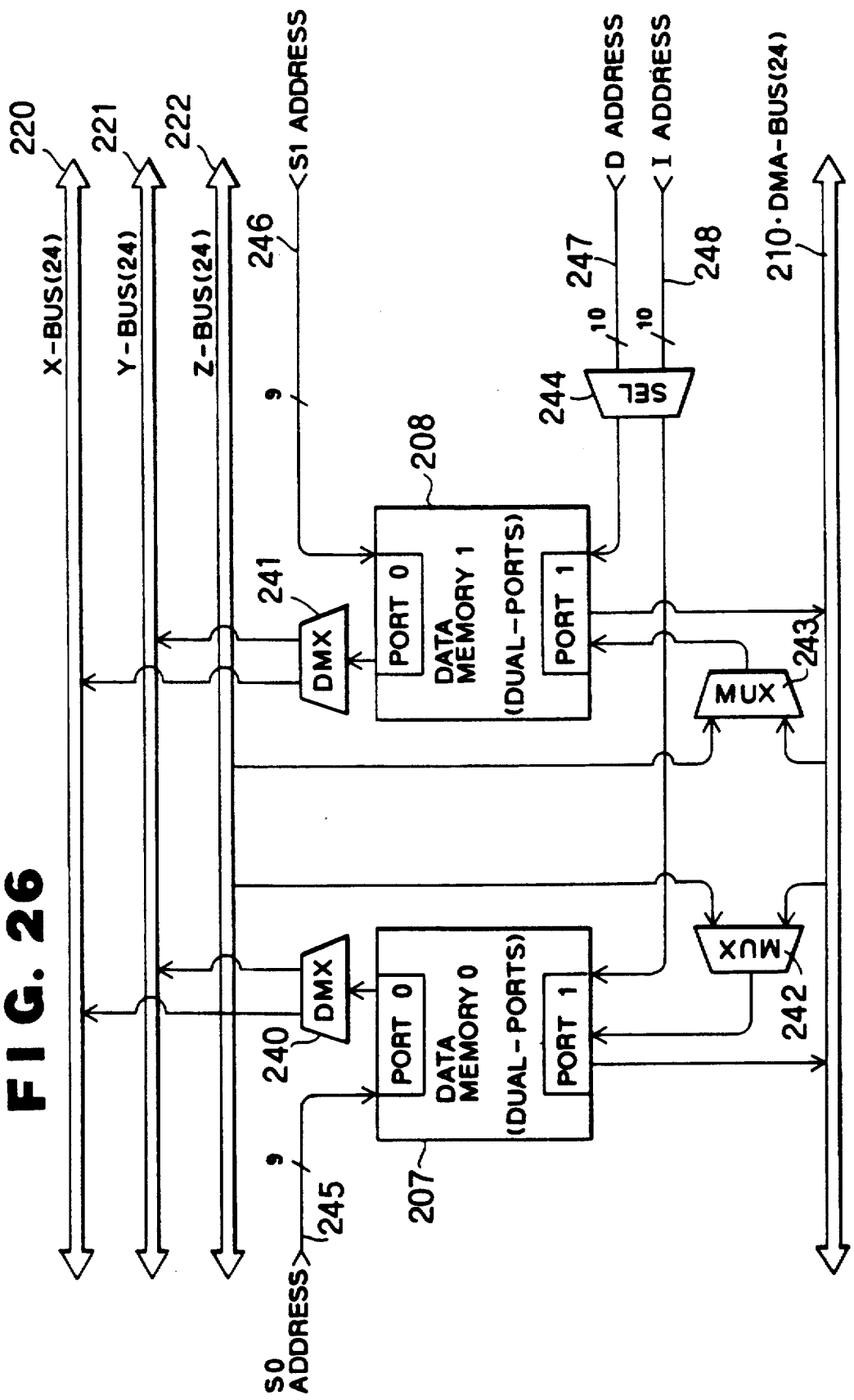
FIG. 26 is a diagrammatic illustration showing the constitution of an internal data memory incorporated into the digital signal processor of FIG. 24.

FIG. 26 illustrates the relation between the internal data memories and internal data buses of the digital signal processor of FIG. 24. Shown in FIG. 26 are a multiplexer 240 which applies a 24-bit data at the read port of the M0 207 selectively to the X-bus 220 or the Y-bus 221, a multiplexer 241 which applies a 24-bit data at the read port of the M1 108 selectively to the X-bus 220 or the Y-bus 221, a multiplexer 242 which selects either write data on the DMA bus 210 or write data on the Z-bus 222 and applies the selected data to the read/write port of the M0 207, a multiplexer 243 which selects either write data on the Z-bus 222 or write data on the DMA bus 210 and applies the selected data to the read/write port of the M1 208, a 2—2 addressing selector 244 which applies a write address D address 247 and an internal data memory address I address 248 provided by the sequence control unit 202 selectively to either the read/write port of the M0 207 or the read/write port of the M1 208, an S0 address 245, i.e., the read port address of the M0 207, an S1 address 246, i.e., the read port address of the M1 208, a write address 247 for the M0 207 or the M1 208, and an I address, i.e., an internal memory address, corresponding to data transferred through the DMA bus 210.

Figure 27:
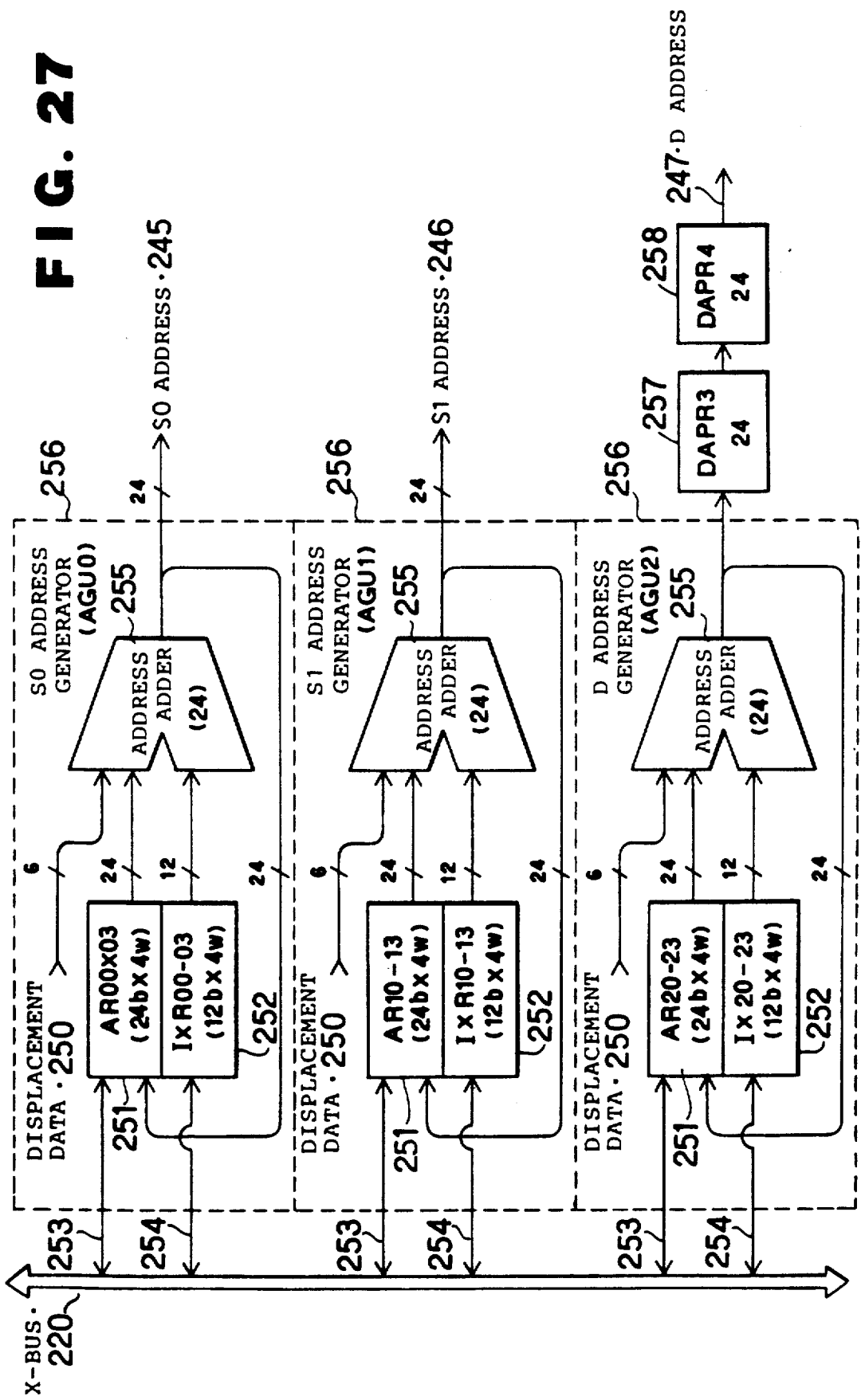
FIG. 27 is a diagrammatic illustration showing the constitution of an address generator incorporated into the digital signal processor of FIG. 20.

FIG. 27 illustrates the constitution of the address generating unit 203 of FIG. 27. Shown in FIG. 24 are displacement data 250 indicated by an immediate value included in a microinstruction given to the sequence control unit 202, a 24-bit×4-word address register (AR) 251, a 12-bit×4-word index modify register (IXR) 252, a data I/O bus 253 connecting the AR 251 to the X-bus 220, a data I/O bus 254 connecting the IXR 252 to the X-bus 220, an address adder 255 of 24-bit word length, three individual address generators (AGUs) 256, a write address pipeline register (DAPR3) 257 for delaying a 24-bit write address by one machine cycle, and a write address pipeline register (DAPR4) 258 similar to the DAPR3 257.

Figure 28:
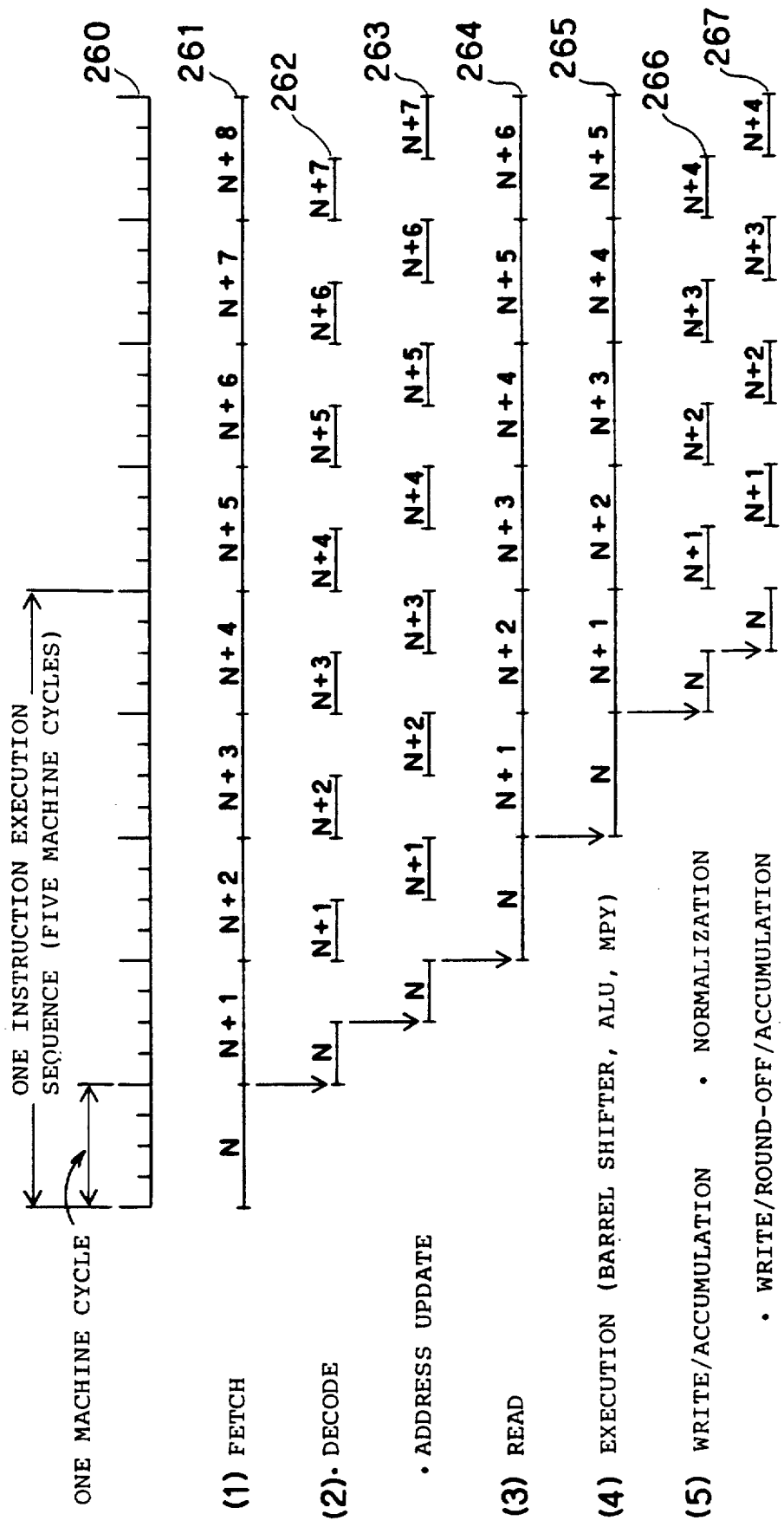
FIG. 28 is a time chart of assistance in explaining the timing of operations of the digital signal processor of FIG. 20.

FIG. 28 is a diagram of assistance in explaining an instruction execution pipeline of 5-stage construction of the digital signal processor of FIG. 24. In FIG. 28, there are shown a four-phase machine cycle 260, a fetch stage 261, a decode stage 262, an address update timing 263 in the latter half of the decode stage, a read stage 264, an execution stage 265, a write/accumulation stage 267, and normalizing timing 266 in the former half of the write/accumulation stage 267.

Figure 29:
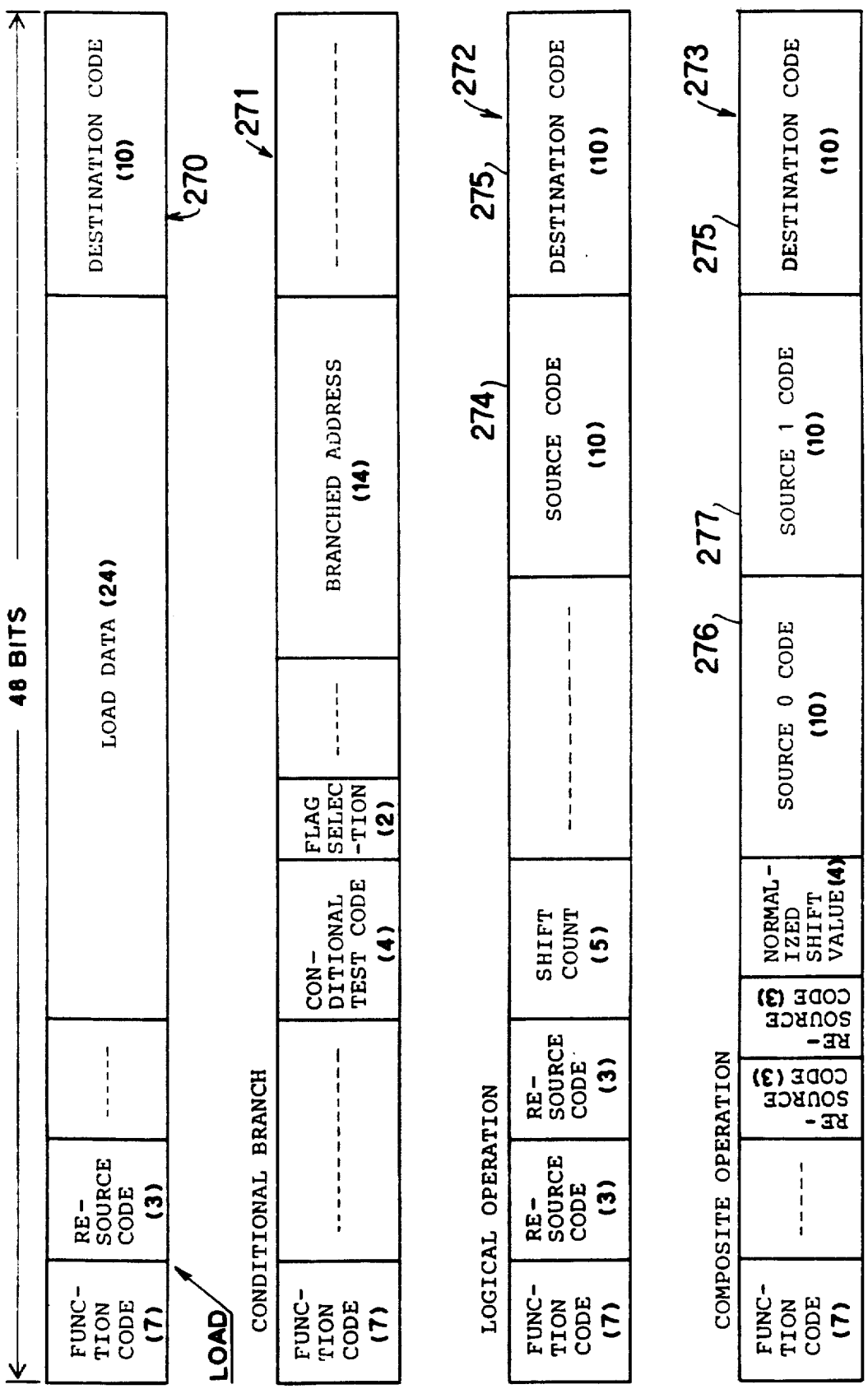
FIG. 29 is a diagram of an example of a microinstruction set to be executed by the digital signal processor of FIG. 20.

FIG. 29 shows part of a microinstruction set for the digital signal processor of FIG. 24. Shown in FIG. 29 are a load instruction 270, a branch instruction 271, a 1-source operation instruction 272, a 2-source operation instruction 273, a source specifying code 274, a destination specifying code 275, a source 0 specifying code 276, and a source 1 specifying code 277.

The operation of the digital signal processor will be described hereinafter, in which the components are denoted by the abbreviations.

First the general mode of operation of the digital signal processor will be described briefly with reference to FIG. 24. The digital signal processor of the present invention, like the conventional digital signal processor, is provided separately with the program bus 200 and the data bus 204, for the parallel execution, on microinstructions, of application of a microinstruction to the sequence control unit 202, data input and output of the arithmetic unit 206 through the data bus 204, parallel generation of 2-input 1-output data addresses by the address generating unit 203, and access of M0 207, M1 208 and the I/F 205 to the external data memory. The DMA control unit 209 implements data DMA transfer through the DMA bus 210 between the M0 207, M1 208 and the I/F 205 independently of the internal operation. Each execution unit, like that of the conventional digital signal processor, is of register base. In this digital signal processor, the instruction execution pipeline includes data input and output stages because most instructions do not require delayed operation. Accordingly, in implementing addition, for example, by the arithmetic unit 206, an addition instruction including input and output may be executed by a microinstruction of one step. Consequently, even in a program including various arithmetic operations in combination, one microinstruction can be executed in a time equivalent to one machine cycle.

However, the result of execution of an instruction can be used after three instruction steps corresponding to the difference in the number of stages from the read stage of the next instruction. This digital signal processor executes most operations for providing results which need to be used immediately in combinational operations by one instruction to avoid loss.

Accordingly, most programs do not suffer from loss. The arithmetic unit 206 and the address generating unit 203 are the same in data word length and format, and are perfectly compatible with each other.

Therefore, in processes such as a table look-up process and a dictionary reference process, the result of operation can directly be converted into a data memory address.

Functions of the arithmetic unit 206 will be described hereinafter with reference to FIG. 25. The B-SFT 123, the ALU 224 and the MPY 225 are able to operate in one machine cycle and operate in an execution stage among instruction execution pipeline stages. In the next stage, i.e., a write/accumulation stage, the N-SFT 230 is able to perform digit adjustment and applies the result 231 to the Z-bus 222 to write the result in the data memory, or the AU 233 is able to accumulate or round off the contents 232 of the Wr 235 to write the result 234 of accumulation or round-off in the Wr 235. The DPR1 229 and the DPR2 228 are registers to transfer the results to the next stage. Thus, the combinational operation are performed in the following manner.
Product-sum: MPY 225→DPR 228→N-SFT 230→AU 233→Wr 235
Absolute difference sum: ALU 224→MUX 227→DPR1 229→N-SFT 230→AU 233 →Wr 235
Difference square sum: ALU 224→DPR0 226→MPY 225→DPR2 228→N-SFT 230 →AU 233→Wr 235

The difference square sum is obtained by the delayed operation of the DPR0 226. However, this instruction is used continuously in most cases and hence problems attributable to the instruction are negligible.

The digital signal processor performs rounding by the following procedure.

```
        MSB                          LSB
(1) 0000 0000 1111 1111 1010 0111  : DPR1 229
                                     Output 24 bits
(2) 0000 0000 0000 0000 1111 1111  : N-SFT 230
                                     Output (Right
                                     8-bit shift)
                                1  : Carry 239
(3) 0000 0000 0000 0001 0000 0000  : AU 233 Output
                                     234
                                     Carry addition
```

Thus, the highest bit of data shifted out by the N-SFT 230 is a carry and the AU performs carry addition to round-off the data, and hence the destination of the result of round-off is limited to the Wr 235.

Then, the flag check circuit 237 checks the flag 236 indicating the result of comparison operation of the ALU 224 with reference to a condition code specified by a microinstruction and provides a flag of one bit indicating that the condition is met or that the condition is not met. Flags provided by the flag check circuit 237 are set sequentially in the tcsr 238. For example, in determining the maximum value and the minimum value among two input data, the process of selection of either data can be stored. The lateral arrangement of the contents of the tcsr 238 from MSB to LSB corresponds to an index code in binary tree search.

The constitution of the internal data memories will be described hereinafter with reference to FIG. 26. The M0 207 and the M1 208 are 24-bit×512-word 2-port RAMs. In applying two input data in parallel to the arithmetic unit 206, the outputs at the respective read ports of the M0 207 and the M1 208 are provided on the X-bus 220 and the Y-bus 221 respectively through the selectors 240 and 241. At this time, an S0 address 245 and an S1 address 246 are given respectively to the M0 207 and the M1 208. Furthermore, when both the source and destination are data memories as in vector addition: $\bar{A}+\bar{B}\to\bar{C}$, data is applied from the Z-bus 222 through the MUX 242 or the MUX 243 to the read/write port of the M0 207 or the M1 208. Therefore bus contention does not occur in the internal operation.

The constitution of the address generating unit 203 will be described hereinafter with reference to FIG. 27. The address generating unit 203 comprises the three AGUs 256, namely, the S0 address generator (AGU0) 256, the S1 address generator (AGU1) 256 and the D address generator (AGU2) 256. Each AGU 256 has the 24-bit×4-word AR 251 and the 12-bit×4-word IXR 252. The address adder 255 adds three terms of the displacement 250, the AR 251 and the IXR 252 for two-dimensional address generation.

Although the AGU 256 operates in the decode stage, there is a stage difference corresponding to two stages between the decode stage and the write/accumulation stage. Therefore, the D address 247 is provided by the AGU2 after being delayed by two machine cycles by the DAPR3 257 and the DAPR4 258. The ARs 251 and the IXRs 252 are connected to the X-bus 220. The data format of the address generating unit 203 is compatible with that of the arithmetic unit 206. Accordingly, in table look-up, for example, data may be transferred directly from the Wr 235 through the X-bus 220 to the AR 251 and may be provided without changing the S0 address 245 or the S1 address 246.

The instruction execution pipeline of the digital signal processor will be described with reference to FIG. 28. The instruction execution pipeline comprises the following five stages for one instruction.

(1) Fetch stage 261
Output of the program counter and reading a microinstruction of one word (48 bits)

(2) Decode stage
Decoding 262 the microinstruction and address update 263

(3) Read stage 264
Reading source data from data memories or registers through the X-bus 220 and the Y-bus 221

(4) Execution stage 265
Operation of the B-SFT 223, the ALU 224 and the MPY 225

(5) Write/accumulation stage
Normalization 266 by the N-SFT 230, and round-off/accumulation by the AU 233 or writing data in the data memory In the write/accumulation stage (5), the output of the AU 233 is stored only in the Wr 235, and the Z-bus 222 and the AU 233 are in an exclusive relation in which the AU 233 is not used when the Z-bus is used, and hence the timing 267 of data write through the AU 233 is the same as that of data write through the Z-bus 222.

Since the instructions are executed in the foregoing sequence, consideration of complex delay in producing a program is practically unnecessary, and hence an efficient microprogram can be produced by using a high language compiler.

FIG. 29 shows examples of microinstruction sets used by the digital signal processor of the present invention. All the microinstruction sets are 1-word horizontal instruction sets of a word length of 48 bits. The instruction set is not used for the parallel specification of internal resources capable of simultaneous operation. The combination of the resource operations in each stage is specified by a function code according to the instruction. Thus, microinstruction description is simplified.

The instruction sets are classified roughly into a load 270, a branch 271, a 1-source operation 272 and a 2-source operation 273. A source code 274 for controlling source destination, a destination code 275, a source 0 code 276 and a source 1 code 277 are set corresponding to the function code. When the data memories are the objective controlled elements, these codes are addressing codes for specifying the corresponding AGUs 256 of the address generating unit 203. The AGUs are identified by resouce codes. The addressing mode can be changed over and the setting of normalization shift value can be changed for every operation instruction by using the instruction set, so that a complex signal processing algorithm can be programmed at the least loss.

Figure 1:
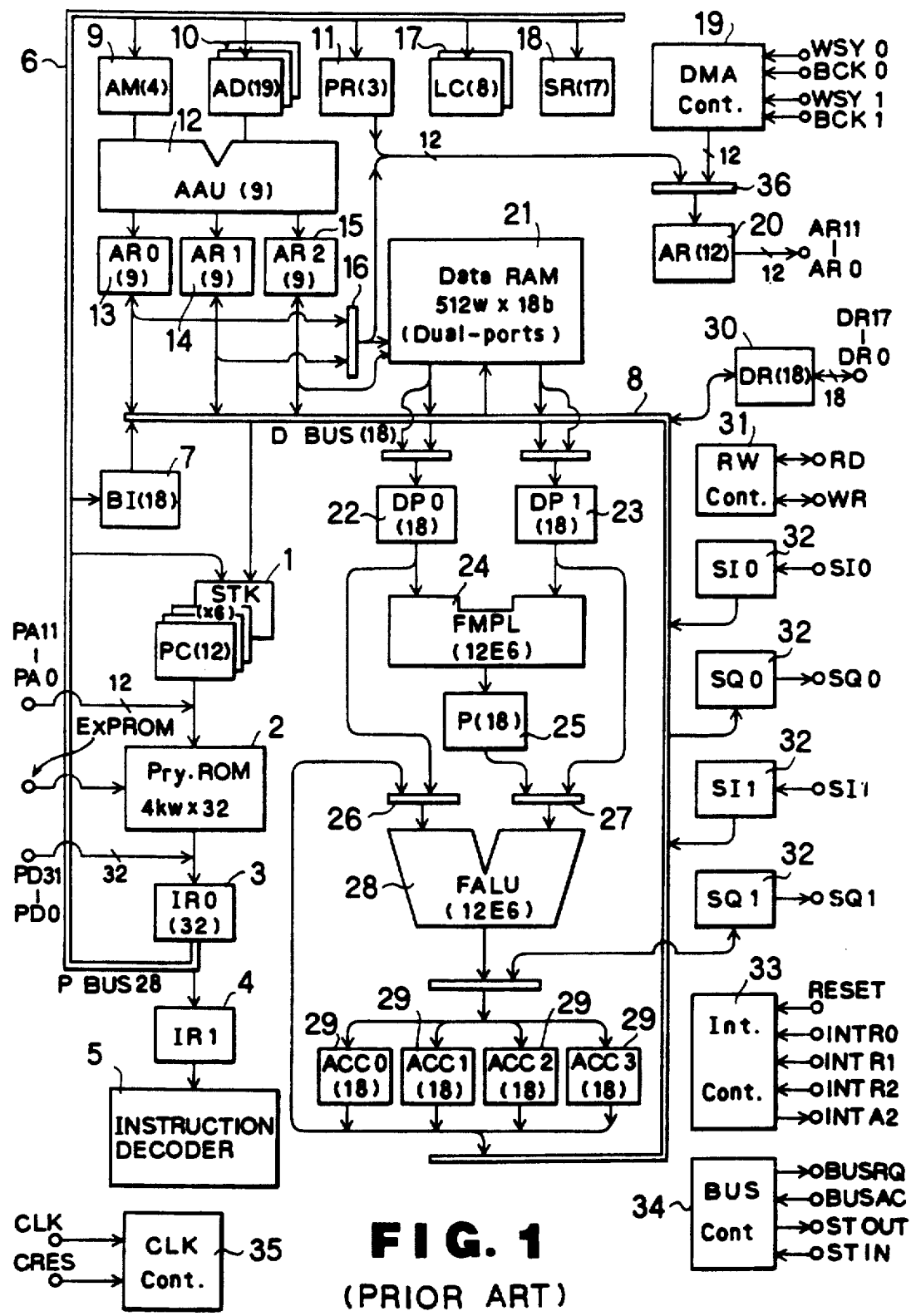
FIG. 1 is a block diagram showing the constitution of a DSSP1 as a first example of a conventional digital signal processor.
Figure 2:
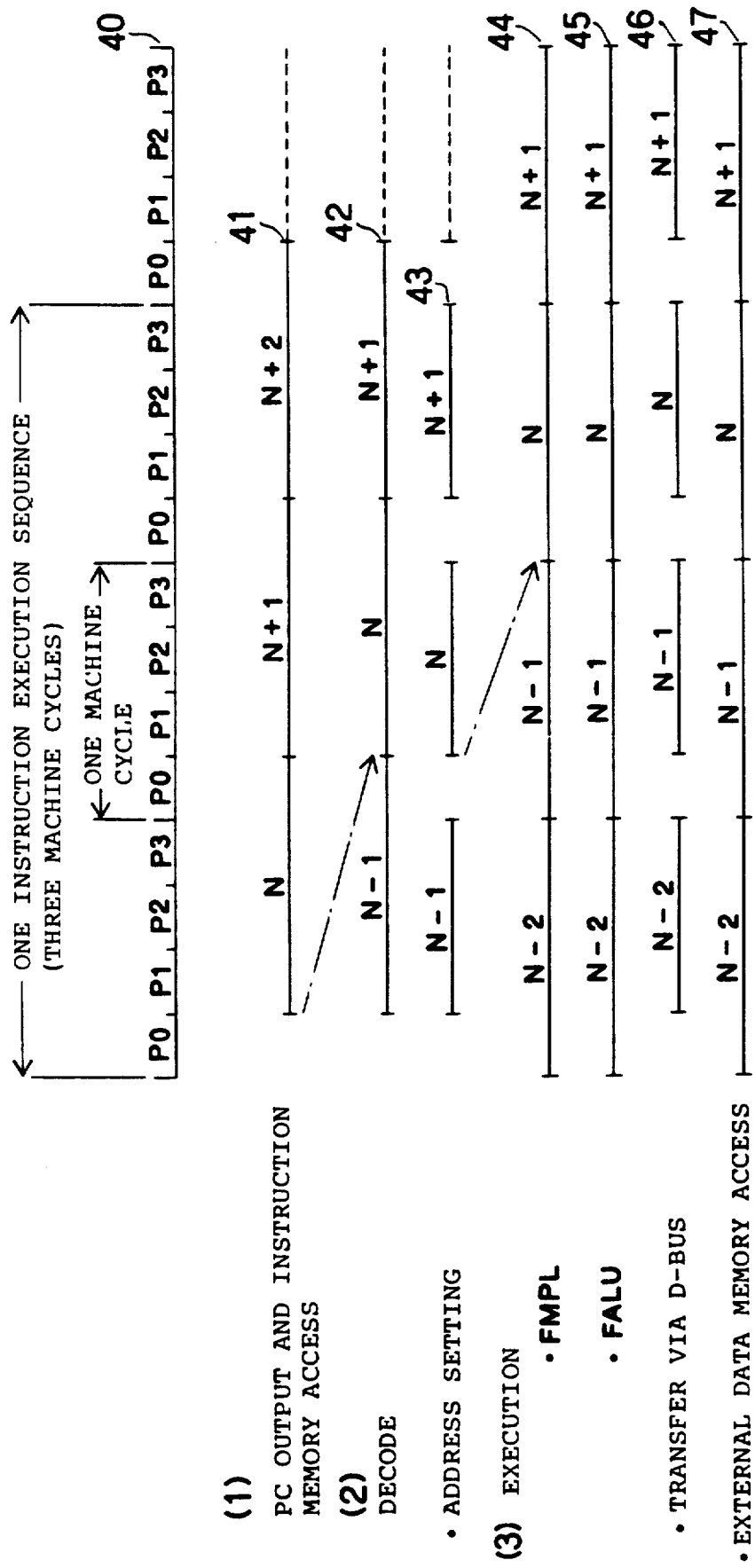
FIG. 2 is a time chart of assistance in explaining the instruction execution timing of the DSSP1 of FIG. 1.
Figure 3:
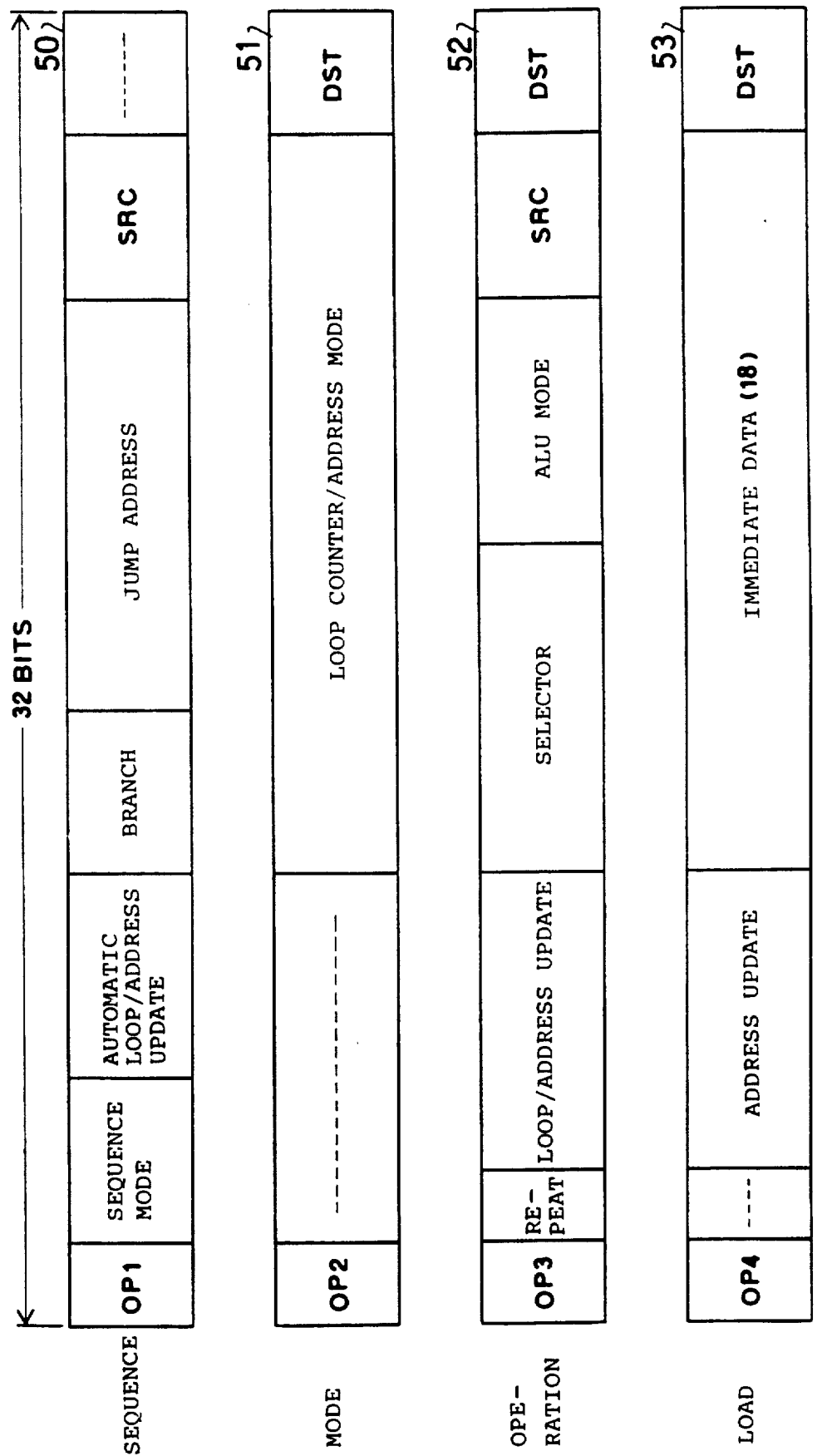
FIG. 3 is an illustration of a microinstruction set to be executed by the DSSP1 of FIG. 1.
Figure 4:
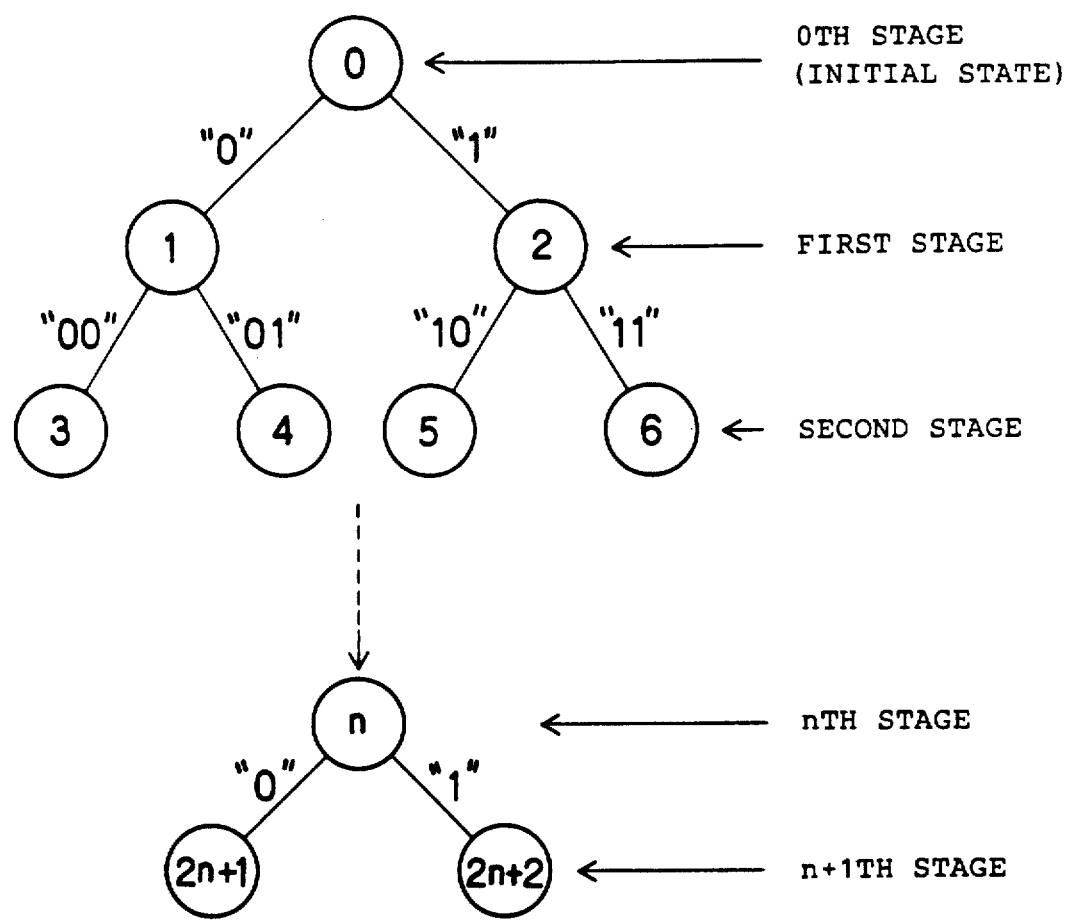
FIG. 4 is a diagram of assistance in explaining binary tree search operation.
Figure 5:
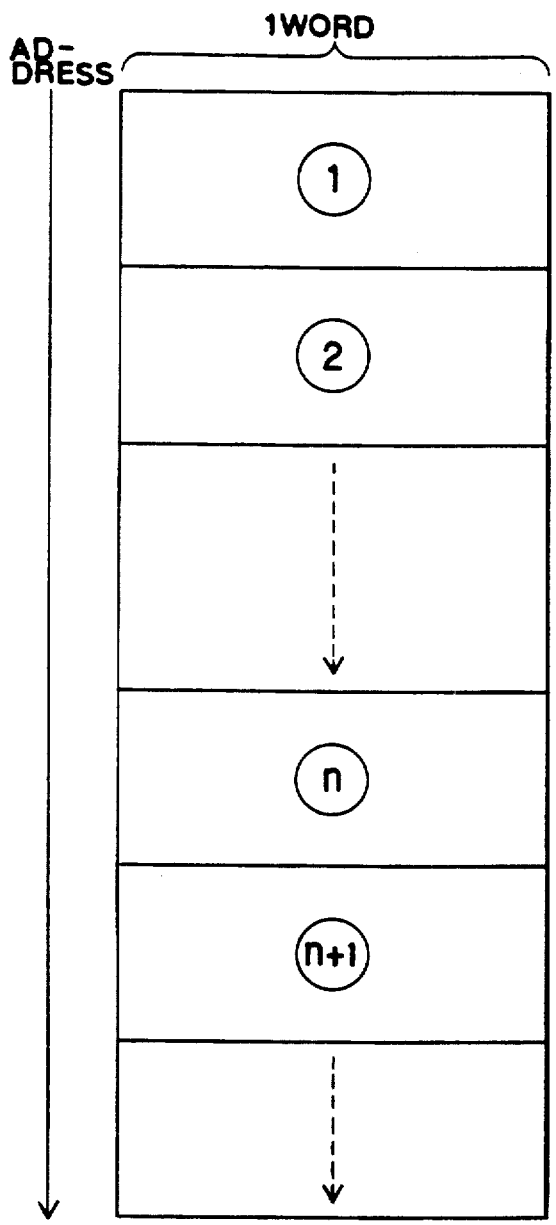
FIG. 5 is a diagram showing an example of arrangement of reference vectors of FIG. 4 in a data memory.

For example, in performing binary tree search as shown in FIG. 4, the operation of the digital signal processor for calculating approximation may be programmed as follows.
rep N: {subaa sc0, sc1, wr$_x$} Repeat N times
sc0: Input vector address control
sc1: Reference vector address control
Wr$_x$: Working register specification This operation needs N+1 machine cycles. The approximation of a reference vector of a direction 0 and a reference vector of a direction 1 can be determined by repeating the program twice. A process for deciding a reference vector having high approximation and obtaining the node number of the next stage can be programmed as follows.
comp.ge Wr$_0$, Wr$_1$: Compare and store the result in tcsr 138
mvr ar00, ar01: Initialize address pointers of sc0 mvr ar10, ar11, and scl adsl 1, tcsr, wr2, Wr$_2$ Calculate reference vector address for the next node (2n+1: wr2 is set previously for 1)
nop
nop
mvr wr2, ar12

Total Seven instructions

Thus, 2N+9 machine cycles are necessary for one stage. Obviously, the number of machine cycles practically coinciding with the ideal number of machine cycles, the process is highly efficient and the program is simple.

Although the foregoing example has been described on an assumption that the word length has a 24-bit address space of 16 MW (24 bits), the word length and the data format may be other than those described therein.

Although this embodiment has been described with reference to binary search, the same effect can be expected with other signal processing algorithms.

Obviously, the details of the foregoing embodiment are not limitative of the substance of the present invention.

As apparent from the foregoing description, the digital signal processor, in the first embodiment, according to the present invention is highly adaptive, flexible and capable of operating at high processing speed.

A digital signal processor, in a second embodiment, according to the present invention will be described hereinafter with reference to relevant drawings.

Figure 30:
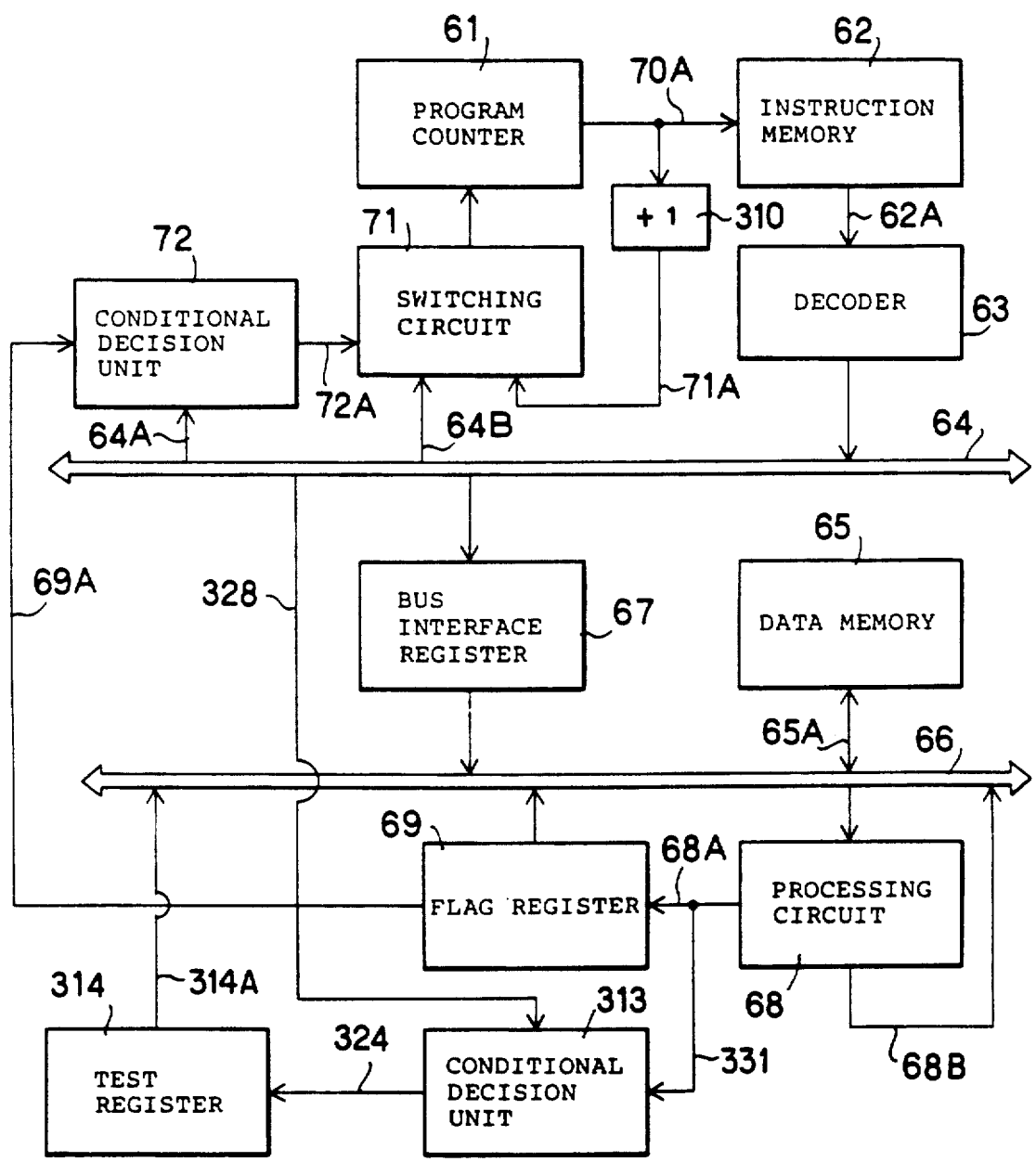
FIG. 30 is a block diagram of a digital signal processor, in a second embodiment, according to the present invention.

Referring to FIG. 30 showing the digital signal processor, in a second embodiment, according to the present invention, there are shown a conditional decision unit 313 which decides on instruction whether or not a condition is met, a condition code 328 specified by a conditional test instruction, a result 324 of decision, and a test register 314 which holds the result 324 of decision.

Figure 31:
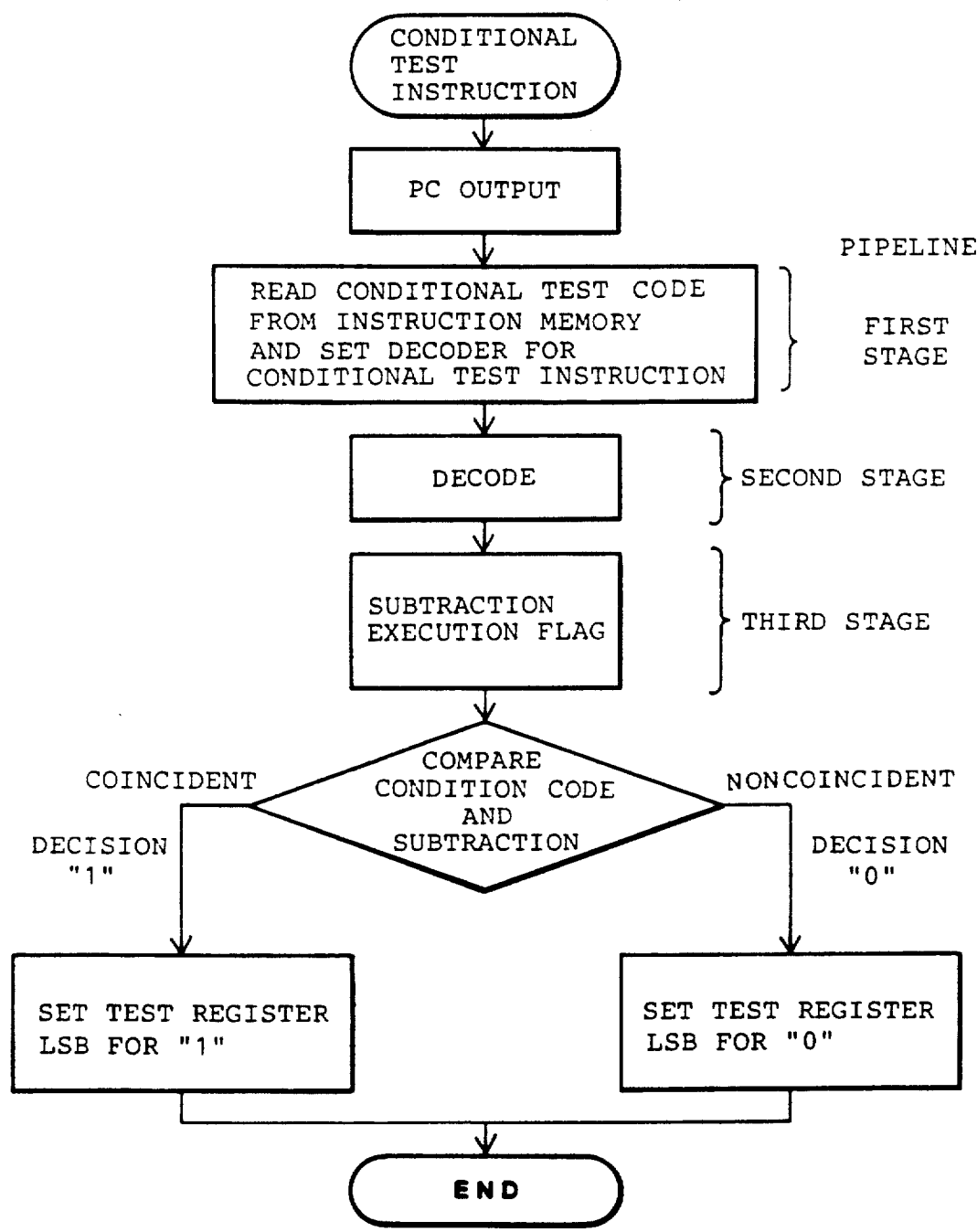
FIG. 31 is a flow chart showing steps of operation for executing a conditional test instruction according to the present invention.

FIG. 31 is a flow chart showing steps of operation of the digital signal processor.

The operation of the digital signal processor for executing a conditional test instruction will be described hereinafter with reference to FIGS. 30 and 31. The conditional test instruction is read from an instruction memory 62, a decoder 63 decodes the conditional test instruction, and an EU 68 performs subtraction for two operands specified by the instruction. These operations are the same as the conventional operations on a comparison instruction.

After the subtraction, the EU 68 gives a flag 331 to a condition decision unit 313, where the flag 331 is compared with a condition code 328.

When the flag 331 meets the condition code 328, the logical value of the result 324 of decision is "1" and, when not, "0".

The result 324 of decision of one bit is stored in a test register 314, i.e., a shift register of n bits. Then, the present content of the test register 314 is shifted by one bit toward the most significant bit (hereinafter abbreviated to "MSB") and the result 314A of decision is placed at the last significant bit (hereinafter abbreviated to "LSB") and the previous content of the MSB is deleted.

Figure 7:
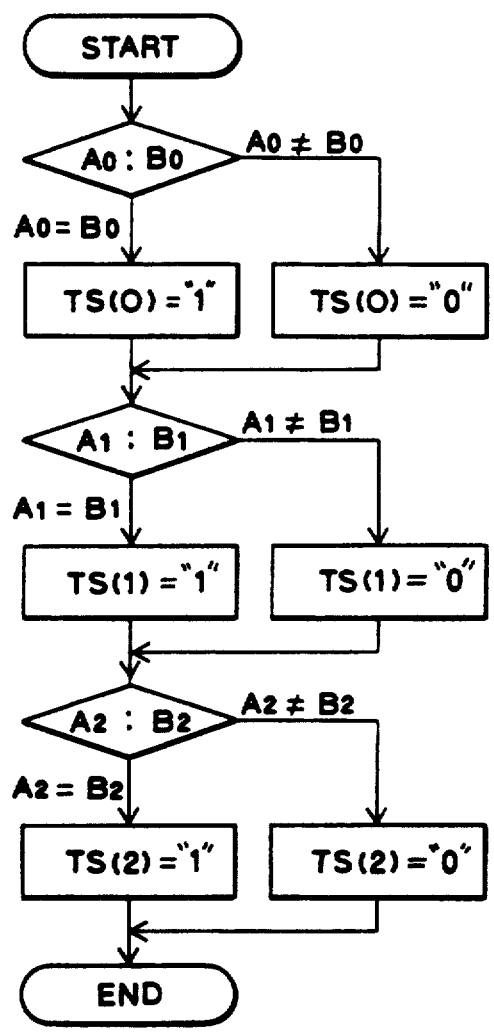
FIG. 7 is a flow chart of assistance in explaining a mode of executing successive decision instructions.
Figure 32:
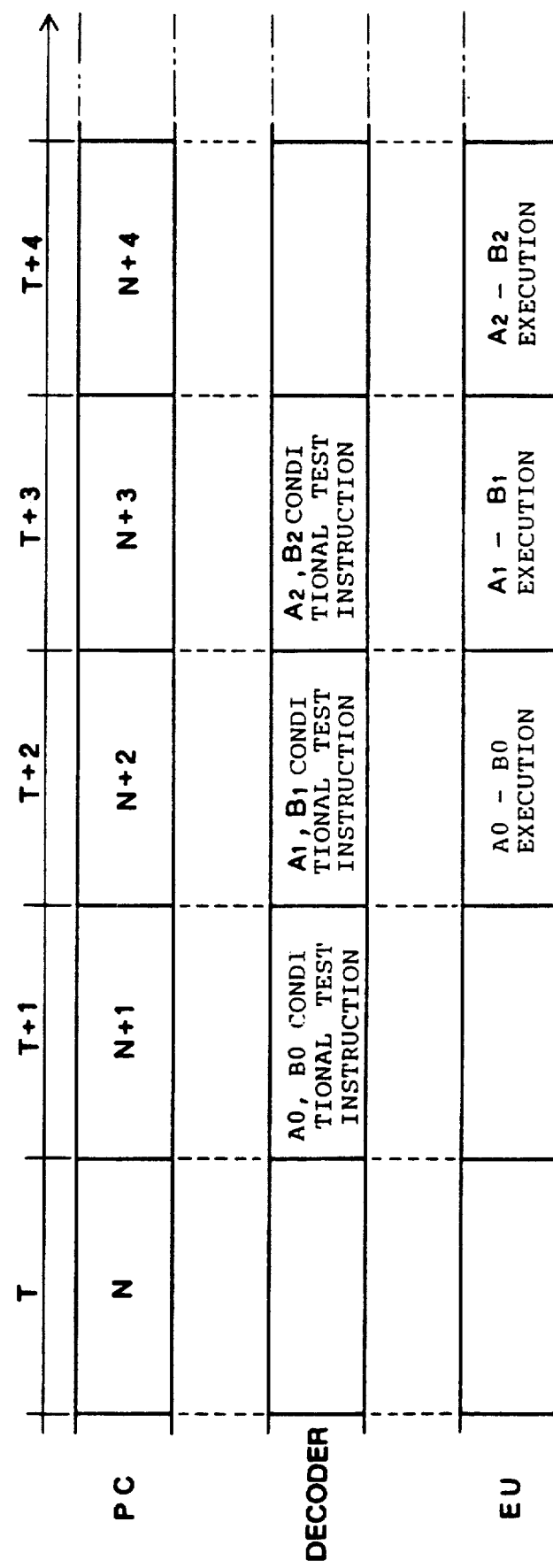
FIG. 32 is a time chart of assistance in explaining the respective operations of the components of the digital signal processor of FIG. 26 in executing a conditional test instruction.

The operation of the digital signal processor in performing the process of FIG. 7 will be described with reference to FIG. 32. In the process of FIG. 7, a logical value "1" is set when two operands are equal to each other. Therefore, the condition code 328 specified by a conditional test instruction is "zero flag=0".

In the M.C. T+2, the EU 68 performs subtraction to obtain the difference between $A_0$ and $B_0$, and provides a flag 331. The flag 331, like the flag mentioned in the foregoing description of the conventional digital signal processor, is a sign flag, a zero flag, an overflow flag or a carry flag.

The conditional decision unit 313 compares the input zero flag 331 and the condition code 328, i.e., "zero flag=0", specified by the instruction. When the input zero flag is "0", the test condition is met. Then, logical value of the result 324 of decision is "1" and the LSB of the test register 314 is set for "1". When the input zero flag is "1", the test condition is not met. Consequently, the logical value of the result 324 of decision is "0", and then the LSB of the test register 314 is set for "0".

Figures 33, 34:
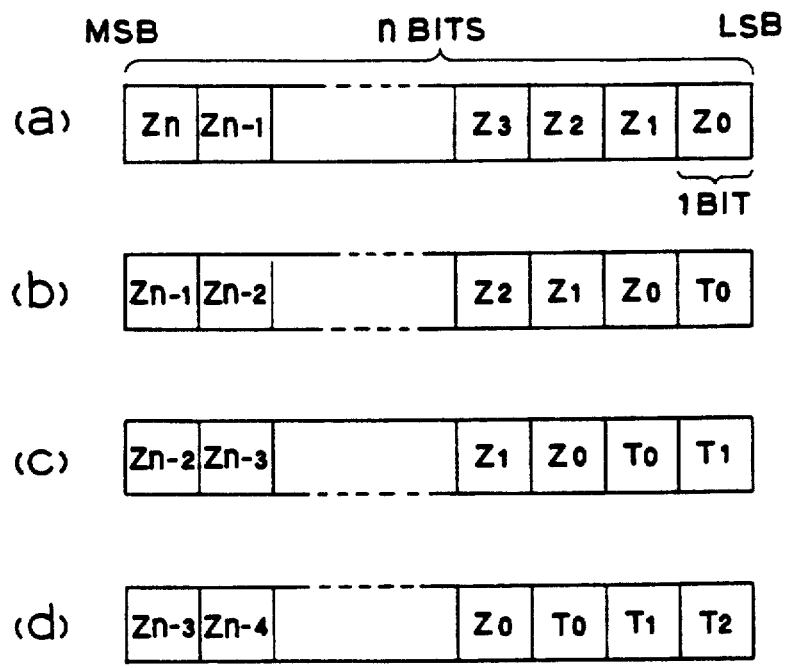
FIG. 33 is a diagram of assistance in explaining the operation of a test register.
FIG. 34 is a diagram of assistance in explaining binary tree search.

On the other hand, in setting the result of decision in the test register, the content of the test register 314 is shifted by one bit toward the MSB as shown in FIG. 33, and a new result of decision is placed at the LSB.

Thus, the result of decision 324 with $A_1$ and $B_1$, and the result of decision 324 with $A_2$ and $B_2$ are set in the test register 314 respectively in a M.C. T+3 and a M.C. T+4, and the result of decisions on the three successive conditional test instructions are set in the test register 314 at the end of the M.C. T+4.

Thus, this embodiment accomplishes the process in three instruction steps, whereas it has been necessary for the conventional digital signal processor to accomplish the same process in twenty-one instruction steps, the process is performed only in three machine cycles, and the results of decisions need not be held in the data memory, which enables the effective use of the data memory.

The operation of the digital signal processor for binary tree search will be described hereinafter.

Binary tree search is a retrieval algorithm to retrieve one output data $y_x$ most analogous to an input data X, among $2^n$ output data of an output data group Y, and to obtain the index code attached to the output data $y_x$.

The operation of the digital signal processor for binary tree search will be described with reference to an output data group Y including $2^n$ output data as shown in FIG. 34.

In the first stage, when an input data X is given, the input data X and a data y are compared through subtraction, a branch "0" is selected when X is smaller than y, and a branch "1" is selected when X is greater than y.

In the second stage, the input data X and a data $y_0$ are compared, a branch "0" is selected when X is smaller than $y_0$ and a branch "1" is selected when X is greater than $y_0$, when the branch "0" is selected in the first stage. The input data X and a data $y_1$ are compared and the like selection is made when the branch "1" is selected in the first stage.

Accordingly, a data $y_x$ most approximate to the input data X can be selected from $2^n$ pieces of data through n times of comparison by comparing data and selecting data along the branches from the first stage to the nth stage. An index code is represented by the history, namely, branch numbers, of selection to obtain the data $y_x$.

Operation for binary tree search using a binary tree having $2^3$ pieces of data will be described by way of example.

First stage: When an input data X is given, X and y are compared and a branch "0" is selected when X is smaller than y.

Second stage: The data X and $Y_0$ are compared and a branch "1" is selected when X is greater than $Y_0$.

Third stage: The data X and $Y_{01}$ are compared and a branch "0" is selected when X is smaller than $Y_{01}$ to select $Y_{010}$.

Thus, a data most approximate to the input data X is $y_{010}$ and the index code is "010".

Thus, the digital signal processor executes conditional test instructions specifying the difference between the input data X and the data $Y_i$ at each node as a test condition. When a condition code "sign flag = "1"" is specified as a condition code, "0" is stored in the test register 314 when a branch "0" is selected, and "1" is stored in the test register 314 when a branch "1" is selected, in accordance with the foregoing rule.

Thus, in this embodiment, the content of the test register 314 is an index code, which can easily be generated through the foregoing procedure.

As apparent from the foregoing description, the digital signal processor in the second embodiment of the present invention has a special register for holding the result of decision as to whether or not a condition code specified by an instruction is met. Therefore, a process to be performed on the basis of a plurality of results of conditional decision can be accomplished at a high processing speed by using a comparatively small number of instruction steps, which improves the processing efficiency of the digital signal processor.

Figure 6:
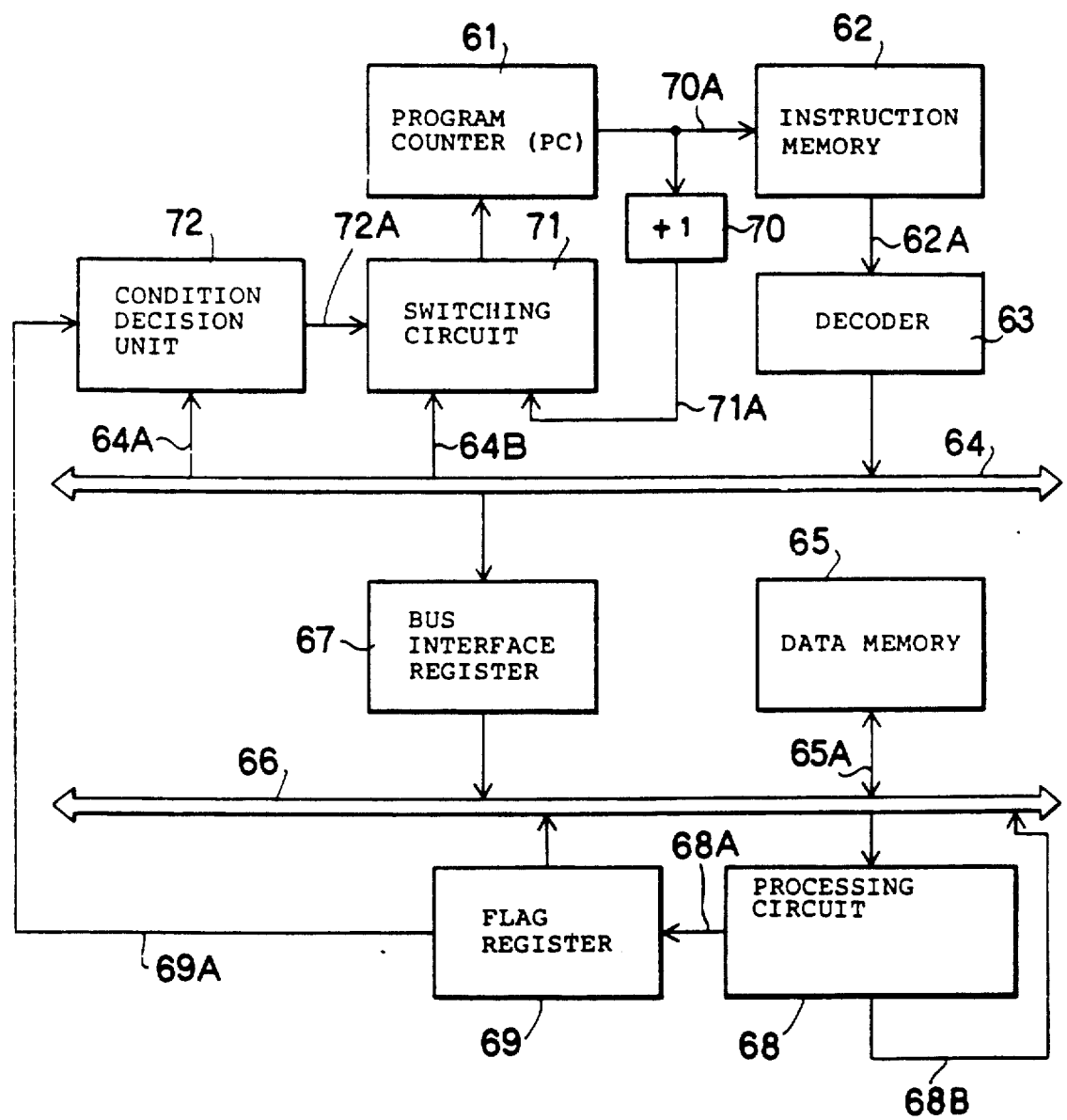
FIG. 6 is a block diagram showing the constitution of a second example of a conventional digital signal processor.
Figure 8:
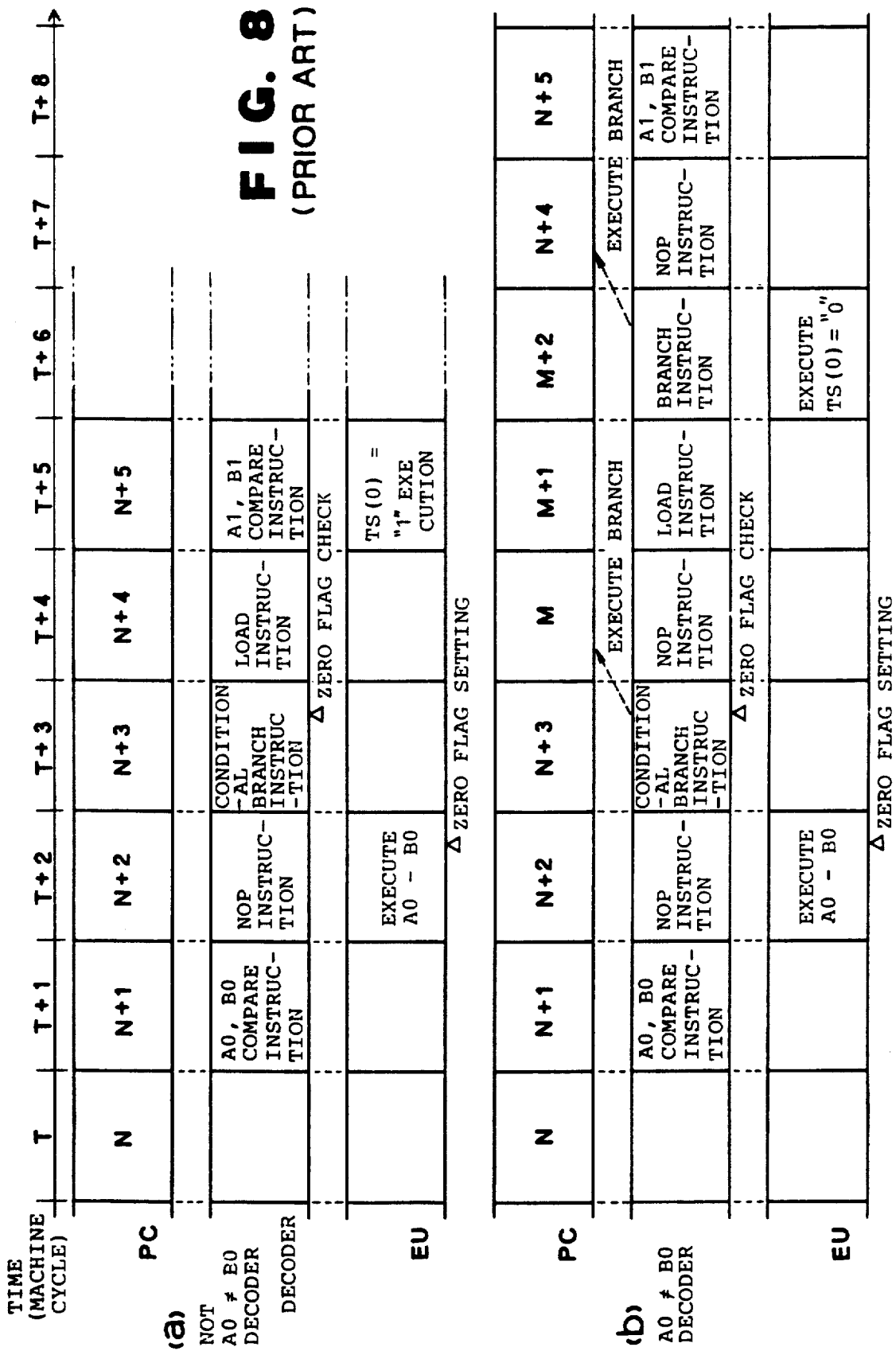
FIG. 8 is a time chart of assistance in explaining the respective operations of the components of the digital signal processor of FIG. 6 in performing processes.
Figure 9:
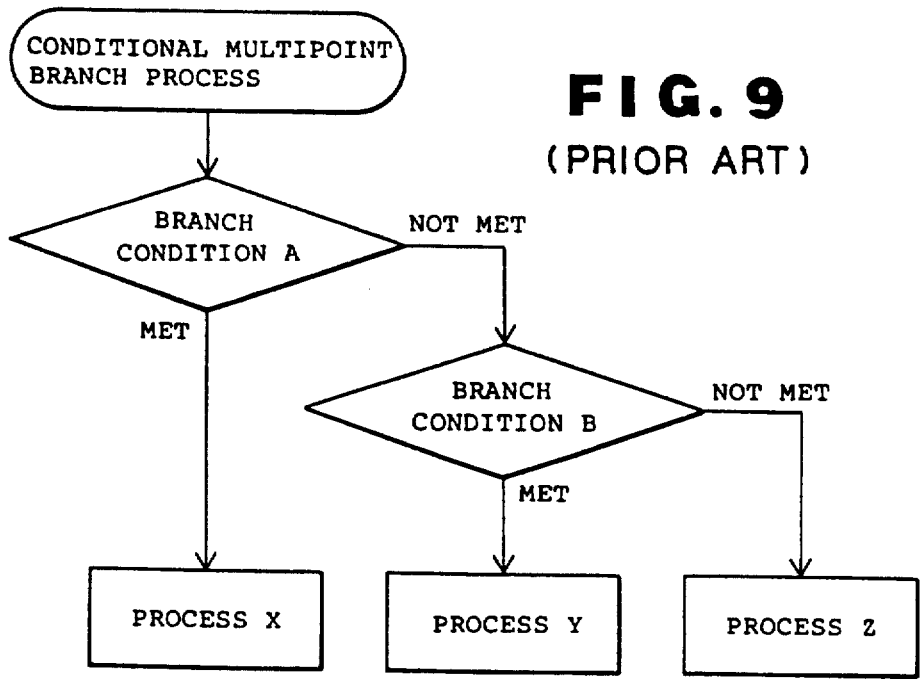
FIG. 9 is a flow chart of assistance in explaining a conditional multipoint branch process to be performed by a third example of a conventional digital signal processor.
Figure 16A:
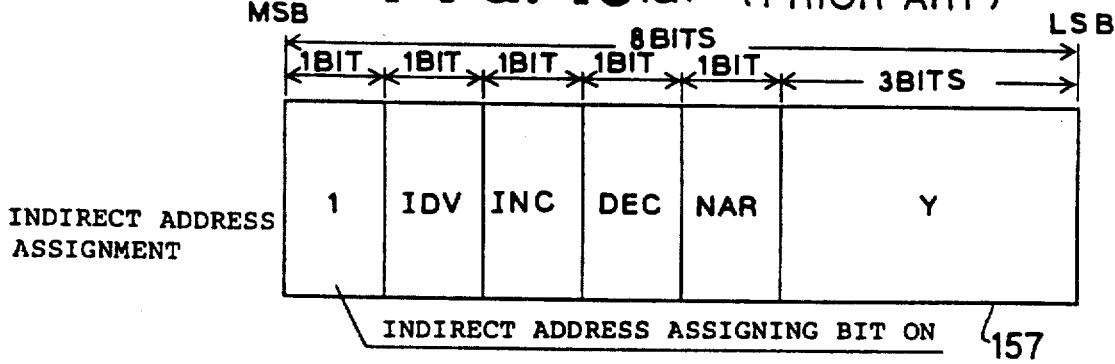
FIGS. 16(a) and (b) are diagrams of control codes for controlling the address generator of FIG. 15.
Figure 16B:
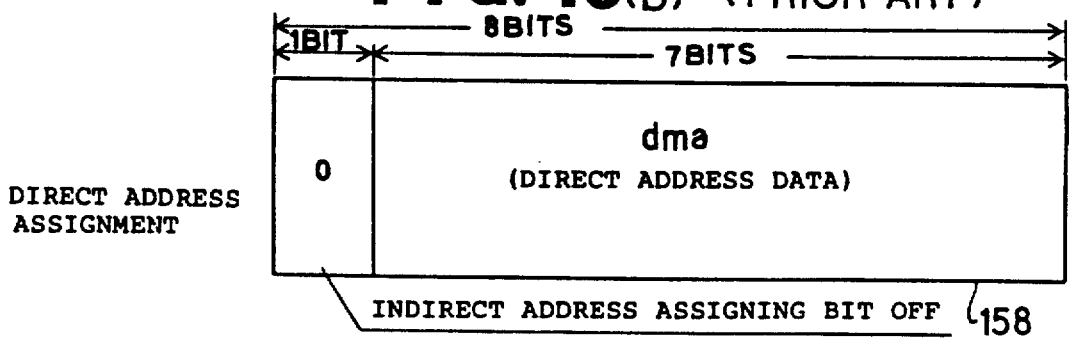
Figure 11:
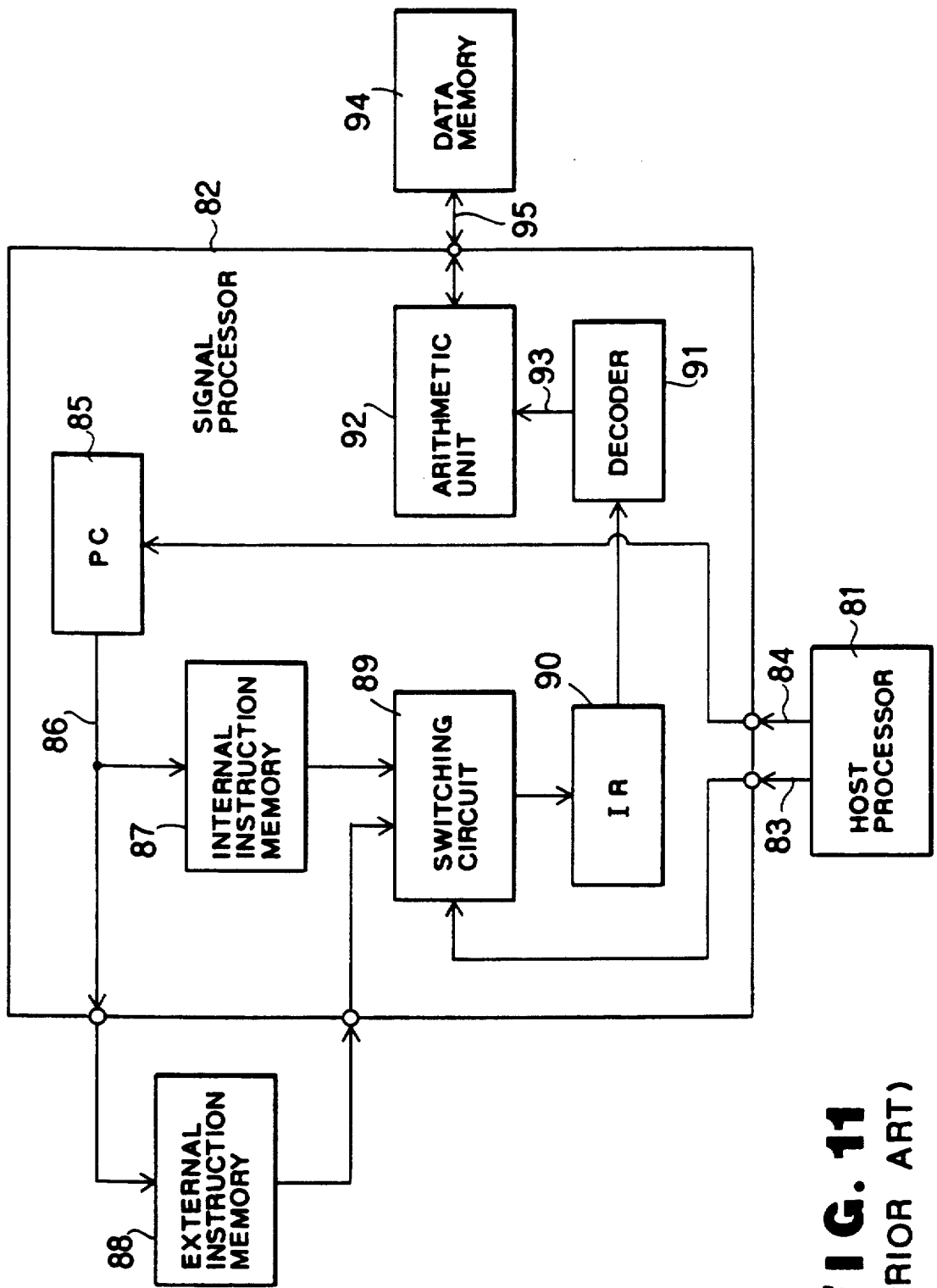
FIG. 11 is a block diagram of a fourth example of a conventional digital signal processor.
Figure 12:
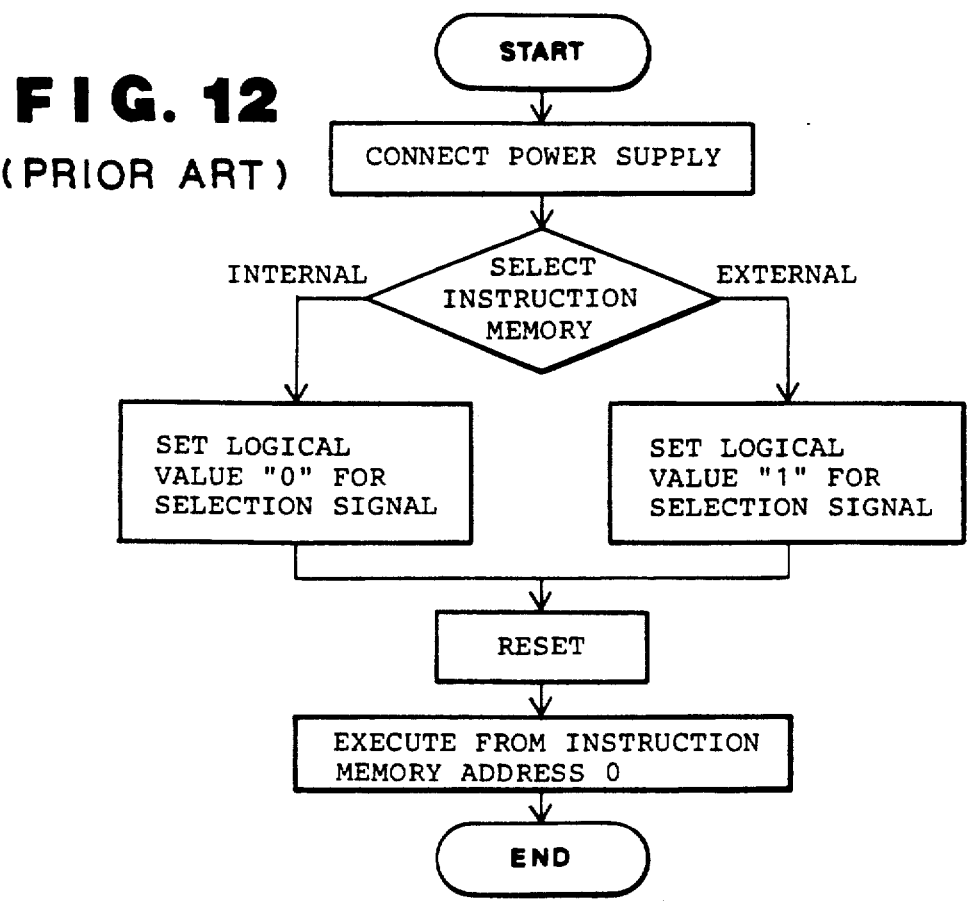
FIG. 12 is a flow chart of assistance in explaining the operation of the digital signal processor of FIG. 11.
Figure 23:
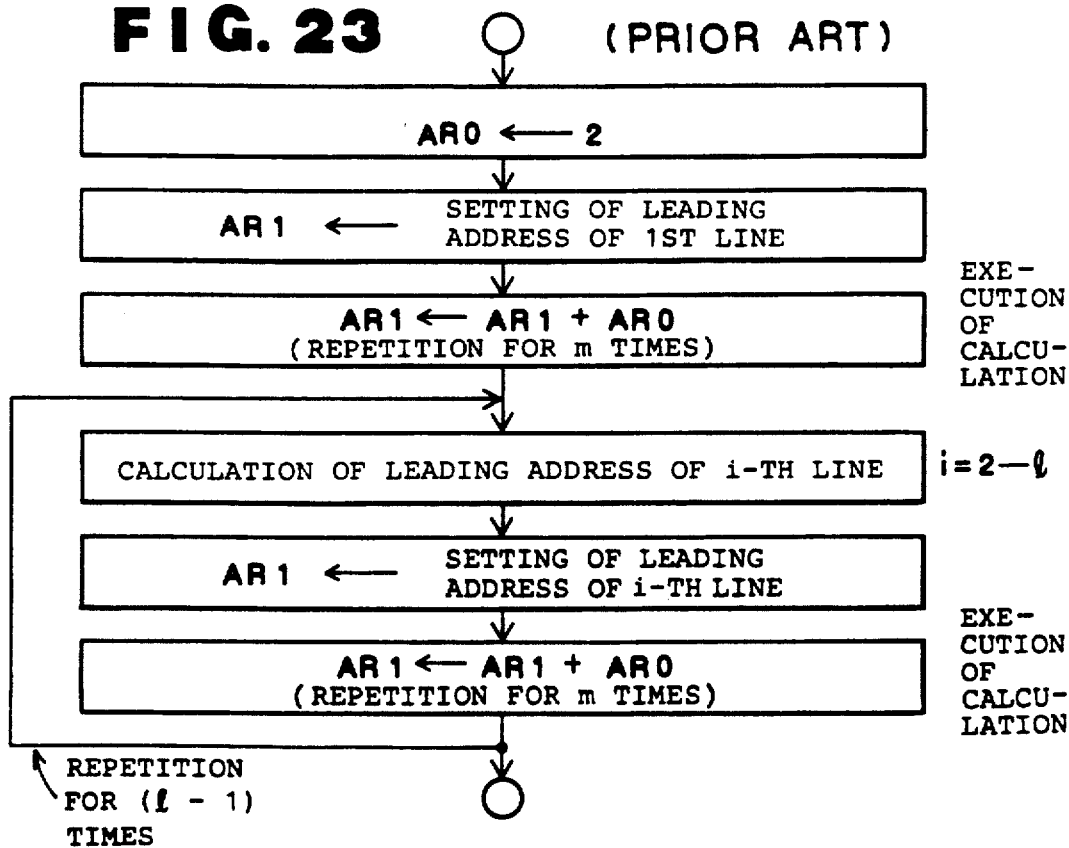
FIG. 23 is a flowchart indicating addressing operations for data series of FIG. 22 by the address generator of FIG. 20.
Figure 35:
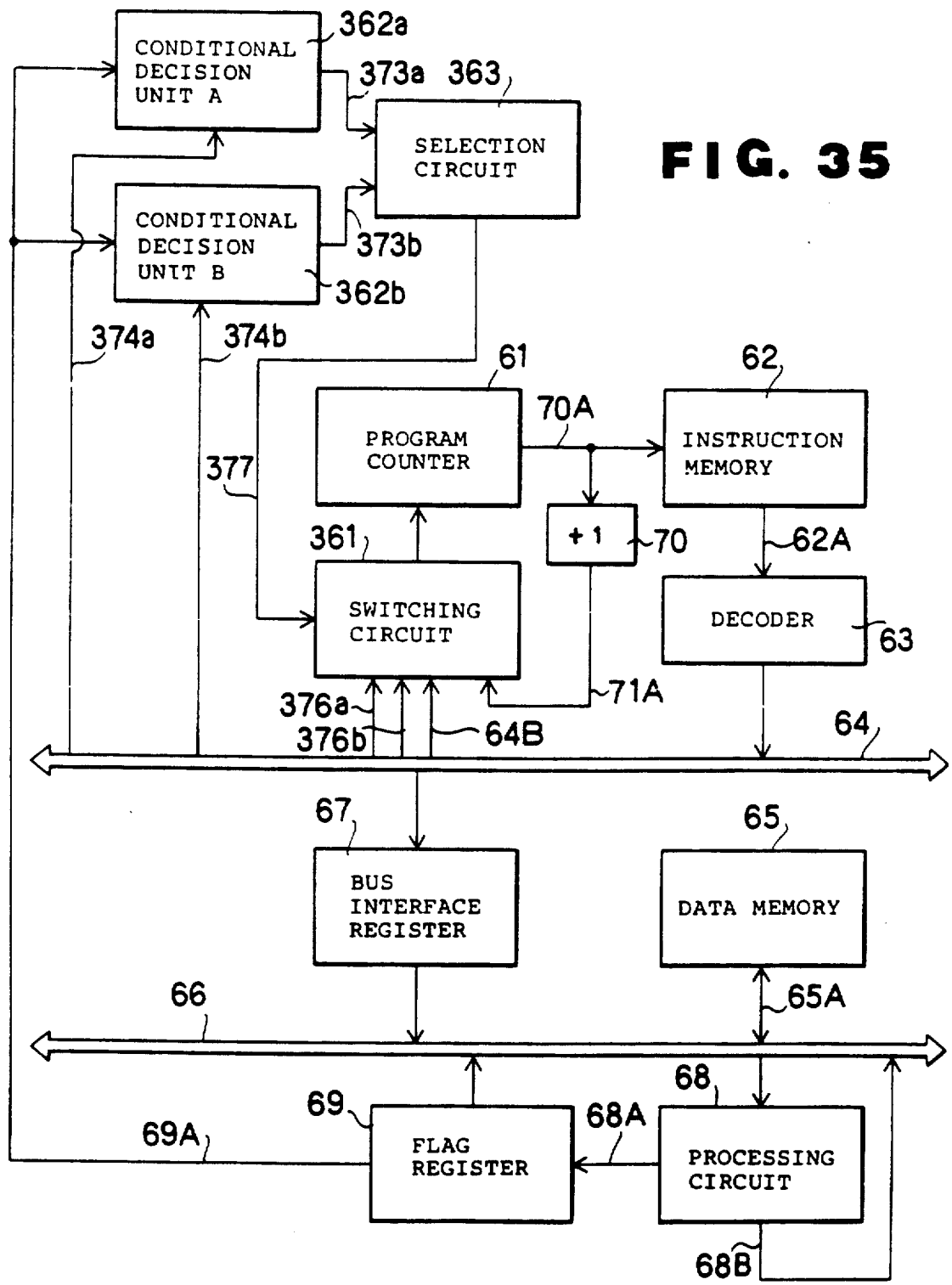
FIG. 35 is a block diagram of a digital signal processor, in a third embodiment, according to the present invention.

A digital signal processor, in a third embodiment, according to the present invention will be described hereinafter. This digital signal processor is intended for three branch processes through the simultaneous comparison of an input data with two branch conditions. FIG. 35 shows this digital signal processor having two sets of conditional decision units 362a and 362b each corresponding to the conditional decision unit 72 of the conventional digital signal processor shown in FIG. 6. The digital signal processor is similar to the conventional digital signal processor of FIG. 6, and hence parts previously described with reference to the digital signal processor of FIG. 6 will be omitted.

Referring to FIG. 35, there are shown a conditional decision unit A 362a, a conditional decision unit B 362b being the same in constitution as the conditional decision unit A 362a, a branch condition A 374a specified by an instruction, a branch condition B 374b having a priority lower than that of the branch condition A 374a, a decision signal A 373a provided by the conditional decision unit A 362a, a decision signal B 373b provided by the conditional decision unit B 362b, a selection circuit 363 which selects a condition satisfaction signal having a higher priority among the decision signal A 373a and the decision signal B 373b, a switching circuit 361, a switching control signal 377 applied to the switching circuit 361, branched addresses 376a and 376b to be selected when the branch conditions A 374a and B 374b are met, respectively, and branched addresses 64B to be selected when both the branch conditions A 374a and B 374b are not met.

The operation of the digital signal processor for a conditional multipoint branch process will be described hereinafter with reference to FIG. 35. The operation of the digital signal processor for executing instructions other than those (conditional multipoint branch instructions) for conditional multipoint branch process with priority is the same as that of the conventional digital signal processor, and hence the description thereof will be omitted.

First, a conditional multipoint branch instruction is read from an instruction memory 62, and the conditional multipoint branch instruction is decoded by a decoder 63. Then, a flag held by a flag register 69 is read and is applied to the conditional decision units A 362a and B 362b.

Then, the conditional decision unit A 362a decides whether or not the branch condition 374a specified by the instruction is met. The logical value of the decision signal A 373a is "1" when the branch condition A 374a is met, and is "0" when the branch condition A 374a is not met.

Simultaneously with the operation of the conditional decision unit A 362a, the conditional decision unit B 362b decides whether or not the branch condition B 374b specified by the instruction is met. The logical value of the decision signal B 373b is "1" when the branch condition B 374b is met, and is "0" when not.

Figure 36:
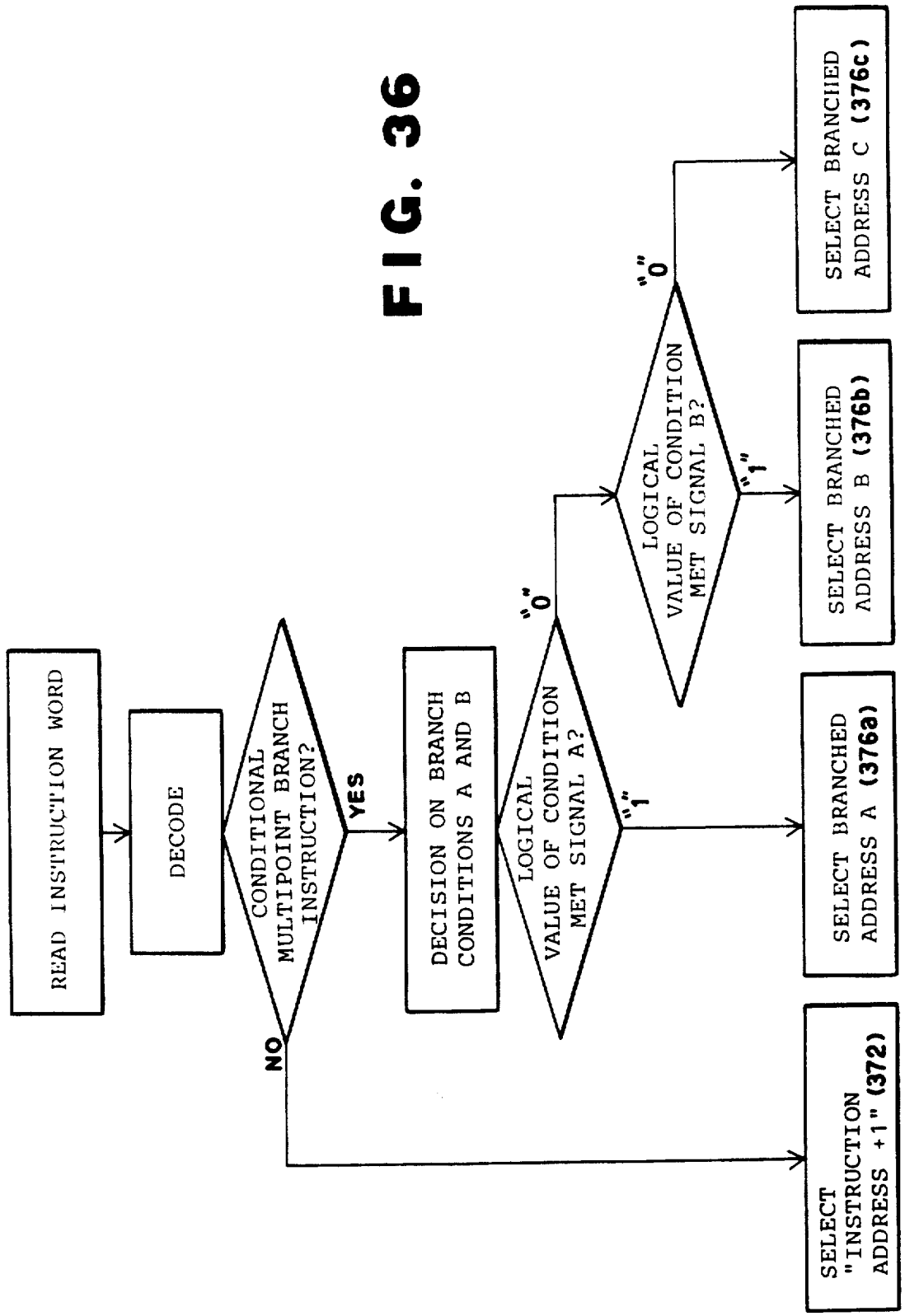
FIG. 36 is a flow chart of assistance in explaining the operation of the digital signal processor of FIG. 35.

The selection circuit 363 executes a control program shown in FIG. 36. When the decoded instruction is not a conditional multipoint branch instruction, a switching circuit control signal 377 instructing the switching circuit 361 to make the selecting circuit 363 select an instruction address 71A generated by incrementing an instruction address 70A by one is provided. When the decoded instruction is a conditional multipoint branch instruction, the logical value of the decision signal A 373a is tested. When the logical value of the decision signal A 373a is "1", a switching circuit control signal 377 instructing the switching circuit 361 to make the selecting circuit 363 select the branched address A 376a is provided. When the logical value of the decision signal A 373a is "0", the decision signal B 373b is tested. The switching circuit control signal 373 is provided so that the branched address 376b is selected when the logical value of the decision signal B 373b is "1" or the branched address 376c is selected when the logical value of the decision signal B 373b is "0". The switching circuit control signal 377 can easily be generated, for example, by using a priority encoder in the selecting circuit 363.

Figure 37:
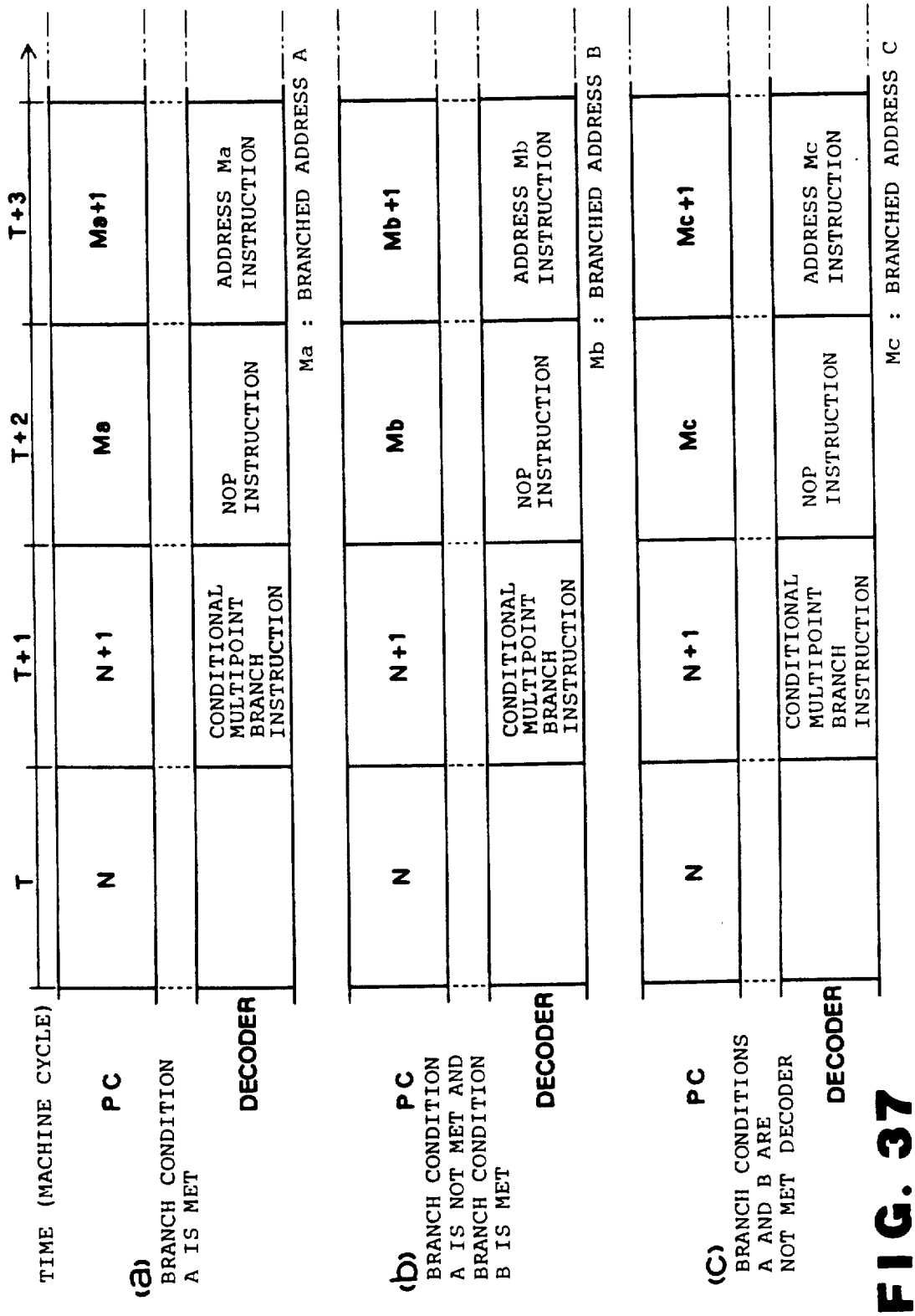
FIG. 37 is a time chart of assistance in explaining the execution of a conditional multipoint branch instruction according to the present invention.

Thus the digital signal processor is able to accomplish a conditional multipoint branch process on a single conditional multipoint branch instruction as shown in FIG. 36, which enables performing a conditional multipoint branch process at a high processing speed and reduces the number of instruction steps necessary for the operation. FIG. 37 illustrates the timing of the conditional branch instructions executed by the processor according to FIG. 36.

Although this embodiment has been described with reference to operation for three branch processes on two branch conditions, branch processes more than three can be accomplished on a single instruction by providing more conditional decision units in addition to the conditional decision units 362a and 362b, which enables performing a conditional multipoint branch process at a high processing speed and reduces the number of instruction steps necessary for the operation remarkably.

Furthermore, in this embodiment, branch conditions with priority and branched addresses corresponding to the branch conditions are specified by instruction words. However, programming flexibility can be enhanced by providing a special register for holding the branch conditions and the branched addresses and performing the conditional multipoint branch process according to the contents of the special register.

As apparent from the foregoing description, according to the present invention, a conditional multipoint branch process can be performed on a single instruction at a high processing speed and the number of instruction steps can be reduced, which enhances the processing efficiency of the digital signal processor.

A digital signal processor, in a fourth embodiment, according to the present invention will be described hereinafter.

Figure 38:
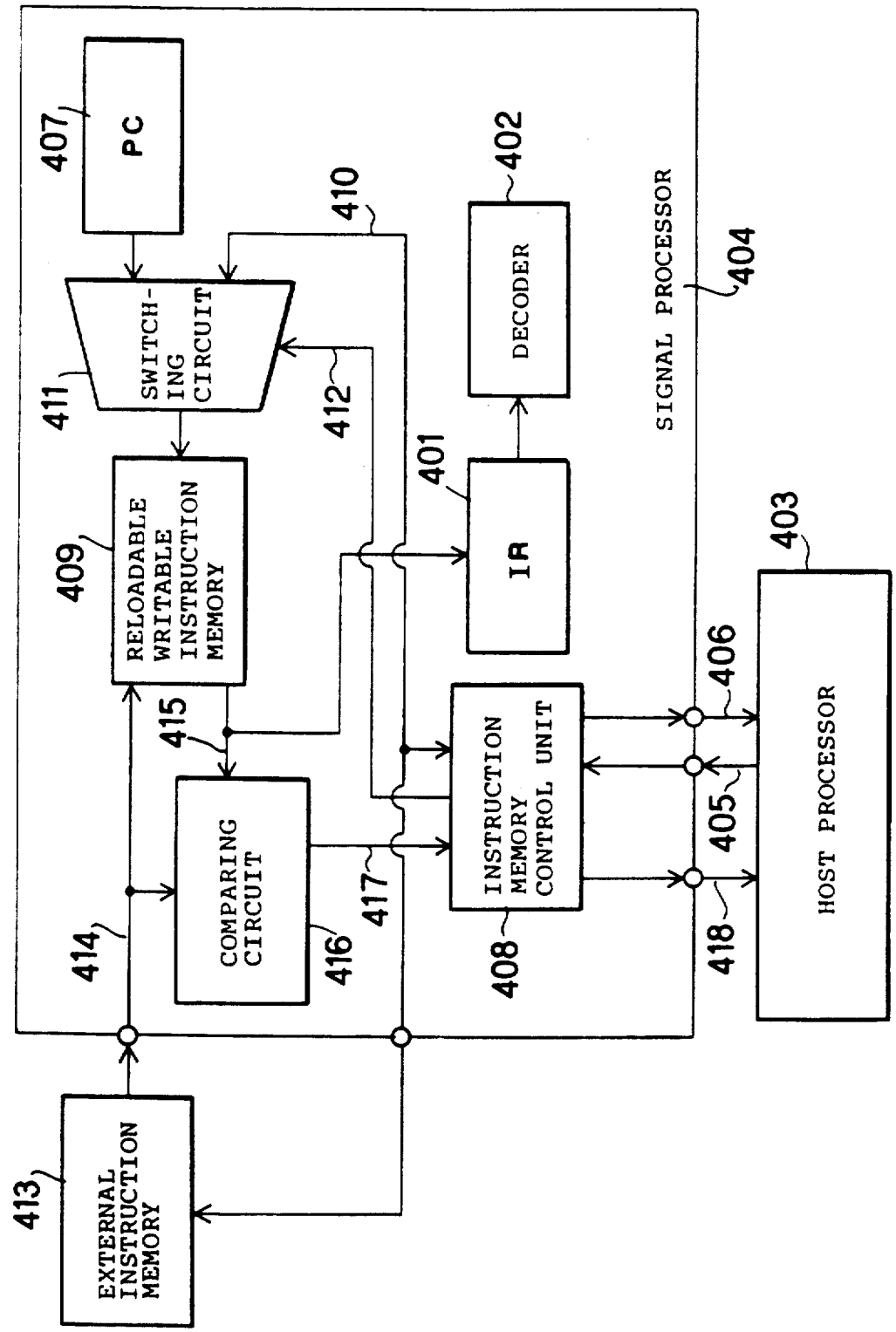
FIG. 38 is a block diagram of a digital signal processor, in a fourth embodiment, according to the present invention.
Figure 39:
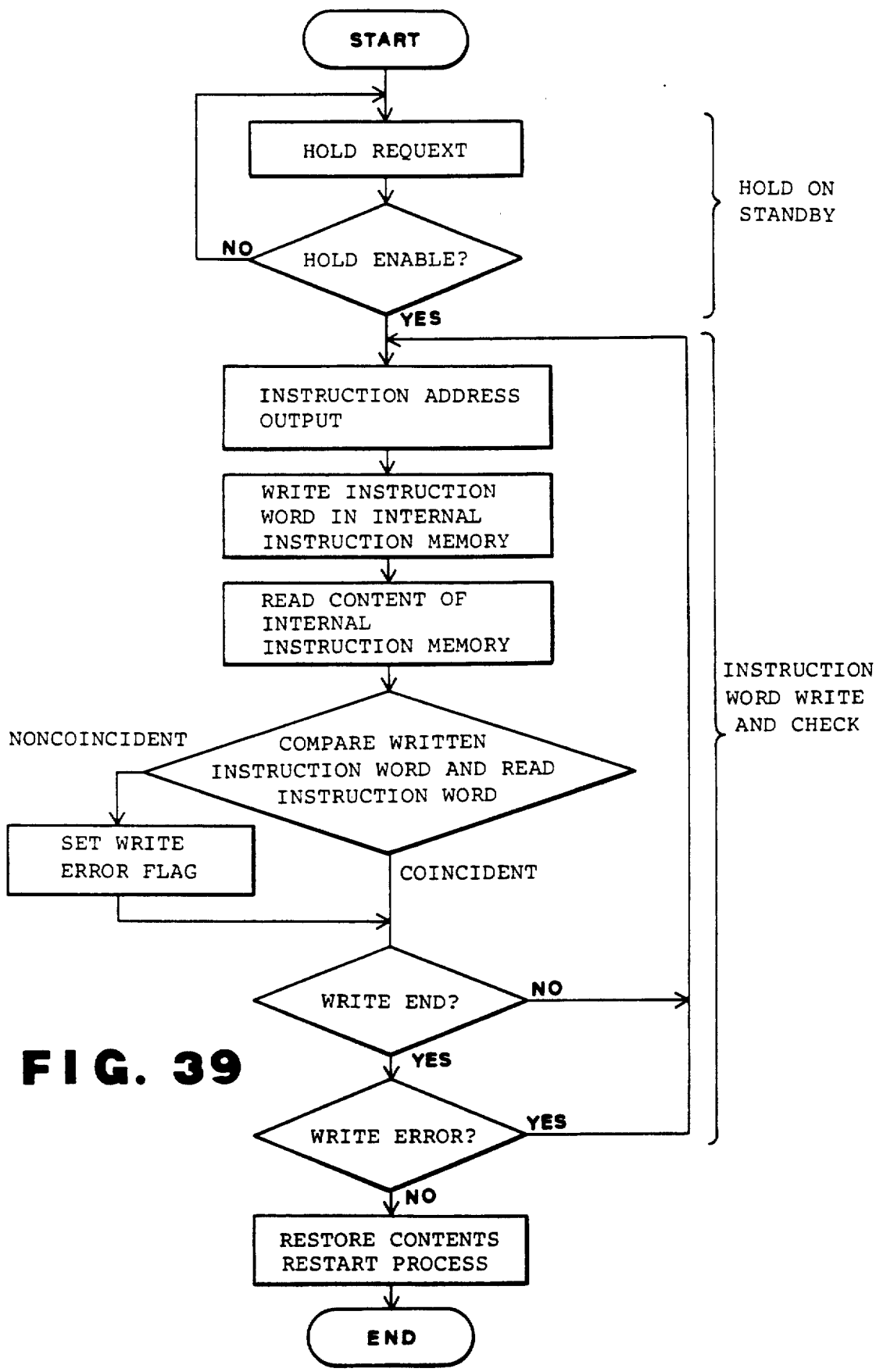
FIG. 39 is a flow chart of assistance in explaining the operation of the digital signal processor of FIG. 34.

Referring to FIG. 38 showing the internal verify of the digital signal processor for verifying the contents of the internal instruction memory thereof, there are shown a host processor 403, a signal processor 404, a hold request signal 405 requesting the temporary stop of instruction execution of the signal processor 404, a hold authorizing signal 406 for informing an external unit of the temporary stop of the signal processor 404, a program counter (PC) 407, an instruction memory control unit 408, a reloadable writable instruction memory 409, an instruction address 410, a switching circuit 411, a selection signal 412, an external instruction memory 413, instruction words 414 and 415, a comparing circuit 416, a result 417 of decision, and write end signal 418. The signal processor 404 has an arithmetic unit the same as that of the conventional signal processor, and hence the arithmetic unit is not shown in FIG. 38. FIG. 39 is a flow chart of assistance in explaining the operation of the signal processor.

The operation of the signal processor 404 will be described hereinafter with reference to FIGS. 38 and 39.

When the content of a process to be executed by the signal processor 404 needs to be changed, the host processor 403 gives the signal processor 404 the hold request signal 405 requesting the temporary stop of instruction word execution. Upon the end of an instruction presently being executed after the reception of the hold request signal 405, the signal processor 404 provides the hold authorizing signal 406 to stop updating the PC 407 and to interrupt the execution of the instruction word temporarily.

Then, the instruction memory control unit 408 provides the instruction address 410 specifying an address to be reloaded in the writable instruction memory 409, and the selection signal 412 to control the switching circuit 411 so that the instruction address 410 is selected. At the same time, the instruction address 410 is given also to the external instruction memory 413. Then, the external instruction memory 413 provides an instruction word 414, which is written in the writable instruction memory 409. The instruction word 414 written in the writable instruction memory 409 is read from the writable instruction memory 409. The instruction word 415 read from the rewritable instruction memory 409 and the instruction word 414 written in the same are compared by the comparison circuit 416 to decide whether or not the instruction words 414 and 415 coincide with each other. When the instruction word 414 is not written correctly in the rewritable instruction memory 409, the two instruction words do not coincide with each other. Then, a write error flag is set according to the result 417 of decision in the instruction memory control unit 408. This write error signal is not reset until all the write operations are completed.

Thus, operation for writing one instruction word is completed. This operation is repeated until all the instruction words are rewritten. After all the instruction words have been rewritten, the status of the write error flag is examined. When the write error flag is set, the instruction word write operation is restarted after resetting the write error flag. When any write error flag is not set and the rewrite has been ended normally, a write end signal 418 is given to the host processor 403. Then, the host processor cancels the hold request signal 405 to cancel the temporary stop mode. Upon the cancellation of the hold request signal 405, the instruction memory control unit 408 of the signal processor 404 provides a selection signal 412 to make the switching circuit 411 select the instruction address of the PC 407, the instruction address of the PC 407 is updated, and then an instruction at an instruction address succeeding the instruction address of the last instruction word executed before the execution of instructions was stopped temporarily is executed. Thus the contents of the signal processing process can readily be changed by providing the signal processor with an internal rewritable instruction memory. The malfunction of the signal processor attributable to erroneous rewrite can be prevented by providing a verify circuit in the signal processor.

Figure 40:
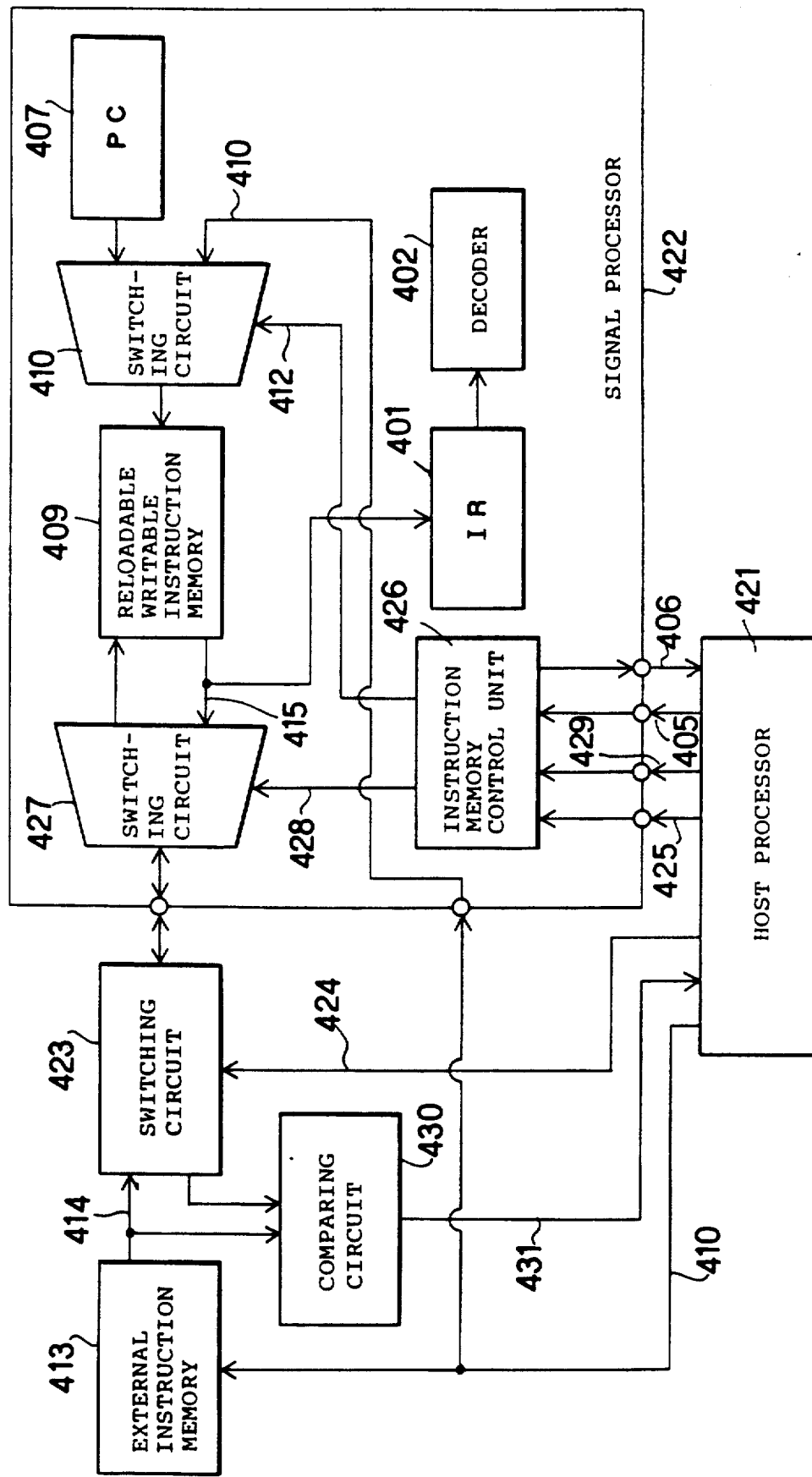
FIG. 40 is a block diagram of a modification of the digital signal processor of FIG. 38.
Figure 41:
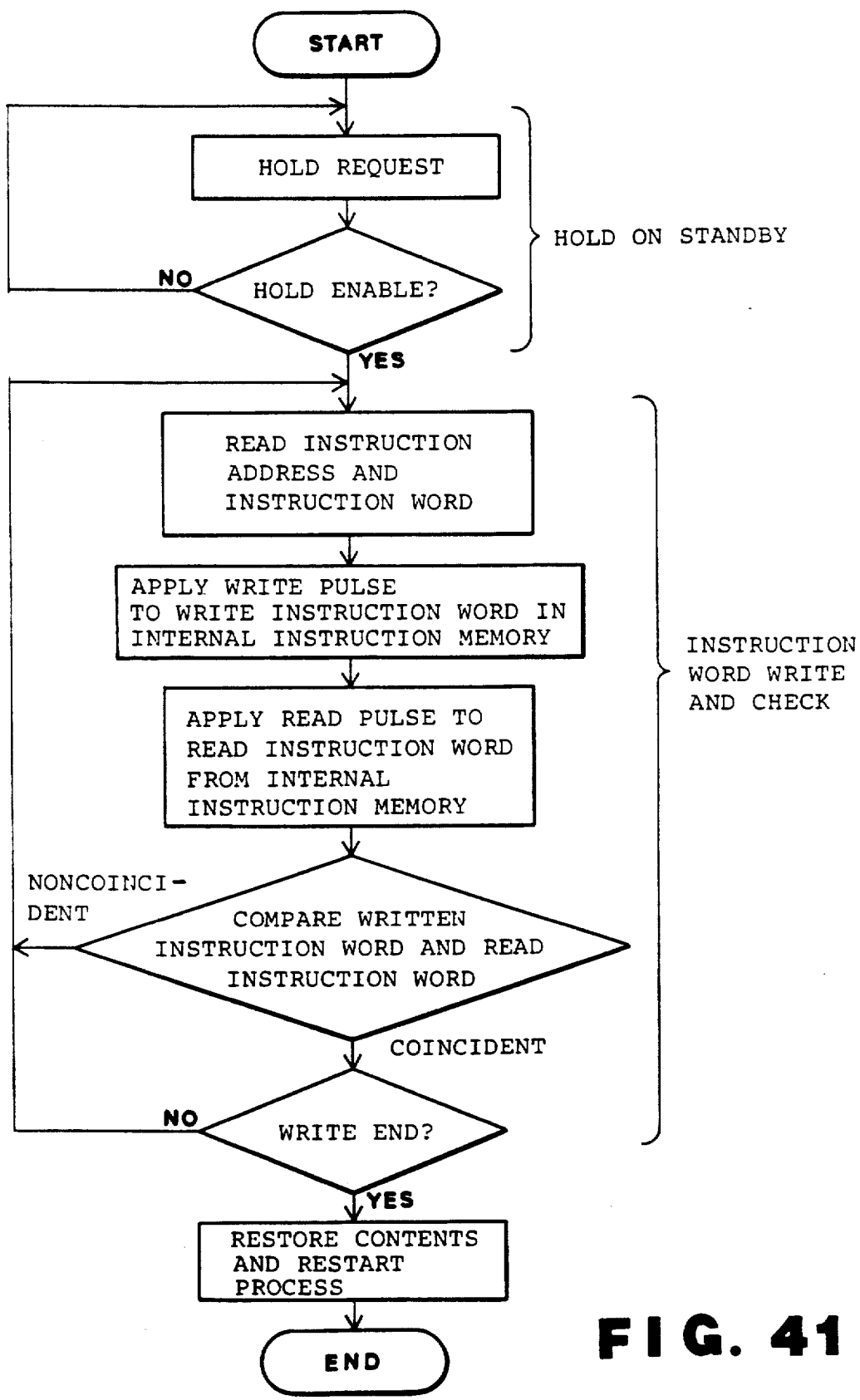
FIG. 41 is a flow chart of assistance in explaining the operation of the digital signal processor of FIG. 36.

FIG. 40 shows a signal processor in a modification of the signal processor of FIG. 38. This modified signal processor is provided externally with a decision circuit for deciding whether or not the contents of the writable instruction memory is correct. FIG. 41 is a flow chart of assistance in explaining the operation of the modified signal processor.

The operation of the modified signal processor will be described hereinafter with reference to FIGS. 40 and 41. When the contents of the process to be executed by the signal processor 422 needs to be changed, a host processor 421 provides a hold request signal 405 to stop updating a PC 407 so that the execution of instruction words is interrupted temporarily. Upon the reception of a hold authorizing signal 406, the host processor 421 gives an instruction address 410 to an external instruction memory 413 and the signal processor 422. An instruction word 414 read from the external instruction memory 413 is applied to a switching circuit 423, and then the instruction word 414 is applied to the signal processor 422 when a selection signal 424 is provided by the host processor 421. Then, the host processor 421 provides a write control signal 425 to instruct an instruction memory control unit 426 to give a selection signal 428 to the switching circuit 427, so that the instruction word 414 is written in a writable instruction memory 409. Then, the host processor 421 provides a read control signal 429 to read an instruction word 415, i.e., the written instruction word, from the writable instruction memory 409, and the instruction memory control unit 426 gives a selection signal 428 to the switching circuit 427 to apply the instruction word 415 to the switching circuit 423. The host processor 421 provides the selection signal 424 to apply the instruction word 415 to a comparing circuit 430. The comparing circuit 430 compares the instruction word 414 read from the external instruction memory 413 and the instruction word 415 read from the writable instruction memory 409, and then gives the result 431 of comparison to the host processor 421. When the two instruction words coincides with each other, the host processor executes operation for writing the next instruction word. When the two instruction word do not coincide with each other, the host processor performs the same instruction write operation again. After all the instruction words have been written, the host processor 421 cancels the hold request signal 405 to enable the signal processor 422 to restart the operation.

In this embodiment, in reading an instruction word having a m×n (m is an integer not less than one and n is an integer not less than two) bit width from the external instruction memory and giving the instruction word to the signal processor, m×n pieces of external terminals are necessary. However, only m pieces of external terminals are necessary when the bits of the instruction word is divided into bit widths each of m bits and the instruction word is written in the internal writable instruction memory by repeating the write operation n times. For example, although thirty-two external terminals are necessary for writing an instruction word of thirty-two bits in the internal writable instruction memory in one writing operation, only eight external terminals are necessary for writing the instruction word in the internal writable instruction memory when the instruction word is divided into 8-bit widths and written by four writing cycles. Although this writing mode requires a writing time four times the write time necessary for writing an instruction word in the internal instruction memory by a single writing operation, this writing mode is very effective when a limited number of external terminals are available.

As apparent from the foregoing description, since the signal processor in the fourth embodiment according to the present invention incorporates an internal writable instruction memory, and the operation of the signal processor is stopped temporarily by an instruction provided by the host processor to reload the internal instruction memory of the signal processor, the program stored in the signal processor can optionally be changed after the signal processor has been fabricated, which enhances the efficiency of development activities and is highly economical. Furthermore, the possibility of temporarily stopping the execution of an instruction during the signal processing operation to rewrite the program, and restarting the execution of the instruction after rewriting the program enable the signal processor to perform more complicated signal processing operations and diversifies the signal processing functions of the signal processor for flexible signal processing.

Figure 42:
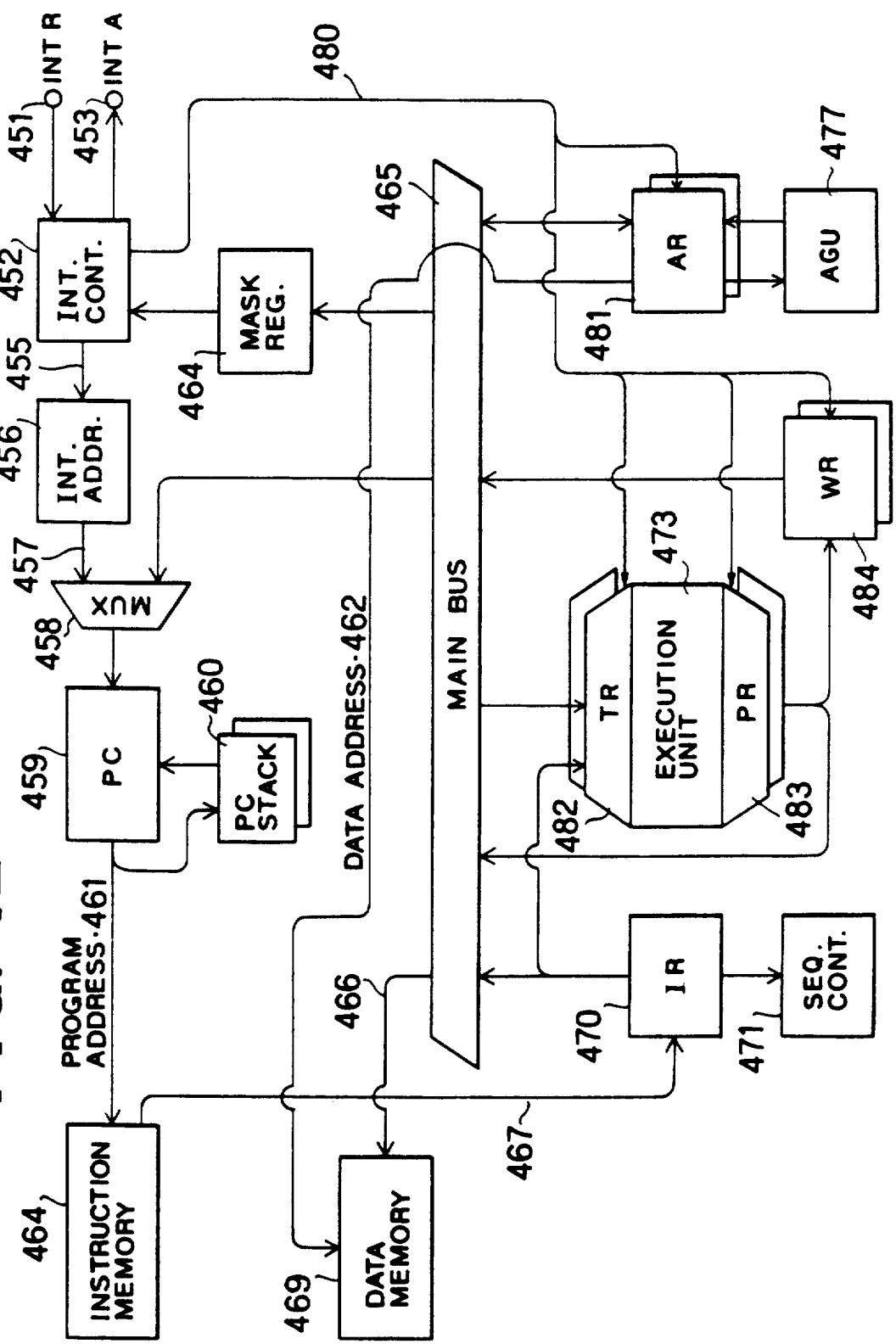
FIG. 42 is a block diagram of a digital signal processor, in a digital signal processor, in a fifth embodiment, according to the present invention, incorporating an interruption processing system.

A digital signal processor, in a fifth embodiment, according to the present invention will be described hereinafter. Referring to FIG. 42, there are shown an interruption request signal INTR 451, an interrupt control circuit 452, an interrupt response signal INTA 453 provided by the interrupt control circuit 452, an interrupt mask register 454 for interrupt disable/enable, an interruption process start signal 455, an interrupt address register 456, an interruption start address 457, a multiplexer 458, a program counter (PC) 459, a stack (STK) 460, an instruction address 461, a data address 462, an instruction memory 464, a main bus 465 for transferring main data, a data memory 469, data 466 to be read from and to be written in the data memory 469, an instruction 467 read from the instruction memory 464, an instruction register (IR) 470, a sequence control circuit 471, an arithmetic circuit (EU) 473, a register standby instruction signal (EXCH) 480 provided by the interrupt control circuit 452 upon the start of an interruption process, address registers (ARs) 481 at least having a duplex construction capable of being switched by the EXCH 480, temporary registers (TRs) 482 having the same construction as the AR 481, pipeline registers (PR) 483 having the same construction as the AR 481, working registers (WRs) 484 having the same construction as the AR 481, and an address generating unit (AGU) 477.

FIG. 43 is a flow chart of assistance in explaining the steps of an interruption process to be performed by the signal processor of FIG. 42.

Figure 13:
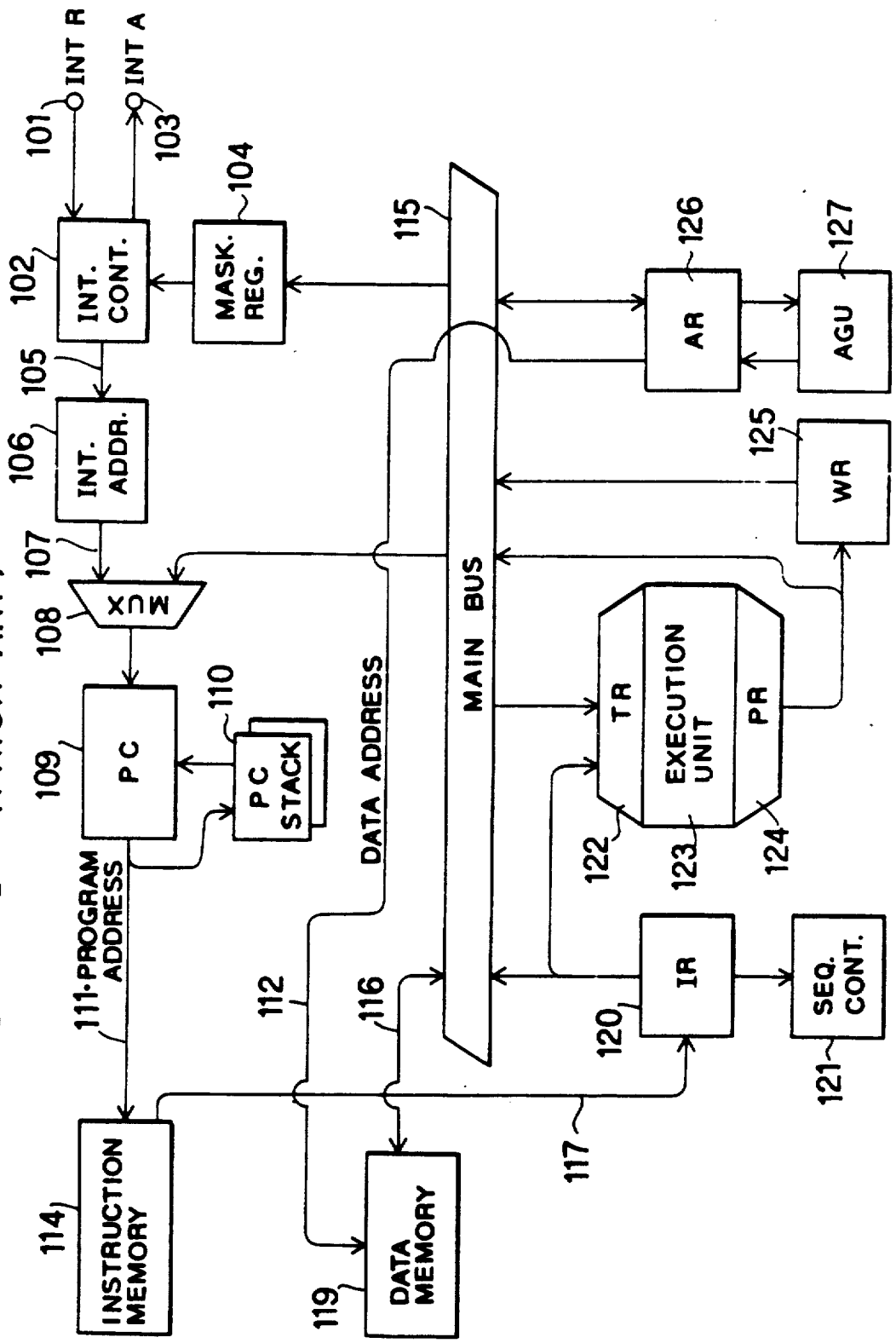
FIG. 13 is a block diagram of a fifth example of a conventional digital signal processor including an interruption process system.
Figure 14:
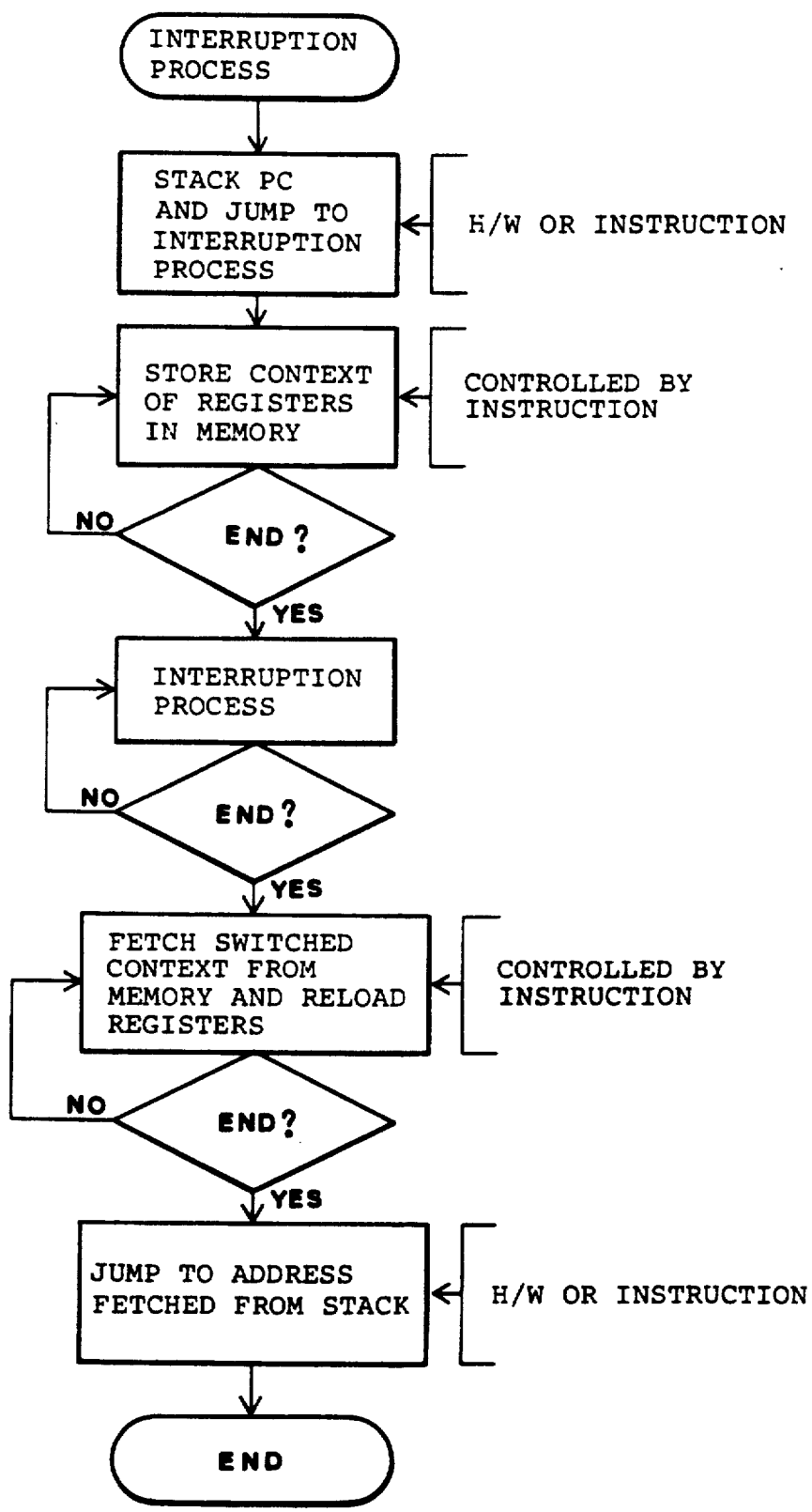
FIG. 14 is a flow chart showing steps of interruption process to be executed by the digital signal processor of FIG. 13.
Figure 15:
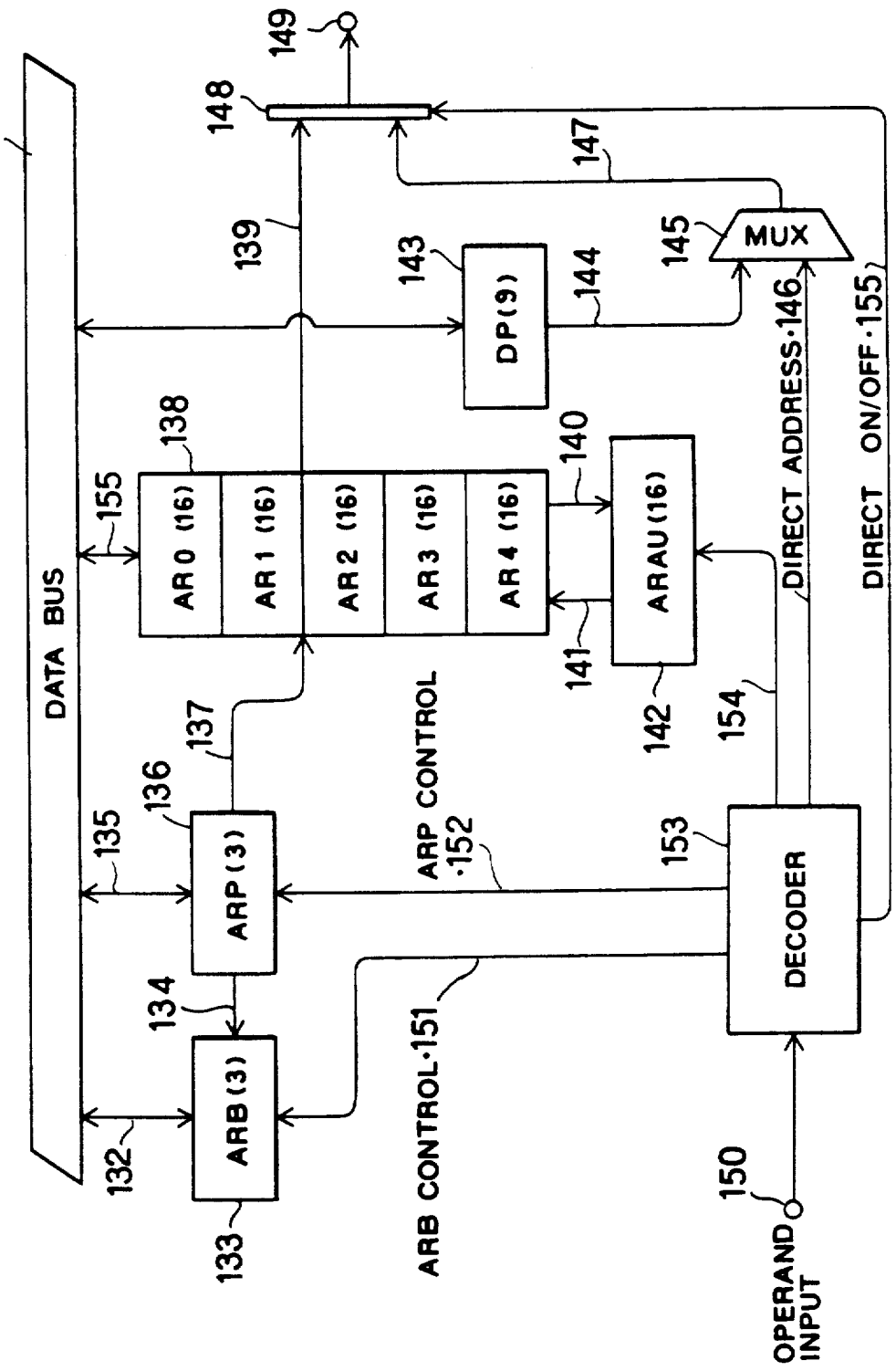
FIG. 15 is a block diagram of a conventional address generator as a sixth example of the prior art.
Figure 18:
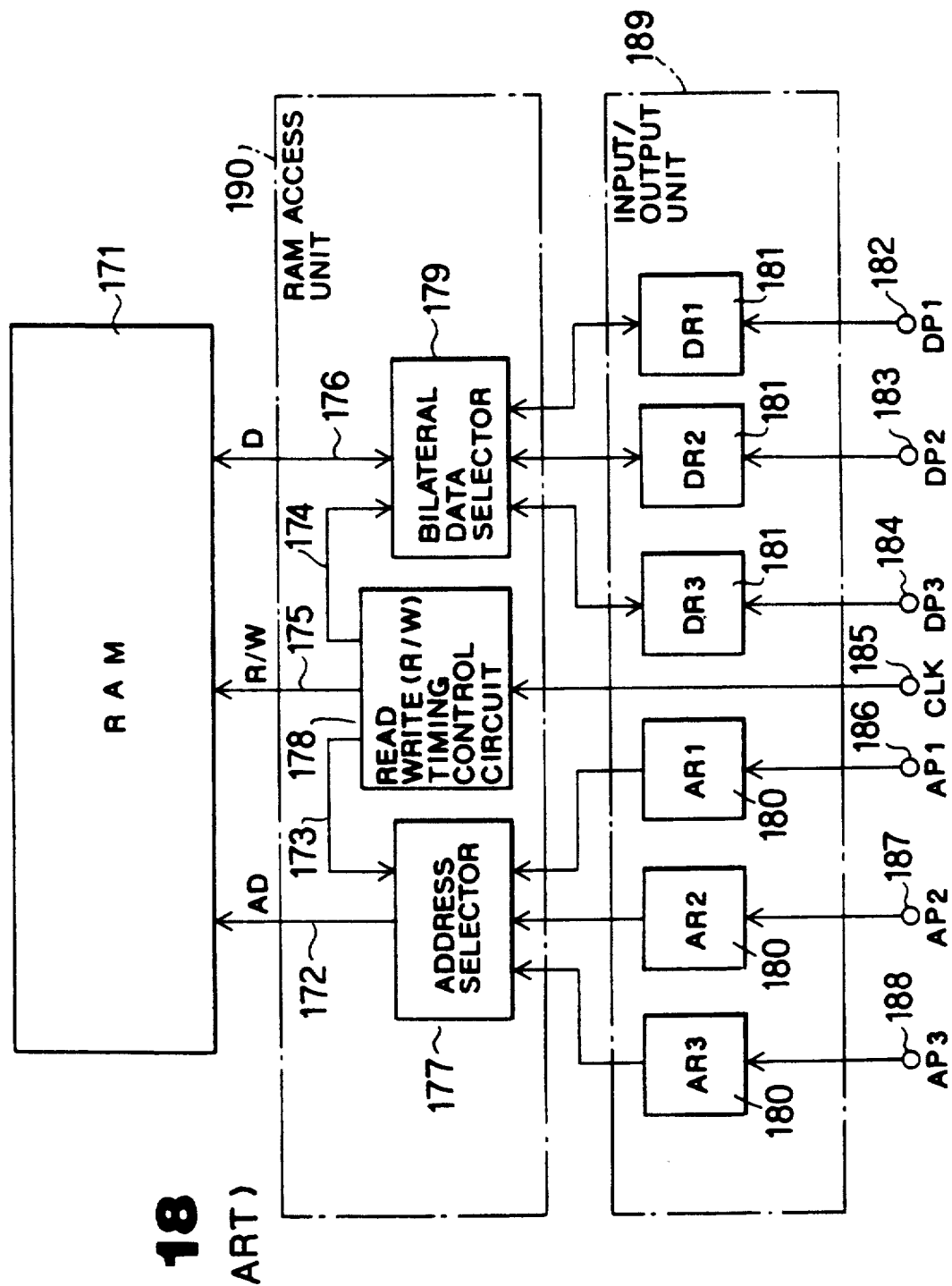
FIG. 18 is a block diagram showing the constitution of a multiport memory circuit as a seventh example of the prior art.
Figure 19:
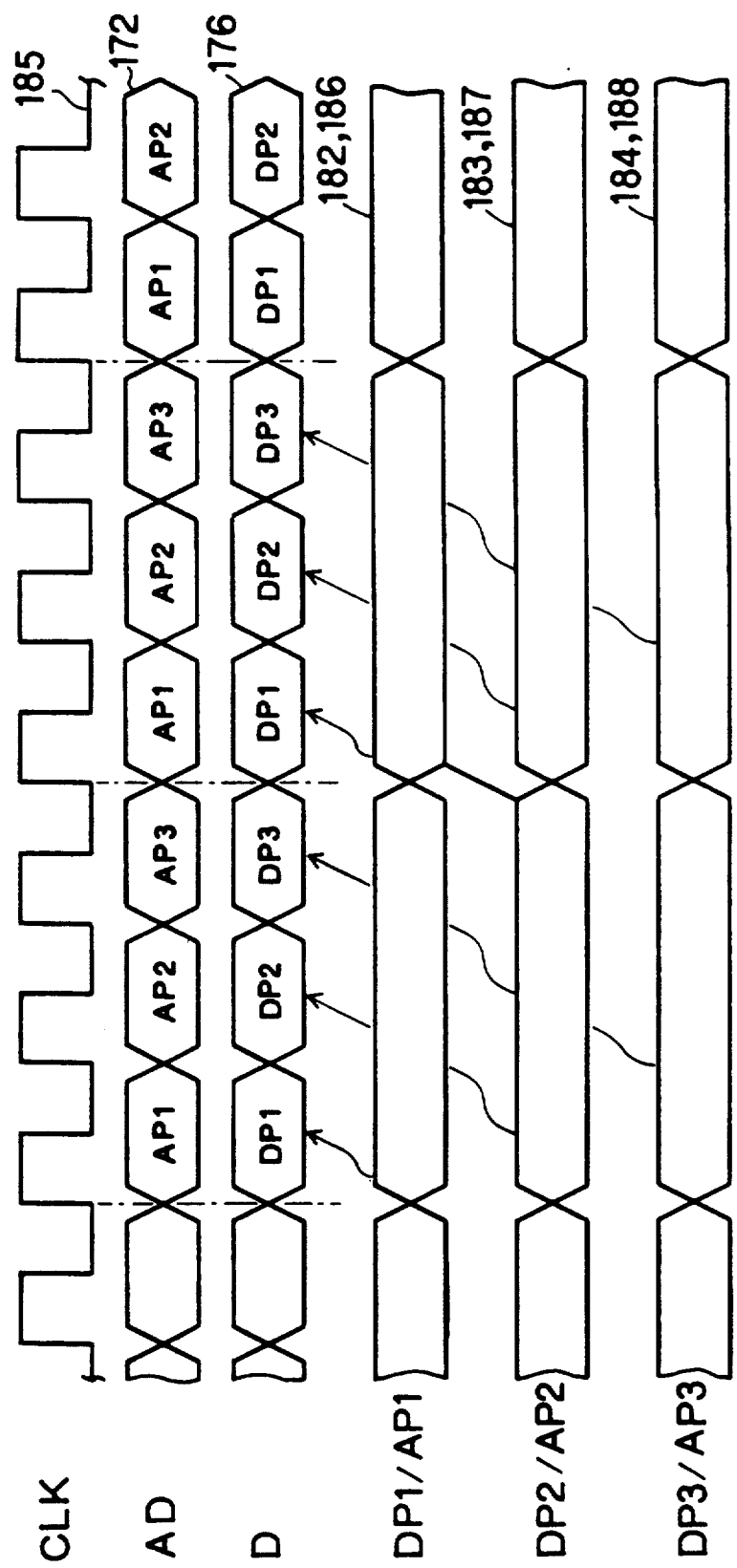
FIG. 19 is a time chart showing an example of timing of operation of the multiport memory circuit of FIG. 18.

The operation of the signal processor for the interruption process will be described hereinafter with reference to FIG. 42. The rest of the operations of the signal processor are the same as those described with reference to FIG. 13, and hence the description thereof will be omitted.

Upon the start of the interruption process in response to the INTR 451, the interrupt control circuit 452 provides the interrupt start signal 455 and the register standby instruction signal 480 simultaneously.

Then, upon the reception of the register standby instruction signal 480, the TRs 482, the PRs 483, the WRs 484 and the ARs 481 are switched to keep data on standby and prepare empty registers for interruption process. At the same time, the interrupt start signal 455 is applied to the PC 459, and thereby the PC 459 interrupts the ordinary operation to store the instruction address 461 in the STK 460 and then gives the interruption process address 457 to the instruction memory 464 to start the interruption process.

At the end of the interruption process, the ordinary process is restarted by reversing the foregoing steps to accomplish the interruption process.

Thus, all the working registers capable of operation and incapable of operation are kept on standby by an instruction. Therefore, an interruption process can be executed, for example, even during a pipeline operation provided that timing matching is possible, and hence interruption need not be disabled. The registers at least having duplex construction can automatically and simultaneously be put on standby simply by switching the registers by the register standby instruction signal.

Although this embodiment employs the registers at least having a duplex construction and switches the registers to put data on standby, the registers, like the STK 460, may be substituted by LIFO (last in first out) memories.

Furthermore, although the register standby system has been explained with reference to an interruption process, the same register standby system is applicable also to calling a subroutine.

Still further, when the contents of the registers do not change or when the contents of the registers do not affect the process after return from the interruption process even if the contents of the registers change during the interruption process or during the subroutine, an additional selective control means for forbidding the standby and return of the registers may be provided. This selective control means achieves the purpose very easily by forbidding the register standby instruction signal.

As apparent from the foregoing description, the fifth embodiment according to the present invention is capable of automatically and simultaneously performing the standby and return of all the registers, and hence the signal processor is able to respond to the interrupt request at a high response speed and is able to implement an interruption process efficiently.

Figure 44:
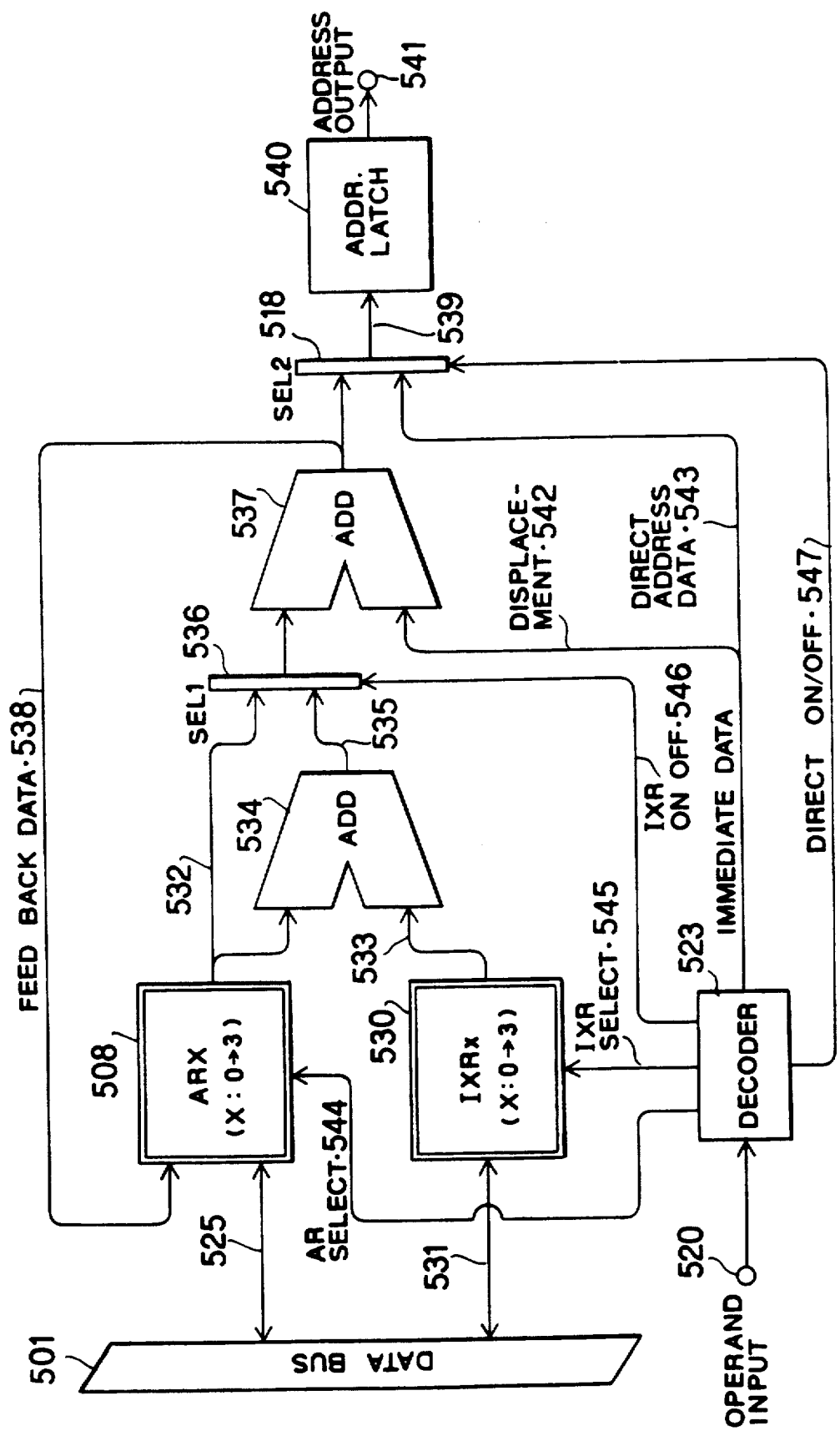
FIG. 44 is a block diagram of an address generator incorporated into a digital signal processor, in a sixth embodiment, according to the present invention.

An address generator, in a sixth embodiment, according to the present invention will be described hereinafter. Referring to FIG. 44 showing an address generator, in a sixth embodiment, according to the present invention, there are shown a data bus 501 for transferring data, address registers (ARx) (x=0, 1, 2 and 3 in this embodiment) 508 for indirect address generation, a data bus 525 for transferring data including initial values from the data bus 501 to the ARx 508, a decoder 523 for decoding a control code 520, index modify registers (IXRx) (x=0, 1, 2 and 3 in this embodiment) 530, a data bus 531 for transferring data including initial values from the data bus 501 to the IXRx 530, an optional data output 532 of the ARx 508 specified by a control code 520, an optional data output 533 of the IXRx 530, an adder 534 for adding the data outputs 532 and 533, an output 535 of the adder 534, a selector (1) 536 which operates according to an IRX on/off signal 546 to select the output 535 of the adder 534 when the IXR is ON and to select the data output 532 when the IRX is OFF, an adder 537 for adding the selective output of the selector (1) 536 and displacement data 542 provided by the decoder 523, the output 538 of the adder 537, a selector (2) 518 which selects the output 538 of the adder 537 and direct address data 543 provided by the decoder 523, a selective output 539 of the selector (2) 518, a latch 540 for providing the selective output 539 in synchronism with a cycle timing, an address output 541 to be provided in synchronism with the cycle timing, a displacement data 542 specified in an immediate value by the control code 520, a direct address data 543 specified in an immediate value by the control code 520, an address register selection signal 544 for selecting one of the plurality of ARx 508, an index modify register selection signal 545 for selecting one of the plurality of IXRx 530, an index modify on/off signal 546 provided by the decoder 523, and a direct address on/off signal 547 provided by the decoder 523.

FIG. 45 shows an example of the control code 520, in which indicated at 548 is an indirect address specifying code, and at 549 is a direct address specifying code.

FIG. 46 shows operations to be controlled by the control code 520.

Figure 47:
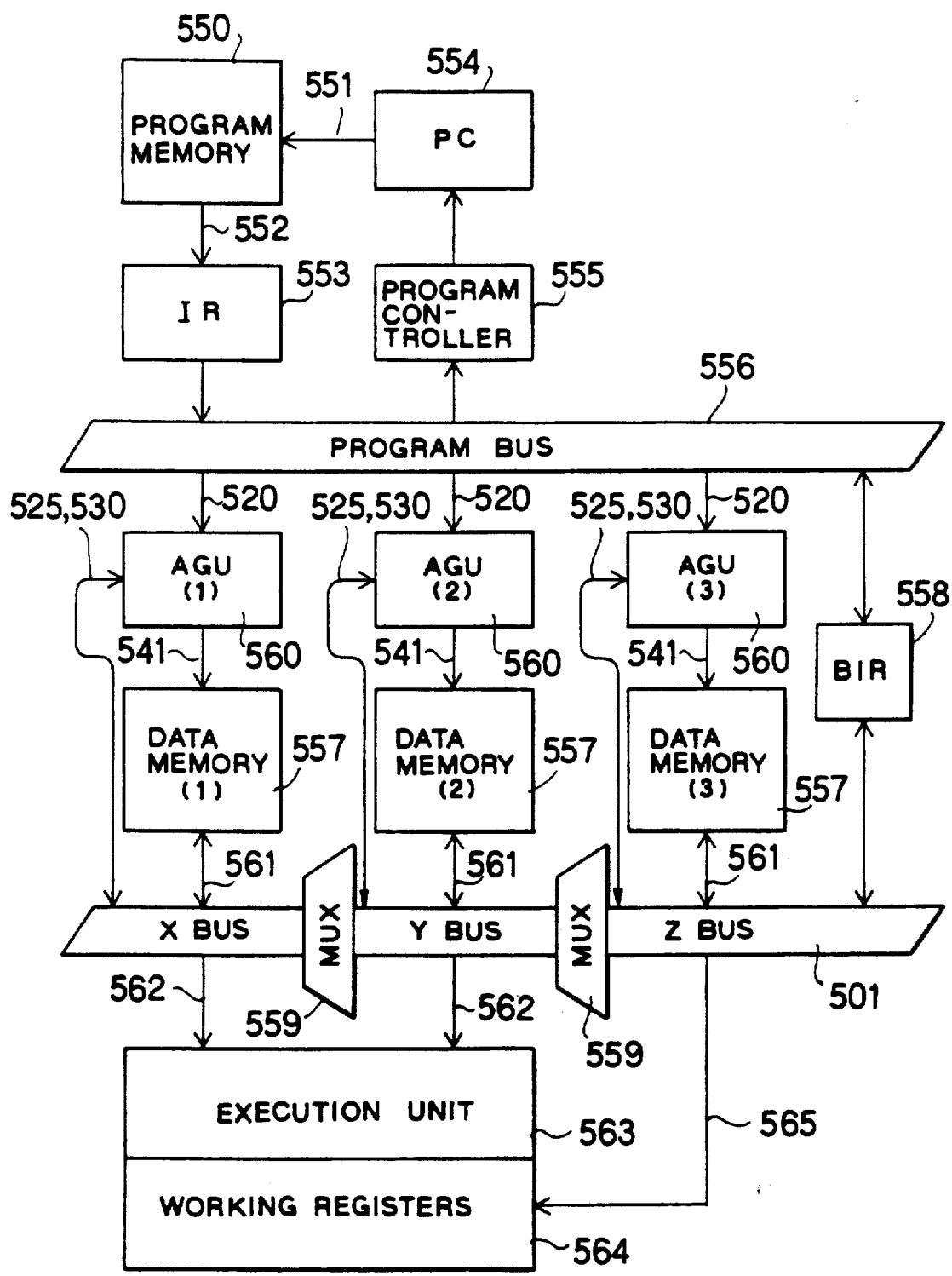
FIG. 47 is a block diagram of a signal processor incorporating the address control system according to the present invention.

FIG. 47 shows the constitution of a signal processor employing the address control system of the sixth embodiment. Shown in FIG. 47 are a program memory 550, an instruction address 551, an instruction code 552 read from an address of the program memory 550 specified by the instruction address 551, an instruction register (IR) 553 which holds and decodes the instruction code 552, a program counter (PC) 554 which provides the instruction address 551, a program control circuit 555 for controlling the PC 554 according to the instruction code 552, a program bus (P-BUS) 556 for distributing instructions provided by the IR 553 to the relevant units, data memories 557 storing data, i.e., operands, a bus interface register (BIR) 558 for transferring data between the P-BUS 556 and a data bus (D-BUS) 501, multiplexers (MUXs) 559 for selecting paths in the D-BUS 501, address generators (AGUs) 560 of FIG. 44, input/output data 561 exchanged between the data memories 557 and the D-BUS 501, an execution unit 563, an input data 562 given from the D-BUS 501 to the execution unit 563, working registers (WRs) 564 for use in operating data, and input/output data 565 exchanged between the WRs 564 and the D-BUS 501.

Figure 48:
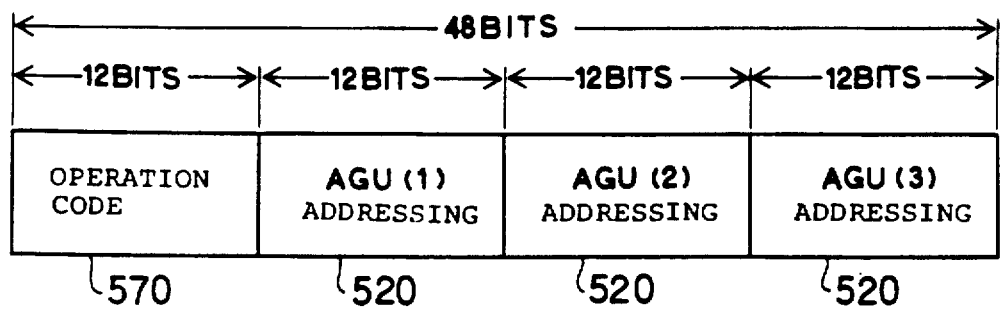
FIG. 48 is a diagram showing an example of a horizontal instruction code for the signal processor of FIG. 47.

FIG. 48 shows an example of the instruction code 552 used in the signal processor of FIG. 47, in which indicated at 570 is an operation code specifying an operation and at 520 is a control code for controlling the address of the data memories 557.

An address generating operation will be described hereinafter with reference to FIG. 44, in which the components will be denoted by abbreviations used in the foregoing description, for simplicity.

When the input address control code 520 specifies a direct address, the decoder provides a direct address data 543 represented by an immediate value. Then, a direct address ON signal 547 is provided to make the selector (2) 518 select the direct address data 543 as the output data 539. The output data 539 is held by the latch 540 to provide the address output 541 in synchronism with a machine cycle.

When the input address control code 520 specifies an indirect address, one of the ARx 508 specified by the address register selection signal 544 provided by the decoder 523 is selected. Likewise, one of the IXRx 530 is selected for index modify. The data output 532 and 533, namely, the contents of the two registers, are added by the adder 534 to obtain an index modified data output 535. The selector (1) 536 selects the data output 535 according to the index modify on/off signal 546 to apply the data output 535 to one of the inputs of the adder 537, while the displacement data 542 is applied to the other input of the adder 537. The adder 537 adds the data output 535 and the displacement data 542 to provide an indirect address data output 538. The content of one of the ARx 508 is updated by using the indirect address data output 538 and, at the same time, the selector (2) 518 selects the indirect address data output 538 to provide the address 539. The latch 540 latches the address 539 to provide the address output 541 in synchronism with a machine cycle.

When index modify is not implemented, the selector (1) 536 applies the selected data output 532 of the ARx 508 to one of the input terminals of the adder 534. Accordingly, none of the IXRx 530 is selected. On the other hand, when the displacement data 542 is not added, the displacement data 542 of "0" specified by an immediate value in the address control code 520 is applied to the other input terminal of the adder 537. There are four kinds of indirect address modes as follows, which can be used in an optional combination for each control cycle.

1. The data memory is accessed on the basis of the content of optional one of the ARx 508.

2. The content of optional one of the ARx 508 and the displacement data 542 represented by an immediate value are added, and the data memory is accessed on the basis of the result of addition.

3. The content of optional one of the ARx 508 and the content of optional one of the IXRx 530 are added, and then the data memory is accessed on the basis of the result of addition and, at the same time, the content of this ARx 508 is updated.

4. The content of optional one of the ARx 508 and the content of optional one of the IXRx 530 are added, the result of addition and the displacement data represented by an immediate value are added, and then the data memory is accessed on the basis of the result of the latter addition and, at the same time, the content of this ARx 508 is updated.

FIG. 45 shows an example of the control code 520 for address control. FIG. 46 shows operations corresponding to the contents of the control code 520.

Suppose that the horizontal size of two-dimensional data is n when the two-dimensional data is arranged horizontally, for example, in an ascending order of address of the data memory in the indirect address mode. Then, the indirect address modes are used in the following combinations for flexible address control.

Data memory access with an address placed in a horizontal direction

In an ARx 508 + displacement 542 mode, +a or −a is assigned to displacement.

Data memory access with an address placed in a vertical direction a×n Or −a×n is set in the IXRx 530, and an ARx 508 + IXRx 530 mode is used.

Oblique (for example, diagonal) data memory access n Or −n is set in the IXRx 530, and an ARx 508 + IXRx 530 + displacement 542 mode is used.

Thus, this address control system achieves complex address generation simply by specifying a control code, and hence the frequency of address computation of the execution unit is reduced remarkably.

The operation of the signal processor of this address control system will be described hereinafter with reference to FIG. 47. This signal processor is of so-called Harvard architecture. An instruction read operation for reading the instruction code 552 specified by the instruction address 551 provided by the PC 554 and writing the instruction code 552 in the IR 553, and the execution of the instruction are performed by the pipeline of machine cycle unit, so that one instruction is executed in a time equivalent to one machine cycle.

The execution unit 563 is connected to input paths 562 for parallel reception of two input data from the data bus 501, and the working registers 564 are connected to the data bus 501 by paths 565 for parallel data input and output to carry out operand input and output operation at a high speed. The three data memories 557 capable of independent data input and output are connected to the data bus for parallel data input and output with the execution unit 563. The address generator shown in FIG. 44 is connected as the address generator 560 to each data memory 557.

FIG. 48 shows an example of a horizontal instruction code 552 used in the signal processor. The horizontal instruction code 552 has an operation code 570 for identifying an operation, and address control codes respectively for the address generators 560 in a horizontal arrangement.

Description of instructions in an assembler notation for the signal processor is shown below by way of example.

An example of the matricial addition of the row k and column l of a two-dimensional data of horizontal size n $\vec{a}$: Data memory (1), $\vec{b}$: Data memory (2),
$\vec{c} = \vec{a} + \vec{b}$: Data memory (3)

add M0(AR$_{0+1}$),    M1(AR$_{0+1}$),    M2(AR$_{0+1}$) } k times add M0(AR$_0$ + IXR$_0$), M1(RA$_0$ + IXR$_0$), M2(AR$_0$ + IXR$_0$) ⎫
add M0(AR$_{0+1}$),    M1(AR$_{0+1}$),    M2(AR$_{0+1}$)} $_{times}^{k-1}$ ⎬ l − 1 times end The IXR$_0$ is set for "n−k".

As apparent from the foregoing description, the signal processor in the sixth embodiment according to the present invention is able to specify advanced address control simply by each instruction, and hence a complicated address control program can simply be described and the signal processor operates at a high processing speed.

Figure 49:
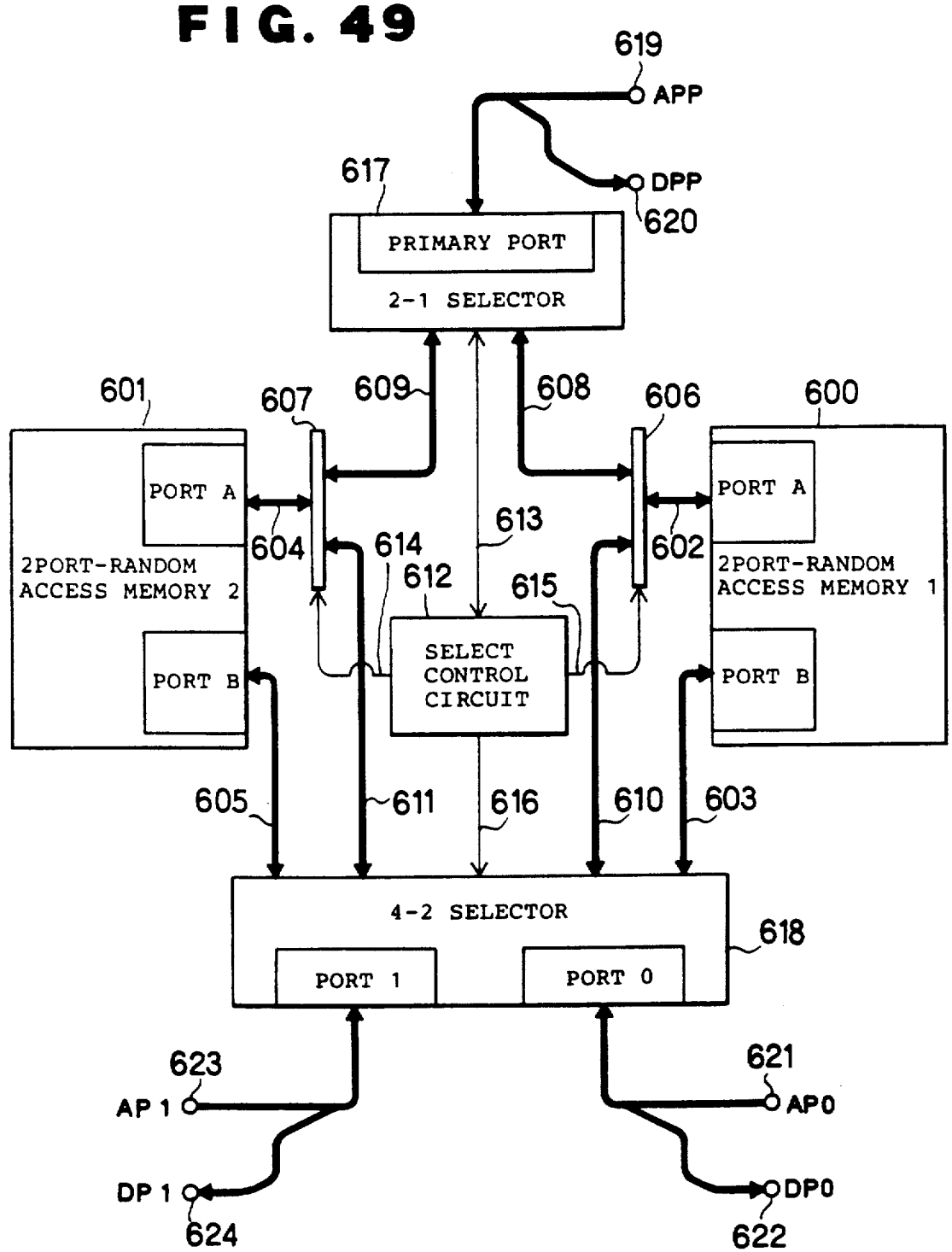
FIG. 49 is a block diagram of a multiport memory circuit incorporated into a digital signal processor, in a seventh embodiment, according to the present invention.

A digital signal processor, in a seventh embodiment, according to the present invention will be described hereinafter. Referring to FIG. 49 showing a multiport memory circuit incorporated into the digital signal processor, there are shown a two-port random access memory (2P-RAM1) 600 having two ports A and B, a 2P-RAM2 601 similar to the 2P-RAM1 600, an address data bus 602 connected to the port A of the 2P-RAM1 600, an address bus 603 connected to the port B of the 2P-RAM1 600, an address bus 604 connected to the port A of the 2P-RAM2 601, an address data bus 605 connected to the port B of the 2P-RAM2 601, a bilateral selector 606 for selectively connecting the address data bus 602 to either a bus 608 connected to a 2-1 selector 617 or a bus 610 connected to a 4-2 selector 618, a select control circuit 612, a select control signal 613 for the 2-1 selector 617, a select control signal 615 for the bilateral selector 606, a select control signal 616 for the 4-2 selector 618, the 2-1 selector 617 for selectively connecting either the bus 608 or the bus 609 to the primary port, the 4-2 selector 618 which selects optional two buses among the address data bus 603, the address data bus 605, the bus 610 connected to the 4-2 selector, and the bus 611 connected to the 4-2 selector, and connects the selected buses to ports 0 and 1, an address signal (APP) 619 at the primary port, data signal (DDP) 620 at the primary port, an address signal (APO) 621 at the port 0, a data signal (DPO) 622 at the port 0, an address signal 623 at the port 1, and a data signal (DP1) 624 at the port 1.

Figure 50:
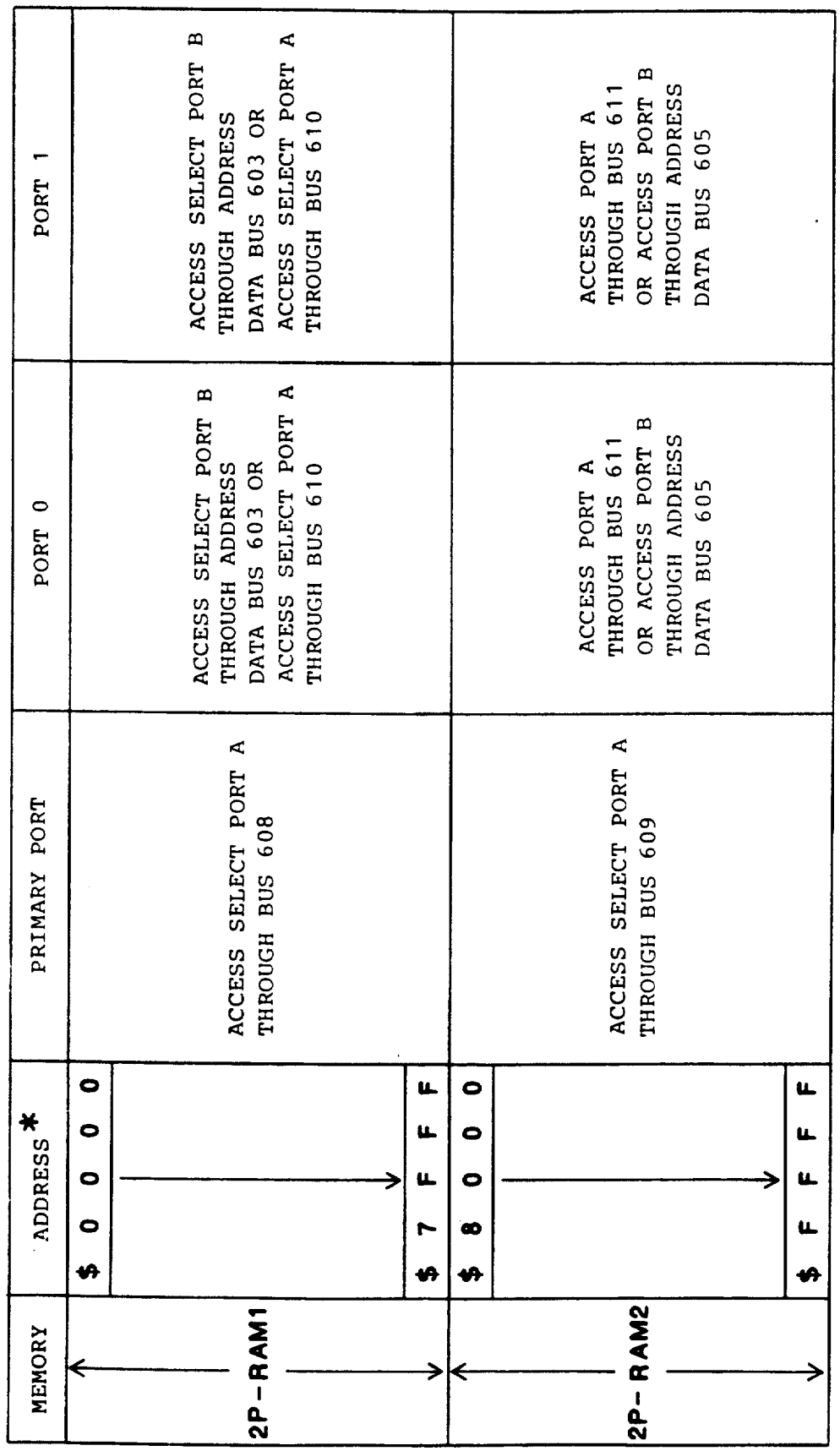
FIG. 50 is a table of assistance in explaining address allocation by the multiport memory circuit of FIG. 49.

FIG. 50 is a table of assistance in explaining operation of the multiport memory circuit of FIG. 49 for address assignment.

The operation of the multiport memory circuit of FIG. 49 embodying the present invention will be described hereinafter. First the APP 619 is applied to the primary port of the 2-1 selector 617. Then, the select control circuit 612 provides the select control signal 613 according to the address signal 619 to select either the bus 608 or the bus 609 to connect the 2-1 selector 617 to either the 2P-RAM1 600 or the 2P-RAM 601. When the bus 608 (609) is selected the bilateral selector 606 (607) connected to the bus 608 (609) connects the bus 608 (609) to the address data bus 602 (604) according to the select control signal 615 (614) to connect the primary port to the port A of the 2P-RAM1 600 (2P-RAM2 601). Then, a data signal is provided from the 2P-RAM when the DPP 620 applied to the primary port is a read signal or a data signal is applied to the 2P-RAM when the DPP 620 is a write signal, to complete one unit of memory access.

Similarly, the 4-2 selector 618 and the bilateral selector 606 (607) are switched according to the AP0 621 (AP1 623) applied to the port 0 (1) to read the DP0 622 (DP1 624) from the 2P-RAM1 600 (2P-RAM 601) through the port 0 (1), or to write the DP0 622 (DP1 624), applied to the port 0 (1) in the 2P-RAM1 600 (2P-RAM2 601). The 2P-RAM1 600 and the 2P-RAM2 601 are known random access memories each having two access ports A and B and capable of simultaneous read/write of two data signals. Therefore, the primary port and the port 0, for example, are able to access the 2P-RAM1 600 simultaneously, while the port 1 is able to access the port A or B of the 2P-RAM2 601. Thus, the three ports can simultaneously be accessed.

In this multiport memory circuit, the simultaneous access of the three ports to one of the 2P-RAMs is forbidden. Such simultaneous access can easily be avoided by previously deciding the order of priority of the ports or by controlling the memory access operation of each port according to a predetermined rule, and hence the forbiddance of the simultaneous access of the three ports to one of the 2P-RAMs rarely entails practical problems.

The memory cycle time t of the multiport memory circuit according to the present invention is approximately equal to the cycle time $t'_{cy}$ of the 2P-RAMs, and is a fixed value regardless of the number of access ports. As obvious from the foregoing description, the multiport memory circuit has a comparatively simple circuit configuration and the asynchronous operation of each port is possible. Furthermore, the address of each port can optionally be accessed in the entire address space of the multiport memory circuit under the foregoing restriction, which practically is an insignificant restriction.

Although this embodiment has been described as provided with three ports, the constitution of the memory address bus selectors may be changed and the multiport memory circuit may be provided with four ports.

Furthermore, although this embodiment is provided with the two 2P-RAMs, the multiport memory circuit of the present invention may be provided additionally with further 2P-RAMs to increase the number of the access ports.

As apparent from the foregoing description of the seventh embodiment of the present invention, the present invention provides a multiport memory circuit having three or more ports employing a plurality of 2P-RAMs, and the ports are selected by address signals. Accordingly, the multiport memory circuit has a comparatively simple circuit configuration and is able to operate in a short cycle time of each port.

Figure 51:
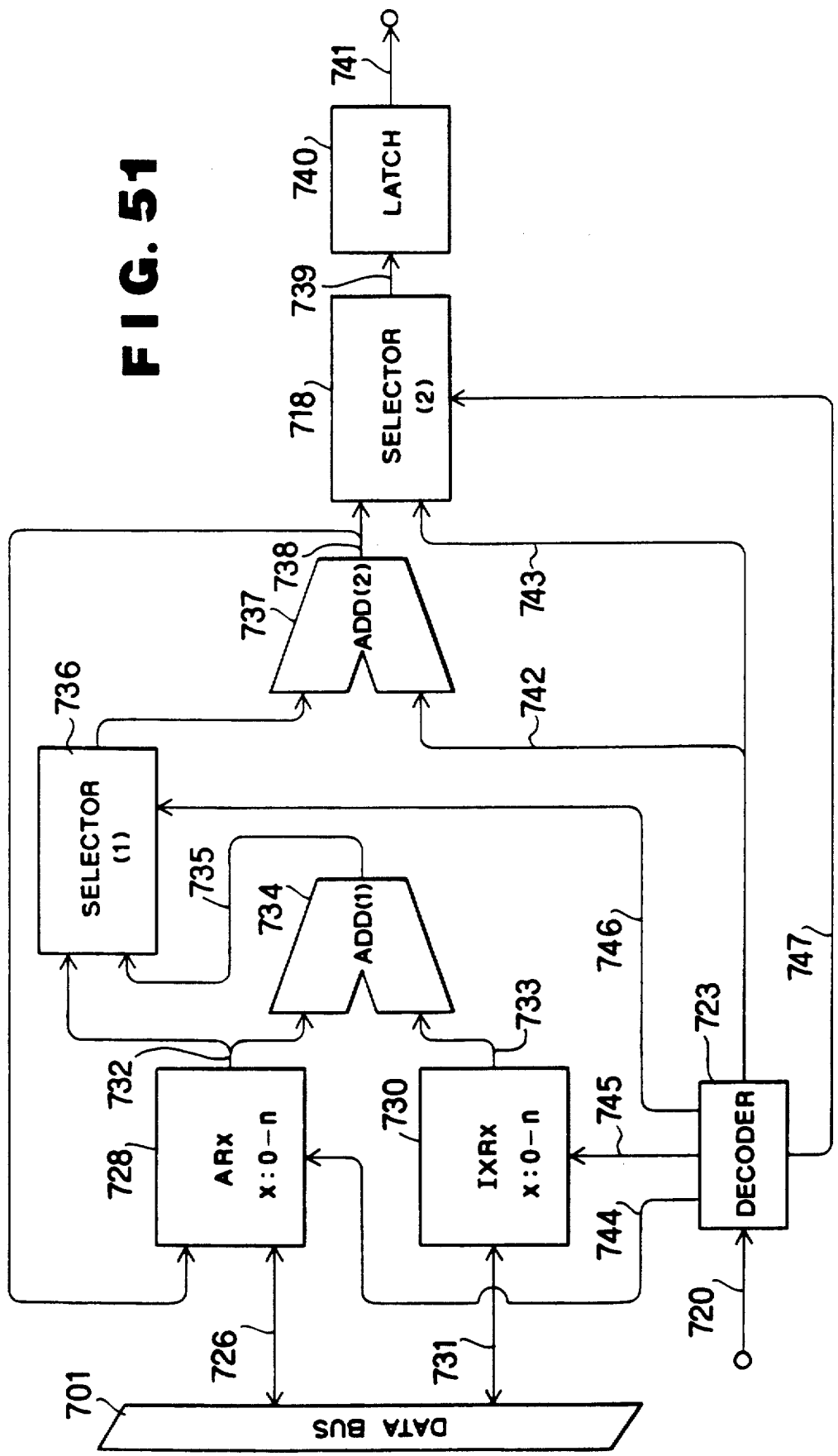
FIG. 51 is a block diagram indicating the structure of address generator adopted to the address generating system for signal process as an embodiment of the present invention.

FIG. 51 is a block diagram of the structure of address generator adapted to the address generating system for signal processing as an eighth embodiment of the present invention. In this figure, 701 is data bus used for data transfer, 728 is address register (ARx) used for generation of relative address, 726 is data bus for input and output of initial value from data bus 701 to address register (ARx) 728, 730 is index modification register (IXRx), 731 is data bus for input and output of initial value from data bus 701 to index modification register (IXRx) 730, 732 is one desired data output among address registers (ARx) indicated by address control code 720, 733 is one desired data output among index modification registers (IXRx) 730, 734 is adder [ADD (1)] which adds data output 732 and data output 733, 735 is data output of addition result of adder 734, 736 is selector (1) which selects data output 735 of the addition result when IXR is ON or data output 732 when IXR is OFF depending on the index modification (IXR) ON/OFF signal 746, 737 is adder [ADD (2)] which adds selected output of selector (1) 736 and displacement data 742 output from decoder 723, 738 is data output of addition result of adder [ADD (2)], 718 is selector (2) which selects data output 738 of addition result and direct address data 743 output from the decoder 723, 739 is selected data output of selector (2) 718, 740 is latch which outputs data output 739 in synchronization with cycle timing, 741 is address output synchronized with cycle timing, 720 is address control code, 723 is decoder which decodes address control code 720, 742 is displacement data indicated by immediate value from the address control code 720, 743 is direct address data indicated by immediate value from the address control code 720, 744 is address register selection signal for selecting the one of a plurality of address registers (ARx) 728, 745 is index modification register selection signal which selects the one of a plurality of index modification register (IXRx) 730, 746 is index modification ON/OFF signal output from the decoder 723, and 747 is direct address ON/OFF signal output from the decoder 723.

Figure 22:
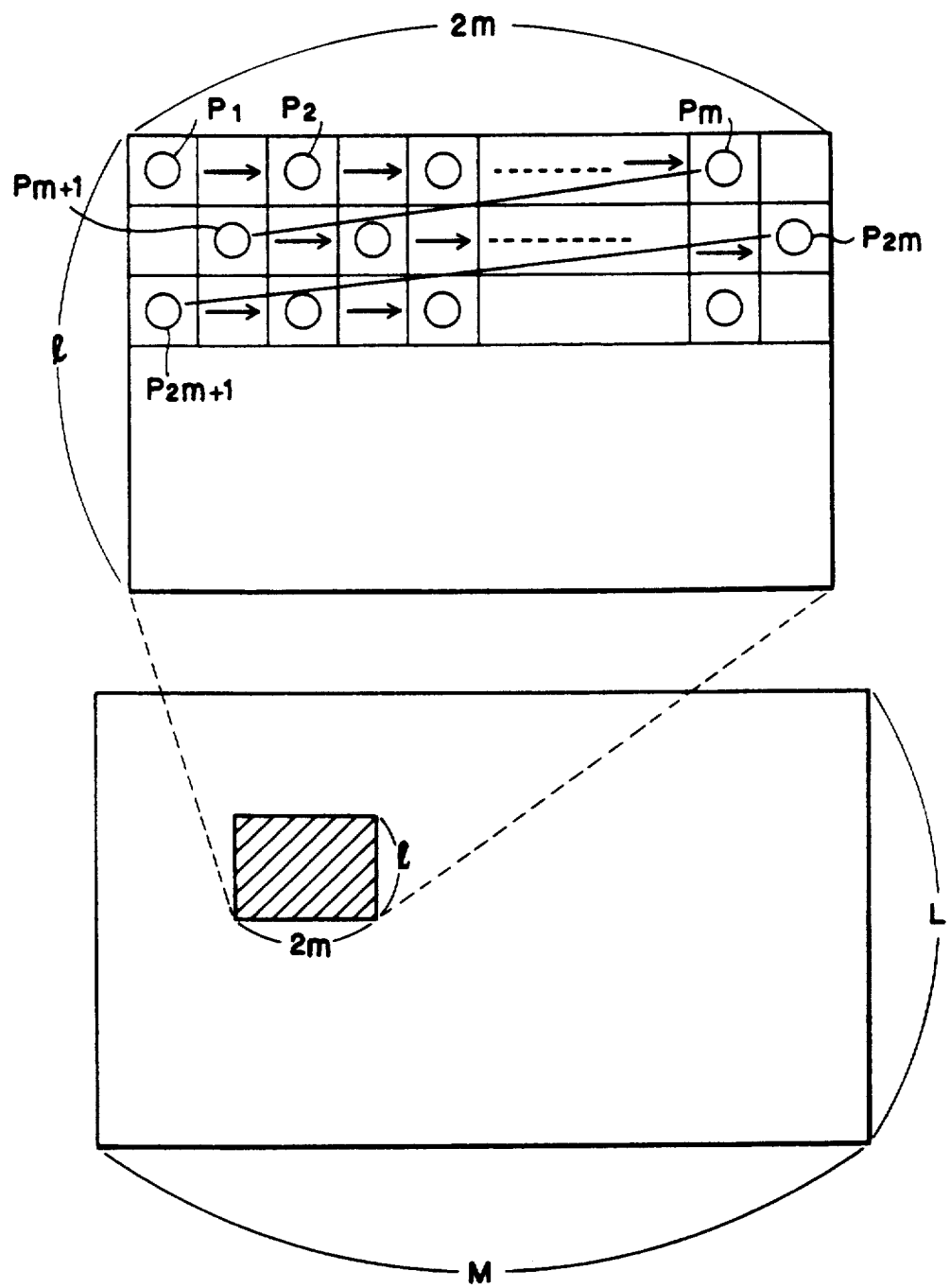
FIG. 22 is a data series on the bidimensional space.
Figure 52:
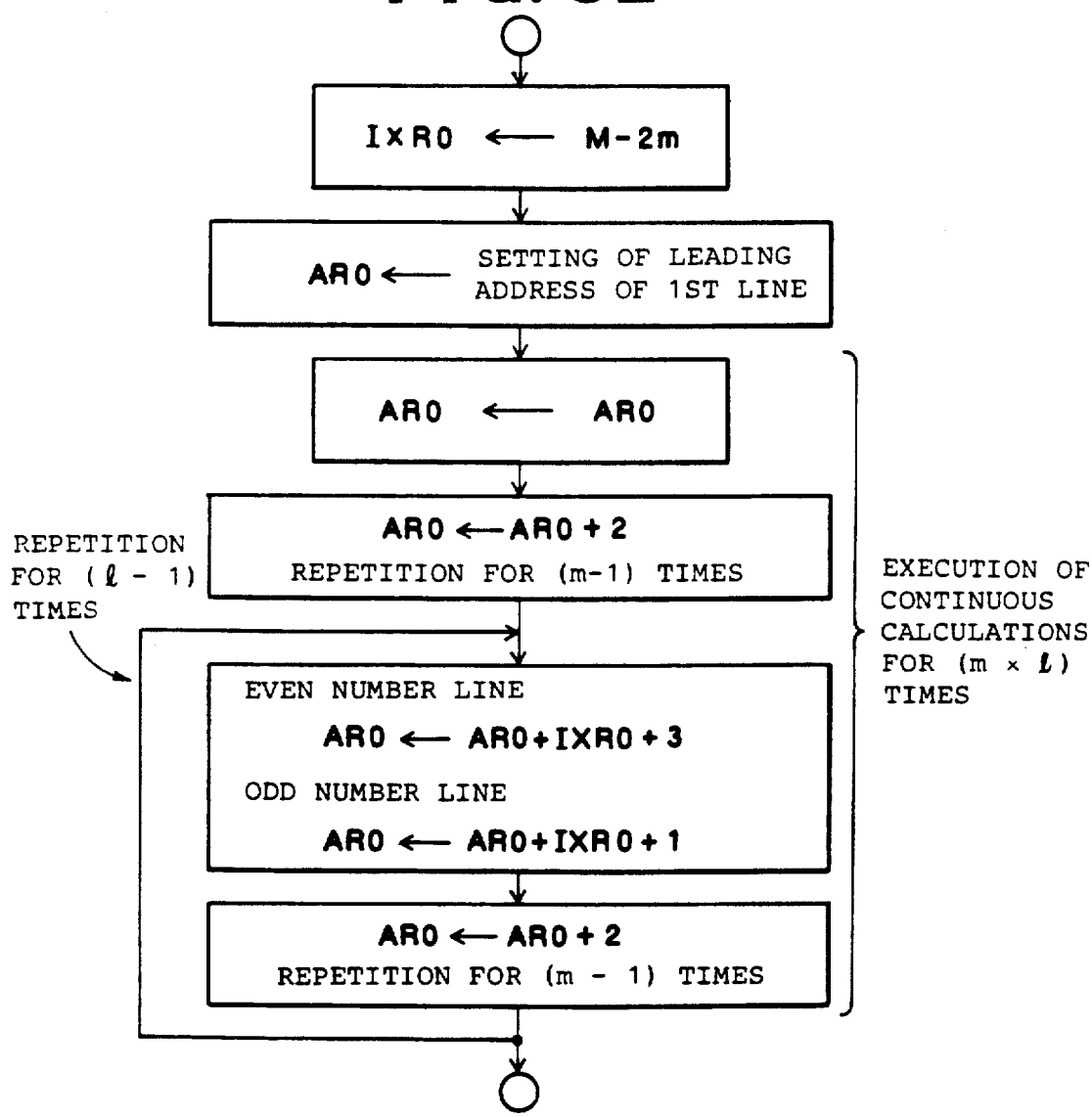
FIG. 52 is a flowchart indicating addressing operation for data series of FIG. 55 by means of the address generator of FIG. 51.

FIG. 52 is a flowchart indicating addressing operation for data series of FIG. 22 by the address generator of FIG. 51. FIG. 53 shows an example of address control code in the address generator of FIG. 51. In these figures, 748 is relative address designation code and 749 is direct address designation code.

Figures 54, 56:
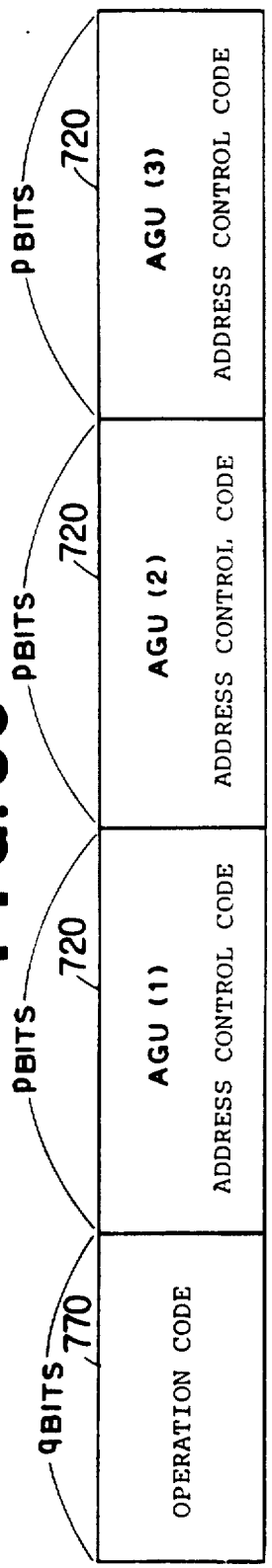
FIG. 54 is a table for explaining operations by address control code of FIG. 53.
FIG. 56 is an example of instruction code in the signal processor of FIG. 55.
Figure 55:
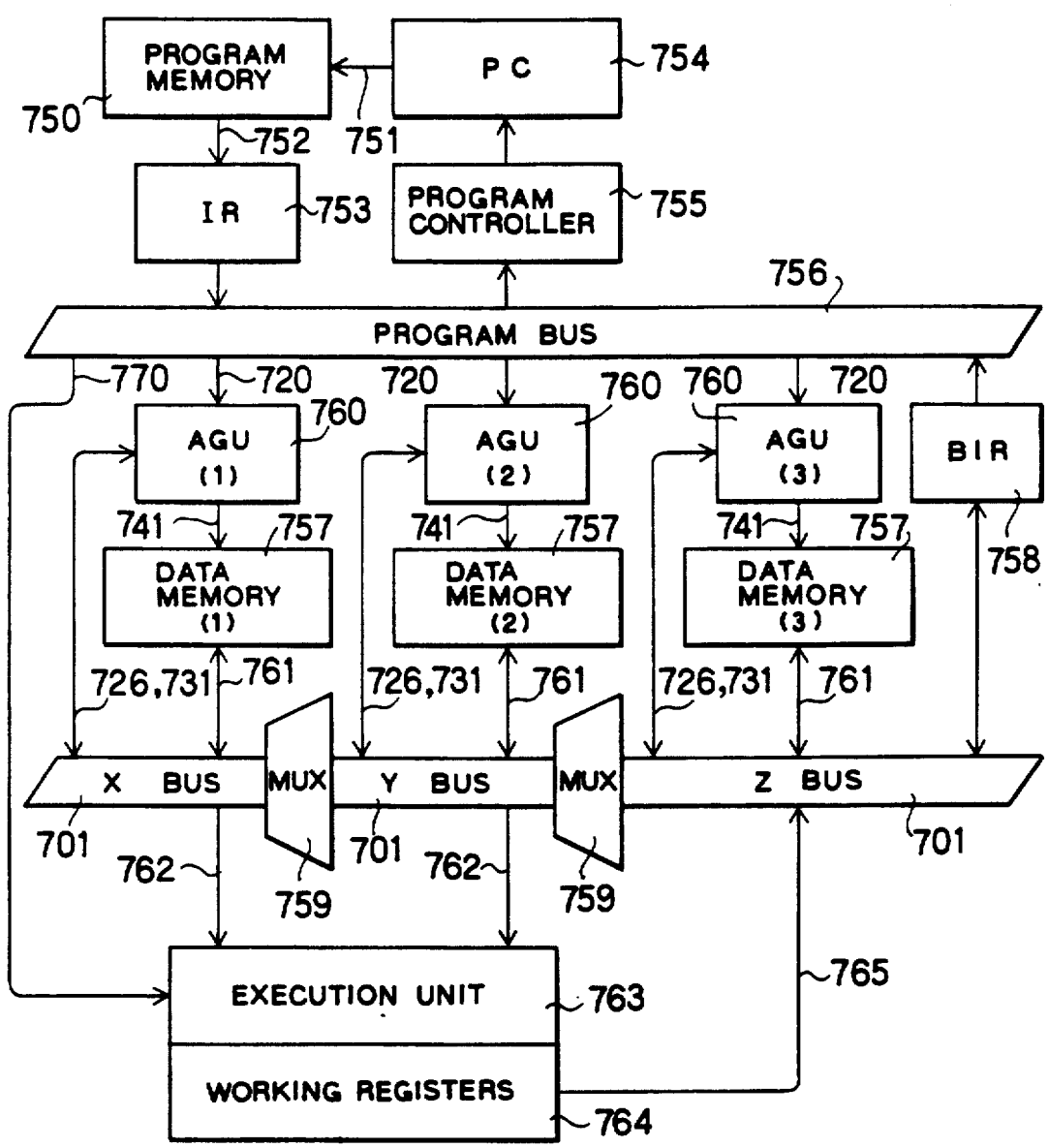
FIG. 55 is a block diagram indicating the structure of signal processor adopting the address generating system for signal processing of FIG. 51.

FIG. 54 shows a table for explaining operations of address control code of FIG. 53. FIG. 55 is a block diagram indicating the structure of signal processing processor adapting the address generating system for signal processing of FIG. 51. In these figures, 750 is instruction memory consisting of program memory, 751 is instruction address, 752 is instruction code read from address of instruction memory 750 corresponding to instruction address 751, 753 is instruction register (IR) which holds the instruction code 752 and decodes it, 754 is program counter (PC) which outputs the instruction address 751, 755 is program control circuit (program controller) which controls the program counter (PC) 754 depending on the instruction code 752, 756 is program bus (P-BUS) which distributes instructions to respective section from instruction register (IR) 753, 757 is data memory for storing calculation data, 758 is bus interface register (BIR) for data transfer between the program bus (P-BUS) 756 and the data bus (D-BUS) 701, 759 is multiplexer (MUX) which selects line of data bus (D-BUS) 701, 760 is address generator (AGU) indicated in FIG. 55, 761 is input/output data between data memory 757 and data bus (D-BUS) 701, 762 is input data to data calculation part 763 from data bus (D-BUS) 701, 763 is data calculation part which executes calculations, 764 is working register (WR) used for data calculation processing, 765 is input/output data between the working register (WR) 764 and the data bus (D-BUS) 701, and 770 is operation code for indicating instruction operations.

FIG. 56 is an example of instruction code in the signal processor of FIG. 55. In this figure, 770 is operation code which specifies instruction operations and 720 is address control code which controls address of data memory 757.

Next, the address generating operations of address generating system for signal processing as an embodiment of the present invention explained above are then explained hereunder. First, in case the input address control code 720 is provided for direct address designation, the decoder 723 outputs the direct address data 743 indicated by the immediate value. Next, the direct address ON/OFF signal 747 is turned ON and thereby the data output 739 can be obtained by selecting the direct address data 743 from the selector (2) 718. Finally, the data output 739 is held in the latch 740 for synchronization with the machine cycle and the address output 741 is provided.

Next, in case the input address control code 720 is provided for relative address designation, only one of the address registers (ARx) 728 indicated by the address register selection signal 744 output from the decoder 723 is selected. In the same way, in the case of index modification, only one of the index modification registers (IXRx) 730 is selected. The data output 732 and data output 733 which are contents of these two registers are added in the adder [ADD (1)] 734 and the data output 735 competed index modification can be obtained. The data output 735 is input to the one input of adder [ADD (2)] 737 by selecting the selector (1) 736 in accordance with the index modification ON/OFF signal 746 and it is then added with the displacement data 742 input to the other input of adder 737 to obtain the relative address data output 738. With this data output 738, the one content of address registers (ARx) 728 is updated and simultaneously data output 738 is selected in the selector (2) 718 to output the data output 739 of address. It is then synchronized with the machine cycle by the latch 740 to obtain the address output 741.

In case the index modification is not carried out, the selector (1) 736 inputs, during above operations, the data output 732 of address register (ARx) 728 to the one input of the adder [ADD (2)] 737. Therefore, the one of index modification registers (IXRx) 730 is not selected. Meanwhile, in case the addition of displacement data 742 is not carried out, the displacement data 742 indicated by immediate value in the address control code 720 is set to "0" and it is input to the other input of adder (ADD) 737. The relative address mode includes the following four kinds of modes any combination can be selected for each control cycle.

1. Access to data memory 757 is made with content of the one address register (ARx) 728.

2. After the displacement data 742 indicated by immediate value is added to the one content in the desired address register (ARx) 728, the access is made to the data memory 757 with the result of such addition and simultaneously content of address register (ARx) 728 is reviewed.

3. After the one content in the desired address register (ARx) 728 is added to the one content in the desired index modification register (IXRx) 730, access is made to the data memory 757 with the result of addition and simultaneously content of address register (ARx) 728 is updated.

4. After the one content in the desired address register (ARx) 728 is added to the one content in the desired index modification register (IXRx) 730, the displacement data 742 indicated by immediate value is added to the result of addition. Access is made to the data memory 757 with the result of addition and simultaneously content of address register (ARx) 728 is updated.

FIG. 53 shows an example of address control code 720 for address control and FIG. 54 is a table for explaining operations depending on content of address control code 720.

For example, when the bidimensional data are arranged in the horizontal direction in the sequence of address of data memory 757 by the relative address mode, if the horizontal size of bidimensional data is M, flexible address control can be realized by combining the relative address modes as indicated hereunder.

A. In case access is made to data memory 757 in every a-address in the horizontal direction:

+a or −a is designated to the displacement data 742 in the mode of address register (ARx) 728+displacement data 742.

B. In case access is made to data memory 757 in every a-address in the vertical direction:

a×M or −a×M is set to the index modification register (IXRx) 730 and the mode of address register (ARx) 728+index modification register (IXRx) 730 is used.

C. In case access is made to data memory 757 in the oblique direction (for example, diagonal direction):

M or −M is set to the index modification register (IXRx) 730 and the mode of address register (ARx) 728+index modification register (IXRx) 730+displacement data 742 is used.

Here, FIG. 52 shows a flowchart of addressing operations for the data series shown in FIG. 22. First, a value of (M−2 m) is initially set to the one IXR0 in the index modification registers (IXRx) 730 and the address of point P₁ is initially set to the one AR0 in the address registers (ARx) 728. Operations heretofore are the same as those in the prior art. For the leading reference point P₁ of the first line, the addressing is made in the address control mode No. 1, namely in the mode of AR0→AR0 shown in FIG. 54 and for the next reference point on the same line, addressing is carried out in the address control mode No. 2, namely in the mode of AR0+disp (=2)→AR0.

Next, when the line is changed, the addressing can also be made in the address control mode No. 4, AR0+IXR0+disp→AR0. Accordingly, in an example of FIG. 22, addressing can be made continuously to the (m×1) data.

As explained previously, it is no longer necessary to carry out the address calculation by intermitting calculation in every change of line in the bidimensional data, the pipeline processing can be realized effectively and the program itself can also be simplified in the address generating system for signal processing of the present invention.

In case a series calculation process is carried out continuously for a plurality of data series, the address value of leading reference point of each data series is previously calculated, it is then stored in the particular region of data memory, the leading address value of data series corresponding to the start of calculation process is read from the data memory 757 and it is then initially set to the particular address register in the address generators through the data bus 701.

As explained previously, the present invention employs the structure which is capable of designating address register, index register and displacement for each microinstruction in the address generating system for signal processing and realizing relative addressing through combination of additions of three items and therefore provides such excellent effect as simplifying description of complicated address control for bidimensional data and realizing high speed signal processing.

What is claimed is:

1. A digital signal processor, comprising:
an instruction memory storing microinstructions which control execution of selected operations on selected operand data;
a data memory storing said operand data;
a stack memory;
instruction execution control means for providing instruction addresses to said instruction memory so as to read out microinstructions therefrom;
execution means for executing operations on selected operand data from said data memory in accordance with said microinstructions read out from said instruction memory;
a plurality of working registers associated with said execution means for carrying out execution of operations according to said microinstructions, each of said plurality of working registers being of duplex construction for switching between one of two states; and
interrupt control means responsive to an external interrupt request signal requesting execution of an interrupt process, for automatically providing a standby instruction to said plurality of working registers for switching said plurality of working registers to a standby state in which current contents of said plurality of working registers are preserved, and for automatically providing an interrupt start signal to said instruction execution control means for storing the instruction address of a currently executed microinstruction in said stack memory and providing interrupt process instruction addresses to said instruction memory for outputting interrupt process execution instructions to said execution means for executing said interrupt process;
said interrupt control means providing a restore instruction to said plurality of working registers for switching said plurality of working registers back from said standby state to restore said current contents to said registers, and an interrupt completion signal to said instruction execution control means for fetching said stored instruction address from said stack memory upon completion of said interrupt process.

2. A digital signal processor according to claim 1, wherein said plurality of working registers include a data address register, an address index register, a data register, a temporary register and a pipeline register, and each are provided with stack memories for switching the contents of the working registers to said standby state and for restoring the contents held on standby to said registers.

3. A digital signal processor according to claim 1, wherein said interrupt control means includes selective control means for selectively holding said instruction address of a currently executed microinstruction and the contents of the working registers on standby prior to an interrupt process, and for forbidding holding of said contents of the working registers on standby when the contents of said working registers need not be held on standby.

* * * * *

UNITED STATES PATENT AND TRADEMARK OFFICE
CERTIFICATE OF CORRECTION

PATENT NO. : 5,222,241

DATED : June 22, 1993

INVENTOR(S) : T. Murakami et al.

Page 1 of 2

It is certified that error appears in the above-identified patent and that said Letters Patent is hereby corrected as shown below:

Cover Page, in the Foreign Application Priority Data item 30, "Nov. 30" should be --Nov. 25--.

Col. 7, line 48, at the beginning of the line insert --.--.

Col. 7, line 52, at the beginning of the line insert --.--.

Col. 7, line 55, at the beginning of the line insert --.--.

Col. 7, line 59, at the beginning of the line insert --.--.

Col. 7, line 61, at the beginning of the line insert --.--;

Col. 7, line 65, at the beginning of the line insert --.--.

Col. 13, line 40, "operatin" should be --operations--.

Col. 17, line 41, after "operates." start a new paragraph.

Col. 21, line 40, at the beginning of the line insert --.--.

Col. 21, line 44, at the beginning of the line insert --.--.

Col. 21, line 46, at the beginning of the line insert --.--.

Col. 21, line 48, at the beginning of the line insert --.--.

UNITED STATES PATENT AND TRADEMARK OFFICE
CERTIFICATE OF CORRECTION

PATENT NO. : 5,222,241

DATED : June 22, 1993

INVENTOR(S) : T. Murakami et al.

Page 2 of 2

It is certified that error appears in the above-identified patent and that said Letters Patent is hereby corrected as shown below:

```
Col. 41, line 1, after "data" (first occurrence) insert
--565--;

Col. 42, line 15, at the beginning of the line insert --·--.

Col. 42, line 16, after "direction" insert --:--.

Col. 42, line 21, at the beginning of the line insert --·--.

Col. 42, line 22, after "direction" insert --:--.

Col. 42, line 27, at the beginning of the line insert --·--.

Col. 42, line 27, after "access" insert --:--.

Col. 43, line 1, at the beginning of the line insert --·--.

Col. 43, line 52, after "signal" insert --(AP1)--.
```

Signed and Sealed this

Twenty-sixth Day of April, 1994

Attest:

BRUCE LEHMAN

*Attesting Officer*    *Commissioner of Patents and Trademarks*